(12) United States Patent
Oizumi et al.

(10) Patent No.: US 10,419,169 B2
(45) Date of Patent: *Sep. 17, 2019

(54) COMMUNICATION APPARATUS AND RETRANSMISSION CONTROL METHOD

(71) Applicant: Sun Patent Trust, New York, NY (US)

(72) Inventors: Toru Oizumi, Kanagawa (JP); Seigo Nakao, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/204,243

(22) Filed: Nov. 29, 2018

(65) Prior Publication Data
US 2019/0097766 A1 Mar. 28, 2019

Related U.S. Application Data

(63) Continuation of application No. 15/887,860, filed on Feb. 2, 2018, now Pat. No. 10,177,882, which is a
(Continued)

(30) Foreign Application Priority Data

Sep. 16, 2010 (JP) ................. 2010-208068
Oct. 14, 2010 (JP) ................. 2010-231866
Mar. 29, 2011 (JP) ................. 2011-072045

(51) Int. Cl.
*H04L 1/18* (2006.01)
*H04W 24/04* (2009.01)
(Continued)

(52) U.S. Cl.
CPC .......... *H04L 1/1861* (2013.01); *H04B 7/024* (2013.01); *H04L 1/0061* (2013.01);
(Continued)

(58) Field of Classification Search
CPC ..... H04L 1/1861; H04L 1/1607; H04L 5/001; H04L 1/0061; H04L 1/1829;
(Continued)

(56) References Cited

FOREIGN PATENT DOCUMENTS

EP 1 612 980 A1 1/2006

OTHER PUBLICATIONS

3GPP TS 36.211 V9.1.0, "3rd Generation Partnership Project; Technical Specification Group Radio Access Network; Evolved Universal Terrestrial Radio Access (E-UTRA); Physical Channels and Modulation (Release 9)," Mar. 2010, 85 pages.
(Continued)

*Primary Examiner* — Will W Lin
(74) *Attorney, Agent, or Firm* — Seed IP Law Group LLP

(57) ABSTRACT

Provided is a terminal device that is capable of improving the characteristics of a response signal having poor transmission characteristics when ARQ is utilized in communication using an uplink unit band and a plurality of downlink unit bands associated with the uplink unit band. At the time of channel selection, a control unit selects a resource used in sending a response signal from among specific PUCCH resources notified in advance from a base station and PUCCH resources mapped to a CCE, and controls the transmission of the response signal. A response signal generating unit supports implicit signaling with respect to any given response signal, and at the same time as supporting LTE fallback from 2CC, uses a mapping method that, between bits, smooths the number of PUCCH resources that can determine ACK/NACK simply by determining the PUCCH resource regarding which the response signal had notified.

14 Claims, 36 Drawing Sheets

Related U.S. Application Data continuation of application No. 15/491,731, filed on Apr. 19, 2017, now Pat. No. 9,923,675, which is a continuation of application No. 15/157,170, filed on May 17, 2016, now Pat. No. 9,667,385, which is a continuation of application No. 14/675,352, filed on Mar. 31, 2015, now Pat. No. 9,402,202, which is a continuation of application No. 13/820,415, filed as application No. PCT/JP2011/004943 on Sep. 2, 2011, now Pat. No. 9,025,436.

(51) Int. Cl.

| | |
|---|---|
| *H04L 1/00* | (2006.01) |
| *H04L 1/16* | (2006.01) |
| *H04L 5/00* | (2006.01) |
| *H04B 7/024* | (2017.01) |
| *H04W 28/04* | (2009.01) |
| *H04W 72/04* | (2009.01) |

(52) U.S. Cl.
 CPC .......... *H04L 1/1607* (2013.01); *H04L 1/1671* (2013.01); *H04L 1/1829* (2013.01); *H04L 1/1858* (2013.01); *H04L 5/001* (2013.01); *H04L 5/0053* (2013.01); *H04L 5/0055* (2013.01); *H04W 24/04* (2013.01); *H04W 28/04* (2013.01); *H04W 72/0413* (2013.01)

(58) Field of Classification Search
 CPC ... H04L 5/0053; H04L 5/0055; H04L 1/1671; H04L 1/1858; H04W 24/04; H04W 28/04; H04W 72/0413; H04B 7/024
 See application file for complete search history.

(56) References Cited

OTHER PUBLICATIONS

3GPP TS 36.212 V9.2.0, "3rd Generation Partnership Project; Technical Specification Group Radio Access Network; Evolved Universal Terrestrial Radio Access (E-UTRA); Multiplexing and channel coding (Release 9)," Jun. 2010, 61 pages.
3GPP TS 36.213 V9.2.0, "3rd Generation Partnership Project; Technical Specification Group Radio Access Network; Evolved Universal Terrestrial Radio Access (E-UTRA); Physical layer procedures (Release 9)," Jun. 2010, 80 pages.
3GPP TS 36.213 V10.1.0, "3rd Generation Partnership Project; Technical Specification Group Radio Access Network; Evolved Universal Terrestrial Radio Access (E-UTRA); Physical layer procedures (Release 10)," Mar. 2011, 7 pages.
CATT, "Equalization of ACK/NAK bit performance in LTE-A," R1-104314, 3GPP TSG RAN WG1 Meeting #62, Agenda Item: 6.2.2.1, Madrid, Spain, Aug. 23-27, 2010, 3 pages.
CATT, LG Electronics, Qualcomm Incorporated, ZTE, "ACK/NACK Multiplexing Simulation Assumptions in Rel-10," R1-104140, TSG-RAN WG1 Meeting #61bis, Dresden, Germany, Jun. 28-Jul. 2, 2010, 25 pages.
Ericsson, ST-Ericsson, "A/N transmission in the uplink for carrier aggregation," R1-100909, 3GPP TSG-RAN WG1 #60, Agenda Item: 7.1.6, San Francisco, USA, Feb. 22-26, 2010, 4 pages.
Extended European Search Report dated Aug. 19, 2013, for corresponding European Patent Application No. 11824732.9, 9 pages.
Fujitsu, "Channel Selection for A/N feedback in CA," R1-104875, 3GPP TSG-RAN1 #62, Agenda Item: 6.2.2.1, Madrid, Spain, Aug. 23-27, 2010, 5 pages.
Huawei, "ACK/NACK mapping for channel selection," R1-104497, 3GPP TSG RAN WG1 Meeting #62, Agenda Item: 6.2.2.1, Madrid, Spain, Aug. 23-27, 2010, 5 pages.
International Search Report dated Nov. 22, 2011, for corresponding International Application No. PCT/JP2011/004943, 4 pages.
LG Electronics, "Further details of ACK/NACK selection method," R1-104641, 3GPP TSG RAN WG1 #62, Agenda Item: 6.2.2.1, Madrid, Spain, Aug. 23-27, 2010, 8 pages.
LG Electronics, "PUCCH resource allocation for ACK/NACK," R1-106129, 3GPP TSG RAN WG1 #63, Agenda Item: 6.2.1.1, Jacksonville, USA, Nov. 15-19, 2010, 7 pages.
LG Electronics, "Resource allocation for ACK/NACK PUCCH," R1-103728, *11155 3GPP TSG RAN WG1 #61bis, Agenda Item: 6.2.4.1, Dresden, Germany, Jun. 28-Jul. 2, 2010, 6 pages.
Nakao et al., "Performance enhancement of E-UTRA uplink control channel in fast fading environments," IEEE 69th Vehicular Technology Conference, VTC Spring, Apr. 26-29, 2009, 5 pages.
NTT Docomo, "Mapping Table Rel. 10 Channel Selection for CA," R1-104926, 3GPP TSG RAN WG1 Meeting #62, Agenda Item: 6.2.2.1, Madrid, Spain, Aug. 23-27, 2010, pp. 1-5.
Oizumi et al., "ACK/NACK Mapping Table for LTE-Advanced," 2011 IEICE General Conference, 5 pages. (with English Translation).
Panasonic, "Mapping Tables for Format 1b with Channel Selection," R1-105476, Agenda Item: 6.2.1.1 Remaining details for A/N transmission, 3GPP TSG RAN WG1 Meeting #62bis, Xi'an China, Oct. 11-15, 2010, 7 pages.
Panasonic, "Support of UL ACK/NACK channel selection for carrier aggregation," R1-102022, Agenda Item: 6.2.4.1 Method(s) for A/N multiplexing, 3GPP TSG RAN WG1 Meeting #60bis, Beijing, China, Apr. 12-16, 2010, 6 pages.
Panasonic, "Support of UL ACK/NACK channel selection for carrier aggregation," R1-102856, 3GPP TSG RAN WG1 Meeting #61, Agenda Item: 6.2.4.1 Method(s) for A/N multiplexing, Montreal, Canada, May 10-14, 2010, pp. 1-6.
Panasonic, "Text Proposal for PUCCH Resource Allocation for channel selection," R1-110192, 3GPP TSG RAN WG1 Meeting #63 bis, Agenda Item: 6.2.1 Remaining details for Carrier Aggregation, Dublin, Ireland, Jan. 17-21, 2011, pp. 1-3.
Panasonic, "UL ACK/NACK transmission on PUCCH for carrier aggregation," R1-091744, 3GPP TSG-RAN WG1 Meeting #57, Agenda Item: 15.4, San Francisco, USA, May 4-8, 2009, 3 pages.
Samsung, Catt, ERTI, Panasonic, Ericsson, ST-Ericsson, LG-Ericsson, LGE, InterDigital, MediaTek, Huawei, NTT DOCOMO, Potevio, Alcatel-Lucent, Alcatel-Lucent Shanghai Bell, RIM, Sharp, "Way Forward on PUCCH Resource Allocation," R1-105040, 3GPP TSG RAN WG1 Meeting #62, Agenda Item: 6.2.2.3, Madrid, Spain, Aug. 23-27, 2010, 2 pages.
Singapore Search and Examination Report dated May 26, 2014, for corresponding SG Application No. 201301784-3, 16 pages.
Texas Instruments, "Resource Allocation for A/N Transmission on PUCCH," R1-104466, 3GPP TSG RAN WG1 #62, Agenda Item: 6.2.2.3, Madrid, Spain, Aug. 23-27, 2010, 4 pages.
ZTE, "Uplink Control Channel Design for LTE-Advanced," R1-091702, TSG-RAN WG1 #57, Agenda Item: 15.4, San Francisco, USA, May 4-8, 2009, 6 pages.
Samsung, "UL HARQ-ACK Multiplexing: Mapping for 4 Bits," R1-103638, Agenda item: 6.2.4.1, 3GPP TSG RAN WG1 #61 bis, Dresden, Germany, Jun. 28-Jul. 2, 2010, 3 pages.

Table 5-1: 2 ACK/NAK Bits

|  | Ch1 | | Ch2 | |
| --- | --- | --- | --- | --- |
|  | RS | Data | RS | Data |
| N, N | 1 | 1 | 0 | 0 |
| A, N | 1 | -1 | 0 | 0 |
| N, A | 0 | 0 | 1 | 1 |
| A, A | 0 | 0 | -1 | -1 |

Table 5-2: 3 ACK/NAK Bits

|  | Ch1 | | Ch2 | |
| --- | --- | --- | --- | --- |
|  | RS | Data | RS | Data |
| N, N, N | 1 | 1 | 0 | 0 |
| N, N, A | 1 | -j | 0 | 0 |
| N, A, N | 1 | j | 0 | 0 |
| N, A, A | 1 | -1 | 0 | 0 |
| A, N, N | 0 | 0 | 1 | 1 |
| A, N, A | 0 | 0 | 1 | -j |
| A, A, N | 0 | 0 | 1 | j |
| A, A, A | 0 | 0 | 1 | -1 |

- Data applied to SC-FDMA symbols 0, 1, 5, 6
- RS applied to SC-FDMA symbols 2, 3, 4
- Repeated transmission in two slots

FIG. 7

Table 6: 4 ACK/NAK Bits

| | Ch1 | | Ch2 | | Ch3 | | Ch4 | |
|---|---|---|---|---|---|---|---|---|
| | RS | Data | RS | Data | RS | Data | RS | Data |
| N,N,N,N | 1 | 1 | 0 | 0 | 0 | 0 | 0 | 0 |
| N,N,N,A | 1 | -1 | 0 | 0 | 0 | 0 | 0 | 0 |
| N,N,A,N | 1 | -1 | 0 | 0 | 0 | 0 | 0 | 0 |
| N,N,A,A | 1 | -1 | 1 | 0 | 0 | 0 | 0 | 0 |
| N,A,N,N | 0 | 0 | 1 | 1 | 0 | 0 | 0 | 0 |
| N,A,N,A | 0 | 0 | 1 | -1 | 0 | 0 | 0 | 0 |
| N,A,A,N | 0 | 0 | 1 | -1 | 1 | 0 | 0 | 0 |
| N,A,A,A | 0 | 0 | 0 | -1 | 1 | -1 | 0 | 0 |
| A,N,N,N | 0 | 0 | 0 | 0 | 1 | -1 | 0 | 0 |
| A,N,N,A | 0 | 0 | 0 | 0 | 1 | 0 | 0 | 0 |
| A,N,A,N | 0 | 0 | 0 | 0 | 0 | -1 | 0 | 0 |
| A,N,A,A | 0 | 0 | 0 | 0 | 0 | -1 | 0 | 0 |
| A,A,N,N | 0 | 0 | 0 | 0 | 0 | 0 | 1 | 0 |
| A,A,N,A | 0 | 0 | 0 | 0 | 0 | 0 | 1 | -1 |
| A,A,A,N | 0 | 0 | 0 | 0 | 0 | 0 | 1 | -1 |
| A,A,A,A | 0 | 0 | 0 | 0 | 0 | 0 | 1 | -1 |

FIG. 8

Figure 5 Mapping rules in case that four DL CCs are configured (Alternative 1-2)

| PCell | SCell | PUCCH RESOURCE | | | |
|---|---|---|---|---|---|
| | | 1 | 2 | 3 | 4 |
| A,A | A,A | | -1 | | |
| A,N | A,A | | | -1 | |
| N,A | A,A | | -1 | | |
| N,N | A,A | | | | -1 |
| A,A | A,N | | -1 | | |
| A,N | A,N | | | 1 | |
| N,A | A,N | | | -1 | -1 |
| N,N | A,N | | | -1 | 1 |
| A,A | N,A | | | | |
| A,N | N,A | | | | |
| N,A | N,A | | | | |
| N,N | N,A | | | | |
| A,A | N,N | -1 | | | |
| A,N | N,N | -1 | | | |
| N,A | N,N | -1 | | | |
| N,N | N,N | 1 | | | |
| A,A | D,D | | | | |
| A,N | D,D | | | | |
| N,A | D,D | | | | -1 |
| N,N | D,D | | | | 1 |
| D,D | A,A | | | | 1 |
| D,D | A,N | No transmission | | | |
| D,D | N,A | No transmission | | | |
| D,D | N,N | | | | |
| D,D | D,D | | | | |

FIG. 15

| SDM Cell | non-SDM Cell | PUCCH RESOURCE | | |
|---|---|---|---|---|
| | | 1 | 2 | 3 |
| A,A | A | | −1 | |
| A,N | A | | −j | |
| N,A | A | | −j | |
| N,N | A | | | −1 |
| A,A | N | −1 | | |
| A,N | N | −j | | |
| N,A | N | −1 | | |
| N,N | N | −j | | |
| A,A | D | 1 | | |
| A,N | D | | | 1 |
| N,A | D | | | |
| N,N | D | | | |
| D,D | A | | −1 | |
| D,D | N | | | −1 |
| D,D | D | No transmission | | |

FIG. 18

| SDM Cell | non-SDM Cell | PUCCH RESOURCE 1 | PUCCH RESOURCE 2 | PUCCH RESOURCE 3 |
|---|---|---|---|---|
| A,A | A |  | −1 |  |
| A,N | A |  | −j |  |
| N,A | A |  | −j |  |
| N,N | A |  |  | −1 |
| A,A | N | −1 |  |  |
| A,N | N | −j |  |  |
| N,A | N | −j |  |  |
| N,N | N |  |  | 1 |
| A,A | D | −1 |  |  |
| A,N | D | −j |  |  |
| N,A | D | −j |  |  |
| N,N | D | 1 |  |  |
| D,D | A |  |  | −1 |
| D,D | N |  |  | 1 |
| D,D | D | No transmission |  |  |

FIG. 21

| SDM Cell | non-SDM Cell | PUCCH RESOURCE | | |
|---|---|---|---|---|
| | | 1 | 2 | 3 |
| A,A | A | −1 | | |
| A,N | A | 1 | | |
| N,A | A | | −1 | |
| N,N | A | | | −1 |
| A,A | N | 1 | | |
| A,N | N | | 1 | |
| N,A | N | | −1 | |
| N,N | N | | 1 | |
| A,A | D | | 1 | |
| A,N | D | | −1 | |
| N,A | D | No transmission | | |
| N,N | D | | | |
| D,D | A | | | −1 |
| D,D | N | | | 1 |
| D,D | D | No transmission | | |

FIG. 23

| PCell | SCell | PUCCH resource | |
|---|---|---|---|
| | | 1 | 2 |
| A | A | 1 | 1 |
| A | N | -1 | |
| N | A | 1 | -1 |
| N | N | | -1 |
| D | A | No transmission | |
| D | N | -1 | |
| A | D | 1 | |
| N | D | | |
| D | D | No transmission | |

FIG. 24

| SDM Cell | non-SDM | PUCCH resource | | |
|---|---|---|---|---|
| | | 1 | 2 | 3 |
| A,A | A | | -1 | |
| A,N | A | | -j | |
| N,A | A | | -j | |
| N,N | A | | | -1 |
| A,A | N | -1 | | |
| A,N | N | -j | | |
| N,A | N | -j | | |
| N,N | N | | | 1 |
| A,A | D | -1 | | |
| A,N | D | -j | | |
| N,A | D | | | |
| N,N | D | 1 if PCell is SDM configured, No transmission if PCell is non-SDM configured | | |
| D,D | A | | | -1 |
| D,D | N | | | 1 if PCell is SDM configured  No transmission if PCell is non-SDM configured |
| D,D | D | No transmission | | |

FIG. 25

| PCell | SCell | PUCCH resource | | | |
|---|---|---|---|---|---|
| | | 1 | 2 | 3 | 4 |
| A,A | A,A | | −1 | | |
| A,N | A,A | | | −1 | −j |
| N,A | A,A | | −j | | |
| N,N | A,A | | j | | 1 |
| A,A | A,N | | 1 | | |
| A,N | A,N | | | j | |
| N,A | A,N | | | 1 | −1 |
| N,N | A,N | | | −j | −j |
| A,A | N,A | −1 | | | |
| A,N | N,A | −j | | | |
| N,A | N,A | j | | | |
| N,N | N,A | 1 | | | |
| A,A | N,N | −j | | | |
| A,N | N,N | j | | | |
| N,A | N,N | −j | | | |
| N,N | N,N | 1 | | | |
| A,A | D,D | | | | |
| A,N | D,D | | | | |
| N,A | D,D | | | | |
| N,N | D,D | | | | |
| D,D | A,A | | | −1 | |
| D,D | A,N | | | j | |
| D,D | N,A | | | −j | |
| D,D | N,N | No transmission | | | |
| D,D | D,D | No transmission | | | |

FIG. 26

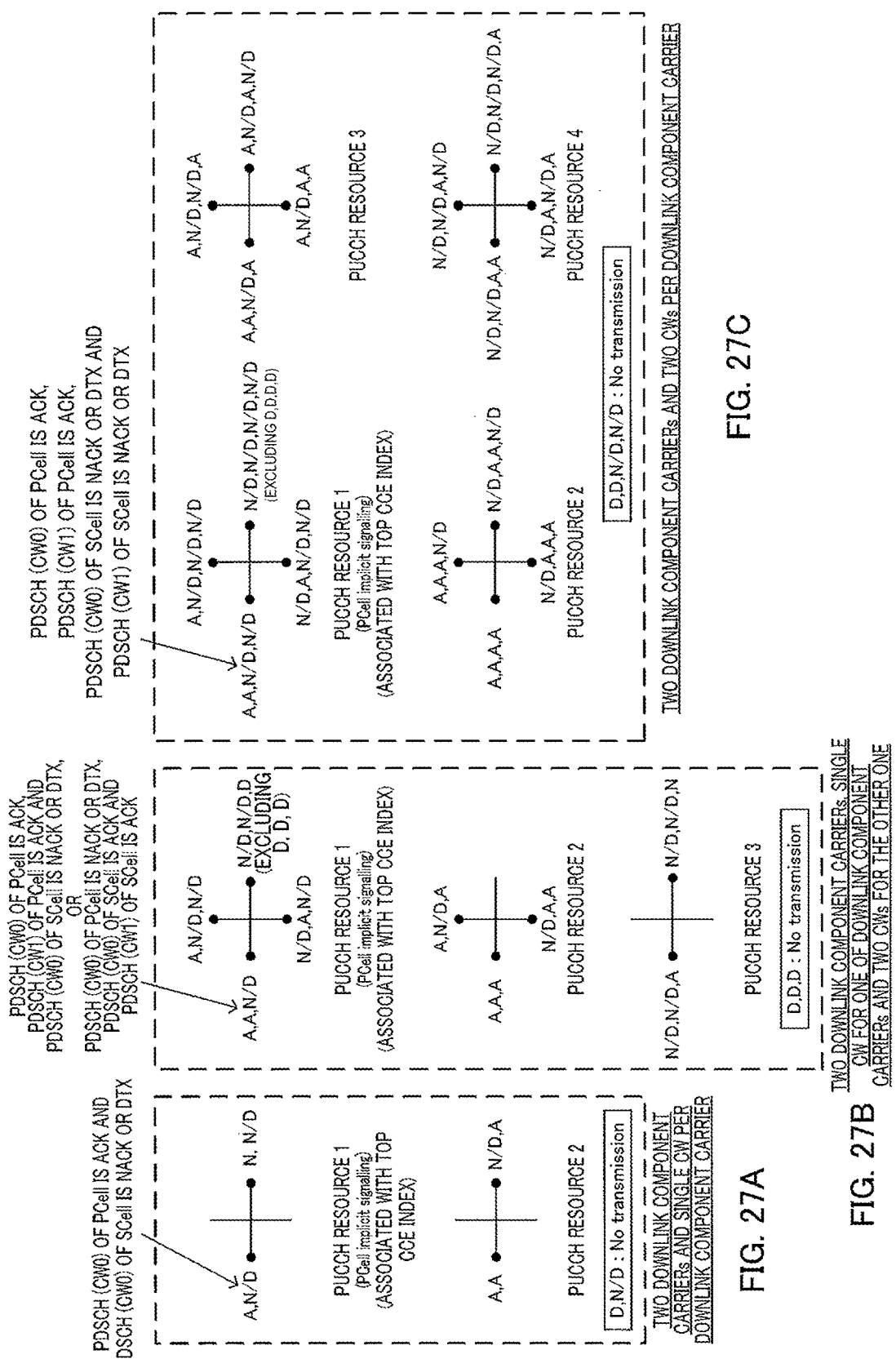

FIG. 28A — MAPPING TABLE WHEN NUMBER OF ACK/NACK BITS IS TWO

| ACK/NACK state | | ACK/NACK resource | |
|---|---|---|---|
| b0 | b1 | Ch1 | Ch2 |
| A | A |  | −1 |
| A | N/D | −1 |  |
| N/D | A |  | +1 |
| N | N/D | +1 |  |
| D | N/D | No transmission | |

PCell: b0 | SCell: b1

FIG. 28B — MAPPING TABLE WHEN NUMBER OF ACK/NACK BITS IS THREE

| ACK/NACK state | | | ACK/NACK resource | | |
|---|---|---|---|---|---|
| b0 | b1 | b2 | Ch1 | Ch2 | Ch3 |
| A | A | A |  | −1 |  |
| A | N/D | A |  | +j |  |
| A | A | N/D | −j |  |  |
| A | N/D | N/D | −1 |  |  |
| N/D | A | A |  | −1 |  |
| N/D | N/D | A | +j |  |  |
| N/D | A | N/D | +1 |  |  |
| N | N/D | N/D | +1 |  |  |
| D | D | D | No transmission | | |

PCell: b0 | SCell: b1, b2

CELL IN WHICH TRANSMISSION MODE SUPPORTING UP TO TWO-CW TRANSMISSION IS CONFIGURED (MIMO Cell)

FIG. 28C — MAPPING TABLE WHEN NUMBER OF ACK/NACK BITS IS FOUR

| ACK/NACK state | | | | ACK/NACK resource | | | |
|---|---|---|---|---|---|---|---|
| b0 | b1 | b2 | b3 | Ch1 | Ch2 | Ch3 | Ch4 |
| A | A | A | A |  | −1 |  |  |
| A | N/D | A | A |  | −j |  |  |
| N/D | A | A | A |  | +j |  |  |
| A | A | N/D | A |  | +1 |  |  |
| A | A | A | N/D |  |  | −1 |  |
| N/D | N/D | A | A |  |  | −j |  |
| A | N/D | N/D | A |  |  | +j |  |
| N/D | A | A | N/D |  |  |  | −j |
| A | N/D | A | N/D |  |  |  | +j |
| A | A | N/D | N/D | −1 |  |  |  |
| N/D | N/D | N/D | A | −j |  |  |  |
| N/D | N/D | A | N/D | +1 |  |  |  |
| D | N | N/D | N/D | +1 |  |  |  |
| D | D | N/D | N/D | No transmission | | | |

PCell: b0, b1 | SCell: b2, b3

CELL IN WHICH TRANSMISSION MODE SUPPORTING SINGLE-CW TRANSMISSION IS CONFIGURED (non-MIMO Cell)

| Configured CWs on PCell | Configured CWs on SCell1 | Configured CWs on SCell2 | Configured CWs on SCell3 | Number of ACK/NACK |
|---|---|---|---|---|
| 1 | 1 | - | - | 2 |
| 1 | 2 | - | - | 3 |
| 2 | 1 | - | - | 3 |
| 2 | 2 | - | - | 4 |
| 1 | 1 | 1 | - | 3 |
| 1 | 1 | 2 | - | 4 |
| 1 | 2 | 1 | - | 4 |
| 2 | 1 | 1 | - | 4 |
| 1 | 1 | 1 | 1 | 4 |

2CCs (rows 1-4), 3CCs (rows 5-8), 4CCs (row 9)

FIG. 29

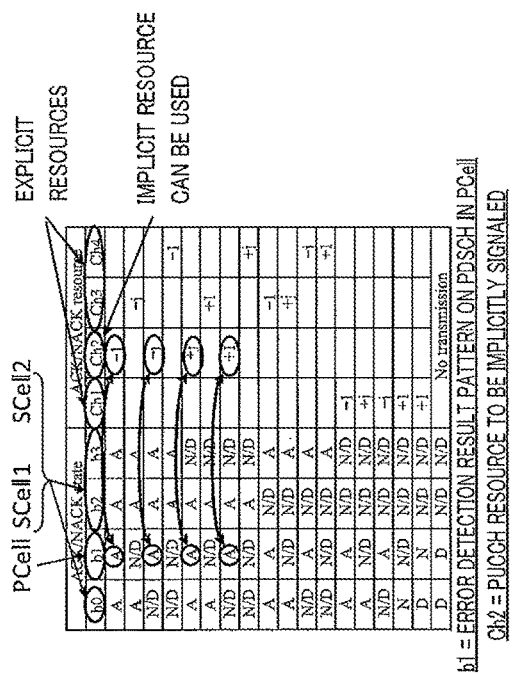
FIG. 34B
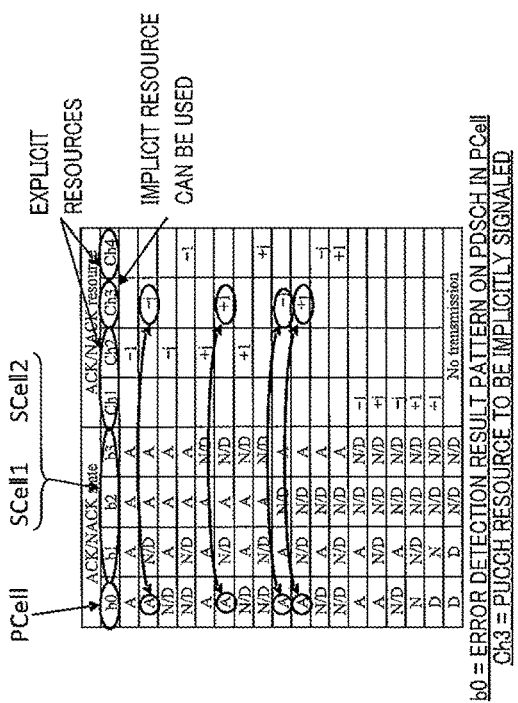
FIG. 34A
FIG. 34C

COMMUNICATION APPARATUS AND RETRANSMISSION CONTROL METHOD

BACKGROUND

Technical Field

The claimed invention relates to a terminal apparatus and a retransmission control method.

Description of the Related Art

3GPP LTE employs Orthogonal Frequency Division Multiple Access (OFDMA) as a downlink communication scheme. In radio communication systems to which 3GPP LTE is applied, base stations transmit synchronization signals (i.e., Synchronization Channel: SCH) and broadcast signals (i.e., Broadcast Channel: BCH) using predetermined communication resources. Meanwhile, each terminal finds an SCH first and thereby ensures synchronization with a base station. Subsequently, the terminal reads BCH information to acquire base station-specific parameters (see, Non-Patent Literatures (hereinafter, abbreviated as NPL) 1, 2 and 3).

In addition, upon completion of the acquisition of the base station-specific parameters, each terminal sends a connection request to the base station to thereby establish a communication link with the base station. The base station transmits control information via Physical Downlink Control CHannel (PDCCH) as appropriate to the terminal with which a communication link has been established.

The terminal performs "blind-determination" on each of a plurality of pieces of control information included in the received PDCCH signals (i.e., Downlink (DL) Assignment Control Information: also referred to as Downlink Control Information (DCI)). To put it more specifically, each piece of the control information includes a Cyclic Redundancy Check (CRC) part and the base station masks this CRC part using the terminal ID of the transmission target terminal. Accordingly, until the terminal demasks the CRC part of the received piece of control information with its own terminal ID, the terminal cannot determine whether or not the piece of control information is intended for the terminal. In this blind-determination, if the result of demasking the CRC part indicates that the CRC operation is OK, the piece of control information is determined as being intended for the terminal.

Moreover, in 3GPP LTE, Automatic Repeat Request (ARQ) is applied to downlink data to terminals from a base station. To put it more specifically, each terminal feeds back response signals indicating the result of error detection on the downlink data to the base station. Each terminal performs a CRC on the downlink data and feeds back Acknowledgment (ACK) when CRC=OK (no error) or Negative Acknowledgment (NACK) when CRC=Not OK (error) to the base station as response signals. An uplink control channel such as Physical Uplink Control Channel (PUCCH) is used to feed back the response signals (i.e., ACK/NACK signals (hereinafter, may be referred to as "A/N," simply)).

The control information to be transmitted from a base station herein includes resource assignment information including information on resources assigned to the terminal by the base station. As described above, PDCCH is used to transmit this control information. The PDCCH includes one or more L1/L2 control channels (L1/L2 CCH). Each L1/L2 CCH consists of one or more Control Channel Elements (CCE). To put it more specifically, a CCE is the basic unit used to map the control information to PDCCH. Moreover, when a single L1/L2 CCH consists of a plurality of CCEs (2, 4 or 8), a plurality of contiguous CCEs starting from a CCE having an even index are assigned to the L1/L2 CCH. The base station assigns the L1/L2 CCH to the resource assignment target terminal in accordance with the number of CCEs required for reporting the control information to the resource assignment target terminal. The base station maps the control information to physical resources corresponding to the CCEs of the L1/L2 CCH and transmits the mapped control information.

In addition, CCEs are associated with component resources of PUCCH (hereinafter, may be referred to as "PUCCH resource") in a one-to-one correspondence. Accordingly, a terminal that has received an L1/L2 CCH identifies the component resources of PUCCH that correspond to the CCEs forming the L1/L2 CCH and transmits response signals to the base station using the identified resources. However, when the L1/L2 CCH occupies a plurality of contiguous CCEs, the terminal transmits the response signals to the base station using a PUCCH component resource corresponding to a CCE having a smallest index among the plurality of PUCCH component resources respectively corresponding to the plurality of CCEs (i.e., PUCCH component resource associated with a CCE having an even numbered CCE index). In this manner, the downlink communication resources are efficiently used.

As illustrated in FIG. 1, a plurality of response signals transmitted from a plurality of terminals are spread using a Zero Auto-correlation (ZAC) sequence having the characteristic of zero autocorrelation in time-domain, a Walsh sequence and a discrete Fourier transform (DFT) sequence, and are code-multiplexed in a PUCCH. In FIG. 1, ($W_0$, $W_1$, $W_2$, $W_3$) represent a length-4 Walsh sequence and ($F_0$, $F_1$, $F_2$) represent a length-3 DFT sequence. As illustrated in FIG. 1, ACK or NACK response signals are primary-spread over frequency components corresponding to 1 SC-FDMA symbol by a ZAC sequence (length-12) in frequency-domain. To put it more specifically, the length-12 ZAC sequence is multiplied by a response signal component represented by a complex number. Subsequently, the ZAC sequence serving as the response signals and reference signals after the primary-spread is secondary-spread in association with each of a Walsh sequence (length-4: $W_0$-$W_3$ (may be referred to as Walsh Code Sequence)) and a DFT sequence (length-3: $F_0$-$F_2$). To put it more specifically, each component of the signals of length-12 (i.e., response signals after primary-spread or ZAC sequence serving as reference signals (i.e., Reference Signal Sequence) is multiplied by each component of an orthogonal code sequence (i.e., orthogonal sequence: Walsh sequence or DFT sequence). Moreover, the secondary-spread signals are transformed into signals of length-12 in the time-domain by inverse fast Fourier transform (IFFT). A CP is added to each signal obtained by IFFT processing, and the signals of one slot consisting of seven SC-FDMA symbols are thus formed.

The response signals from different terminals are spread using ZAC sequences each corresponding to a different cyclic shift value (i.e., index) or orthogonal code sequences each corresponding to a different sequence number (i.e., orthogonal cover index (OC index)). An orthogonal code sequence is a combination of a Walsh sequence and a DFT sequence. In addition, an orthogonal code sequence is referred to as a block-wise spreading code in some cases. Thus, base stations can demultiplex the code-multiplexed plurality of response signals using the related art despreading and correlation processing (see, NPL 4).

However, it is not necessarily true that each terminal succeeds in receiving downlink assignment control signals because the terminal performs blind-determination in each subframe to find downlink assignment control signals intended for the terminal. When the terminal fails to receive the downlink assignment control signals intended for the terminal on a certain downlink component carrier, the terminal would not even know whether or not there is downlink data intended for the terminal on the downlink component carrier. Accordingly, when a terminal fails to receive the downlink assignment control signals intended for the terminal on a certain downlink component carrier, the terminal generates no response signals for the downlink data on the downlink component carrier. This error case is defined as discontinuous transmission of ACK/NACK signals (DTX of response signals) in the sense that the terminal transmits no response signals.

In 3GPP LTE systems (may be referred to as "LTE system," hereinafter), base stations assign resources to uplink data and downlink data, independently. For this reason, in the 3GPP LTE system, terminals (i.e., terminals compliant with LTE system (hereinafter, referred to as "LTE terminal")) encounter a situation where the terminals need to transmit uplink data and response signals for downlink data simultaneously in the uplink. In this situation, the response signals and uplink data from the terminals are transmitted using time-division multiplexing (TDM). As described above, the single carrier properties of transmission waveforms of the terminals are maintained by the simultaneous transmission of response signals and uplink data using TDM.

In addition, as illustrated in FIG. 2, the response signals (i.e., "A/N") transmitted from each terminal partially occupy the resources assigned to uplink data (i.e., Physical Uplink Shared CHannel (PUSCH) resources) (i.e., response signals occupy some SC-FDMA symbols adjacent to SC-FDMA symbols to which reference signals (RS) are mapped) and are thereby transmitted to a base station in time-division multiplexing (TDM). In FIG. 2, however, "subcarriers" in the vertical axis of the drawing are also termed as "virtual subcarriers" or "time contiguous signals," and "time contiguous signals" that are collectively inputted to a discrete Fourier transform (DFT) circuit in a SC-FDMA transmitter are represented as "subcarriers" for convenience. To put it more specifically, optional data of the uplink data is punctured due to the response signals in the PUSCH resources. Accordingly, the quality of uplink data (e.g., coding gain) is significantly reduced due to the punctured bits of the coded uplink data. For this reason, base stations instruct the terminals to use a very low coding rate and/or to use very large transmission power so as to compensate for the reduced quality of the uplink data due to the puncturing.

Meanwhile, the standardization of 3GPP LTE-Advanced for realizing faster communications than 3GPP LTE has started. 3GPP LTE-Advanced systems (may be referred to as "LTE-A system," hereinafter) follow 3GPP LTE systems (may be referred to as "LTE system," hereinafter). 3GPP LTE-Advanced is expected to introduce base stations and terminals capable of communicating with each other using a wideband frequency of 40 MHz or greater to realize a downlink transmission rate up to 1 Gbps or above.

In the LTE-A system, in order to simultaneously achieve backward compatibility with the LTE system and ultra-high-speed communications several times faster than transmission rates in the LTE system, the LTE-A system band is divided into "component carriers" of 20 MHz or below, which is the bandwidth supported by the LTE system. In other words, the "component carrier" is defined herein as a band having a maximum width of 20 MHz and as the basic unit of communication band. Moreover, "component carrier" in downlink (hereinafter, referred to as "downlink component carrier") is defined as a band obtained by dividing a band according to downlink frequency bandwidth information in a BCH broadcasted from a base station or as a band defined by a distribution width when a downlink control channel (PDCCH) is distributed in the frequency domain. In addition, "component carrier" in uplink (hereinafter, referred to as "uplink component carrier") may be defined as a band obtained by dividing a band according to uplink frequency band information in a BCH broadcasted from a base station or as the basic unit of a communication band of 20 MHz or below including a Physical Uplink Shared CHannel (PUSCH) in the vicinity of the center of the bandwidth and PUCCHs for LTE on both ends of the band. In addition, the term "component carrier" may be also referred to as "cell" in English in 3GPP LTE-Advanced.

The LTE-A system supports communications using a band obtained by aggregating several component carriers, so called "carrier aggregation." In general, throughput requirements for uplink are different from throughput requirements for downlink. For this reason, so called "asymmetric carrier aggregation" has been also discussed in the LTE-A system. In asymmetric carrier aggregation, the number of component carriers configured for any terminal compliant with the LTE-A system (hereinafter, referred to as "LTE-A terminal") differs between uplink and downlink. In addition, the LTE-A system supports a configuration in which the numbers of component carriers are asymmetric between uplink and downlink, and the component carriers have different frequency bandwidths.

FIG. 3 is a diagram provided for describing asymmetric carrier aggregation and a control sequence applied to individual terminals. FIG. 3 illustrates a case where the bandwidths and numbers of component carriers are symmetric between the uplink and downlink of base stations.

As illustrated in FIG. 3B, a configuration in which carrier aggregation is performed using two downlink component carriers and one uplink component carrier on the left is set for terminal 1, while a configuration in which the two downlink component carriers identical with those used by terminal 1 are used but uplink component carrier on the right is used for uplink communications is set for terminal 2.

Referring to terminal 1, an LTE-A base station and an LTE-A terminal included in the LTE-A system transmit and receive signals to and from each other in accordance with the sequence diagram illustrated in FIG. 3A. As illustrated in FIG. 3A, (1) terminal 1 is synchronized with the downlink component carrier on the left when starting communications with the base station and reads information on the uplink component carrier paired with the downlink component carrier on the left from a broadcast signal called system information block type 2 (SIB2). (2) Using this uplink component carrier, terminal 1 starts communications with the base station by transmitting, for example, a connection request to the base station. (3) Upon determining that a plurality of downlink component carriers need to be assigned to the terminal, the base station instructs the terminal to add a downlink component carrier. However, in this case, the number of uplink component carriers is not increased, and terminal 1, which is an individual terminal, starts asymmetric carrier aggregation.

In addition, in the LTE-A system to which carrier aggregation is applied, a terminal may receive a plurality of pieces of downlink data on a plurality of downlink component carriers at a time. In LTE-A, studies have been carried out on channel selection (also referred to as "multiplexing"), bundling and a discrete Fourier transform spread orthogonal frequency division multiplexing (DFT-S-OFDM) format as a method of transmitting a plurality of response signals for the plurality of pieces of downlink data. In channel selection, not only symbol points used for response signals, but also the resources to which the response signals are mapped are varied in accordance with the pattern for results of the error detection on the plurality of pieces of downlink data. Compared with channel selection, in bundling, ACK or NACK signals generated according to the results of error detection on the plurality of pieces of downlink data are bundled (i.e., bundled by calculating a logical AND of the results of error detection on the plurality of pieces of downlink data, provided that ACK=1 and NACK=0), and response signals are transmitted using one predetermine resource. In transmission using the DFT-S-OFDM format, a terminal jointly encodes (i.e., joint coding) the response signals for the plurality of pieces of downlink data and transmits the coded data using the format (see, NPL 5). For example, a terminal may feed back the response signals (i.e., ACK/NACK) using channel selection, bundling or DFT-S-OFDM according to the number of bits for a pattern for results of error detection. Alternatively, a base station may previously configure the method of transmitting the response signals.

More specifically, channel selection is a technique that varies not only the phase points (i.e., constellation points) for the response signals but also the resources used for transmission of the response signals (may be referred to as "PUCCH resource," hereinafter) on the basis of whether the results of error detection on the plurality of pieces of downlink data received on the plurality of downlink component carriers are each an ACK or NACK as illustrated in FIG. 4. Meanwhile, bundling is a technique that bundles ACK/NACK signals for the plurality of pieces of downlink data into a single set of signals and thereby transmits the bundled signals using one predetermined resource (see, NPLs 6 and 7). Hereinafter, the set of the signals formed by bundling ACK/NACK signals for a plurality of pieces of downlink data into a single set of signals may be referred to as "bundled ACK/NACK signals."

The following two methods are considered as a possible method of transmitting response signals in uplink when a terminal receives downlink assignment control information via a PDCCH and receives downlink data.

One of the methods is to transmit response signals using a PUCCH resource associated in a one-to-one correspondence with a control channel element (CCE) occupied by the PDCCH (i.e., implicit signaling) (hereinafter, method 1). More specifically, when DCI intended for a terminal served by a base station is allocated in a PDCCH region, each PDCCH occupies a resource consisting of one or a plurality of contiguous CCEs. In addition, as the number of CCEs occupied by a PDCCH (i.e., the number of aggregated CCEs: CCE aggregation level), one of aggregation levels 1, 2, 4 and 8 is selected according to the number of information bits of the assignment control information or a propagation path condition of the terminal, for example.

The other method is to previously report a PUCCH resource to each terminal from a base station (i.e., explicit signaling) (hereinafter, method 2). To put it differently, each terminal transmits response signals using the PUCCH resource previously reported by the base station in method 2.

In addition, as illustrated in FIG. 4, one of the two downlink component carriers is paired with one uplink component carrier to be used for transmission of response signals. The downlink component carrier paired with the uplink component carrier to be used for transmission of response signals is called a primary component carrier (PCC) or a primary cell (PCell). In addition, the downlink component carrier other than the primary component carrier is called a secondary component carrier (SCC) or a secondary cell (SCell). For example, PCC (or PCell) is the downlink component carrier used to transmit broadcast information about the uplink component carrier on which response signals to be transmitted (e.g., system information block type 2 (SIB 2)).

In method 2, PUCCH resources common to a plurality of terminals (e.g., four PUCCH resources) may be previously reported to the terminals from a base station. For example, terminals may employ a method to select one PUCCH resource to be actually used, on the basis of a transmit power control (TPC) command of two bits included in DCI in SCell. In this case, the TPC command is called an ACK/NACK resource indicator (ARI). Such a TPC command allows a certain terminal to use an explicitly signaled PUCCH resource in a certain frame while allowing another terminal to use the same explicitly signaled PUCCH resource in another subframe in the case of explicit signaling.

Meanwhile, in channel selection, a PUCCH resource in an uplink component carrier associated in a one-to-one correspondence with the top CCE index of the CCEs occupied by the PDCCH indicating the PDSCH in PCC (PCell) (i.e., PUCCH resource in PUCCH region 1 in FIG. 4) is assigned (implicit signaling).

Next, a description will be provided regarding ARQ control using channel selection when the asymmetric carrier aggregation described above is applied to terminals with reference to FIGS. 4 and 5.

In a case where a component carrier group (may be referred to as "component carrier set" in English) consisting of downlink component carrier 1 (PCell), downlink component carrier 2 (SCell) and uplink component carrier 1 is configured for terminal 1 as illustrated in FIG. 4, after downlink resource assignment information is transmitted via a PDCCH of each of downlink component carriers 1 and 2, downlink data is transmitted using the resource corresponding to the downlink resource assignment information.

In channel selection, when terminal 1 succeeds in receiving the downlink data on component carrier 1 (PCell) but fails to receive the downlink data on component carrier 2 (SCell) (i.e., when the result of error detection on component carrier 1 (PCell) is an ACK and the result of error detection on component carrier 2 (SCell) is a NACK), the response signals are mapped to a PUCCH resource in PUCCH region 1 to be implicitly signaled, while a first phase point (e.g., phase point (1, 0) and/or the like) is used as the phase point of the response signals. In addition, when terminal 1 succeeds in receiving the downlink data on component carrier 1 (PCell) and also succeeds in receiving the downlink data on component carrier 2 (SCell), the response signals are mapped to a PUCCH resource in PUCCH region 2 while the first phase point is used. More specifically, when the number of downlink component carriers is two while there is a single codeword (CW) per downlink component carrier, the results of error detection are represented in four patterns (i.e., ACK/ACK, ACK/NACK, NACK/ACK and NACK/NACK). The four patterns can be represented by combinations of two PUCCH resources and two kinds of phase points (e.g., binary phase shift keying (BPSK) mapping).

In addition, when terminal 1 fails to receive DCI on component carrier 1 (PCell) but succeeds in receiving downlink data on component carrier 2 (SCell) (i.e., the result of error detection on component carrier 1 (PCell) is a DTX and the result of error detection on component carrier 2 (SCell) is an ACK), the CCEs occupied by the PDCCH intended for terminal 1 cannot be identified. Thus, the PUCCH resource included in PUCCH region 1 and associated in a one-to-one correspondence with the top CCE index of the CCEs cannot be identified either. Accordingly, in this case, in order to report an ACK, which is the result of error detection on component carrier 2, the response signals need to be mapped to an explicitly signaled PUCCH resource included in PUCCH region 2 (may be referred to as "to support implicit signaling," hereinafter).

To be more specific, FIG. 5 illustrates examples of mapping of patterns for the results of error detection in the following cases: when there are two downlink component carriers (one PCell and one SCell), and
  (a) Single CW per downlink component carrier;
  (b) Single CW for one of the downlink component carriers, and two CWs for the other; and
  (c) Two CWs per downlink component carrier. The number of patterns for results of error detection for (a) is four (i.e., 2²=4). The number of patterns for (b) is eight (i.e., 2³=8). The number of patterns for (c) is 16 (i.e., 2⁴=16). The number of PUCCH resources required for mapping all the patterns is at least one for (a), at least two for (b) and at least four for (c) when the phase difference between phase points is a minimum of 90 degrees (i.e., when a maximum of four patterns per PUCCH resource is mapped).

In FIG. 5A, one PUCCH resource is sufficient when mapping is performed using QPSK because there are only four patterns for results of error detection. However, in order to improve the degree of freedom in mapping and the error rate in reporting response signals to the base station, BPSK mapping may be carried out using two PUCCH resources as illustrated in FIG. 5A. In the mapping illustrated in FIG. 5A, the base station can determine the result of error detection on component carrier 2 (SCell) only by determining in which one of the PUCCH resources the response signals are reported.

Meanwhile, the base station cannot determine the result of error detection on component carrier 1 (PCell) only by determining in which one of the PUCCH resources the response signals are reported. The base station can determine whether the result of error detection is an ACK or NACK further by determining to which pattern on BPSK the response signals are mapped.

As described, the method used by the base station to determine response signals varies depending on the mapping method. As a result, the error rate characteristics vary for each set of response signals. To put it differently, determining the ACK or NACK by only determining in which one of the PUCCH resources the response signals are reported (hereinafter, may be referred to as "determination method 1") has fewer errors than determining the ACK or NACK by determining in which one of the PUCCH resources the response signals are reported and further determining the phase point of the PUCCH resource (hereinafter, may be referred to as "determination method 2").

Likewise, in FIG. 5B, the error rate characteristics of the set of response signals for CW0 of component carrier 1 (PCell) indicate fewer errors than the error rate characteristics of the other two sets of response signals. In FIG. 5C, the error rate characteristics of the response signals for two CWs (CW0, CW1) of component carrier 1 (PCell) indicate fewer errors than the error rate characteristics of the response signals for two CWs (CW0, CW1) of component carrier 2 (SCell).

Meanwhile, there is a period in which the understanding about the number of CCs configured for a terminal is different between a base station and the terminal (i.e., uncertainty period or misalignment period). The base station notifies the terminal of a message indicating reconfiguration to change the number of CCs, and upon reception of the message, the terminal understands that the number of CCs has been changed and notifies the base station of a completion message for the reconfiguration of the number of CCs. The period in which the understanding about the number of CCs configured for a terminal is different between a base station and the terminal stems from the fact that the base station understands, upon reception of the message, for the first time, that the number of CCs configured for the terminal has been changed.

For example, when the terminal understands that the number of CCs configured for the terminal is one while the base station understands that the number of CCs configured for the terminal is two, the terminal transmits response signals for the data that has been received by the terminal, using the mapping pattern for the result of error detection corresponding to one CC. Meanwhile, the base station determines the response signals from the terminal for the data that has been transmitted to the terminal, using the mapping pattern for the results of error detection corresponding to two CCs.

When the number of CCs is one, the mapping pattern for a result of error detection for one CC that is used in the LTE system is used (may be referred to as "LTE fallback," hereinafter) in order to ensure backward compatibility with the LTE system. More specifically, when one CC performs single-CW processing, an ACK is mapped to the phase point (−1, 0) and a NACK is mapped to the phase point (1, 0) using BPSK mapping (may be referred to as "fallback to Format 1a," hereinafter) as illustrated in FIG. 6A. As illustrated in 6B, when one CC performs two-CW processing, ACK/ACK, ACK/NACK, NACK/ACK and NACK/NACK are mapped to the phase points (−1, 0), (0, 1), (0, −1), and (1, 0), respectively, using QPSK mapping (may be referred to as "fallback to Format 1b," hereinafter).

To be more specific, a description will be provided using an example of a case where the base station transmits one piece of single-CW data on PCell and one piece of single-CW data on SCell using the two CCs when the terminal understands that the number of CCs configured for the terminal is one while the base station understands that the number of CCs configured for the terminal is two. Since the terminal understands that the number of CCs configured for the terminal is one, the terminal receives only PCell. When succeeding in receiving the downlink data in PCell, the terminal maps the response signals using the mapping illustrated in FIG. 6A to the PUCCH resource in the uplink component carrier (PUCCH resource 1) associated in a one-to-one correspondence with the top CCE index of the CCEs occupied by the PDCCH indicating the PDSCH in PCell (i.e., implicitly signaled). In short, the terminal uses the phase point (−1, 0). Meanwhile, the base station determines the response signals using the mapping illustrated in FIG. 5A since the base station understands that the number of CCs configured for the terminal is two. In other words, the base station can determine that single CW of PCell is an ACK and single CW of SCell is a NACK or DTX because of the phase point (−1, 0) of PUCCH resource 1. Likewise, when failing to receive the downlink data in PCell, the terminal needs to map the response signals to the phase point (1, 0).

The same applies to the case where the way the understanding about the number of CCs is different between the base station and the terminal is opposite to the case described above. To put it more specifically, this case is where the base station transmits one piece of single-CW data on PCell to the terminal using the one CC when the terminal understands that the number of CCs configured for the terminal is two while the base station understands that the number of CCs configured for the terminal is one. Since the terminal understands that the number of CCs configured for the terminal is two, the terminal receives PCell and SCell. When the terminal succeeds in receiving the downlink data in PCell, the base station expects to receive, using the mapping illustrated in FIG. 6A, the response signals mapped to the phase point (−1, 0) of the PUCCH resource in the uplink component carrier (PUCCH resource 1) associated in a one-to-one correspondence with the top CCE index of the CCEs occupied by the PDCCH indicating the PDSCH in PCell (implicitly signaled). Accordingly, although the terminal understands that the number of CCs is two, the terminal needs to map the response signals to the phase point (−1, 0) of PUCCH resource 1 as illustrated in FIG. 5A when single CW of PCell is an ACK and SCell is a DTX. Likewise, when failing to receive the downlink data in PCell, the terminal needs to map the response signals to the phase point (1, 0).

As described above, even when the understanding about the number of CCs configured for a terminal is different between a base station and the terminal, the response signals on PCell and SCell need to be correctly determined (may be referred to as "to support LTE fallback," hereinafter).

FIG. 5A supports LTE fallback. More specifically, FIG. 5A supports LTE fallback to PUCCH format 1a. FIG. 5B does not support LTE fallback because A/A/D is not mapped to the phase point (−1, 0) of PUCCH resource 1 when PCell performs two-CW processing and SCell performs single-CW processing. More specifically, FIG. 5B does not support LTE fallback to PUCCH format 1a. In addition, FIG. 5B does not support LTE fallback because A/D/D is not mapped to the phase point (−1, 0) of PUCCH resource 1, A/N/D is not mapped to the phase point (0, 1) of PUCCH resource 1, and N/A/D is not mapped to the phase point (0, −1) either when PCell performs single-CW processing and SCell performs two-CW processing. More specifically, FIG. 5B does not support LTE fallback to PUCCH format 1b. FIG. 5C does not support LTE fallback because A/A/D/D is not mapped to the phase point (−1, 0) of PUCCH resource 1, A/N/D/D is not mapped to the phase point (0, 1) of PUCCH resource 1, and N/A/D/D is not mapped to the phase point (0, −1) of PUCCH resource 1 either. More specifically, FIG. 5C does not support LTE fallback to PUCCH format 1b.

In the mapping method disclosed in Non-Patent Literature (hereinafter, abbreviated as NPL) 8 (may be referred to as "transmission rule table" or "mapping table") (FIGS. 7 and 8), two ACK/NACK bits (may be referred to as "HARQ-ACK" bit) (correspond to b0 and b1 in NPL 9) in case of "four ACK/NACK Bits" in FIG. 8, for example, can be always determined by determination method 1. However, the remaining two ACK/NACK bits (corresponding to b2 and b3 in NPL 9) in the "four ACK/NACK Bits" in FIG. 8 are always determined by determination method 2. An evaluation result using the abovementioned mapping is disclosed in NPL 9, and it can be seen that NACK-to-ACK characteristics of b2 and b3 are poor as compared with b0 and b1.

In the mapping method disclosed in NPL 10 (FIG. 9), the number of PUCCH resources that can be determined by determination method 1 is smoothed out among the bits. More specifically, it is possible to determine b3 in PUCCH 1, b0 and b1 in PUCCH 2, b1 and b2 in PUCCH 3, and b3 in PUCCH 4 by determination method 1. In FIG. 9, the number of PUCCH resources that can be determined by determination method 1 for each bit is one with b0, two with b1, one with b2 and two with b3. Furthermore, NPL 10 discloses nothing about associations between PUCCH 1 and b0, PUCCH 2 and b1, PUCCH 3 and b2, and PUCCH 4 with b3, but if they are associated with each other, implicit signaling for an optional ACK/NACK bit is supported in NPL 10. However, this mapping cannot support LTE fallback in two CCs.

CITATION LIST

Non-Patent Literatures

NPL 1 3GPP TS 36.211 V9.1.0, "Physical Channels and Modulation (Release 9)," March 2010

NPL 2 3GPP TS 36.212 V9.2.0, "Multiplexing and channel coding (Release 9)," June 2010

NPL 3 3GPP TS 36.213 V9.2.0, "Physical layer procedures (Release 9)," June 2010

NPL 4 Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009

NPL 5 Ericsson and ST-Ericsson, "A/N transmission in the uplink for carrier aggregation," R1-100909, 3GPP TSG-RAN WG1 #60, February 2010

NPL 6 ZTE, 3GPP RAN1 meeting #57, R1-091702, "Uplink Control Channel Design for LTE-Advanced," May 2009

NPL 7 Panasonic, 3GPP RAN1 meeting #57, R1-091744, "UL ACK/NACK transmission on PUCCH for Carrier aggregation," May 2009

NPL 8 CATT, LG Electronics, Qualcomm Incorporated, ZTE, 3GPP RAN1 meeting, R1-104140, "ACK/NACK Multiplexing Simulation Assumptions in Rel-10," June 2010

NPL 9 CATT, 3GPP RANI meeting, R1-104314, "Equalization of ACK/NACK bit performance in LTE-A," August 2010

NPL 10 Panasonic, 3GPP RANI meeting #61, R1-102856, "Support of UL ACK/NACK channel selection for carrier aggregation," May 2010

BRIEF SUMMARY

Technical Problem

In the channel selection described above, the method used by the base station to determine response signals varies depending on the mapping method. As a result, the error rate characteristics vary for each set of response signals.

In the case where the error rate characteristics vary for each set of response signals, larger transmission power is required even for a terminal having strict restrictions on its transmission power when the terminal transmits response signals having poor error rate characteristics to the base station. In addition, the increase in transmission power in this case causes an increase in interference to other terminals.

In addition, as described above, the PUCCH resource in the uplink component carrier (e.g., PUCCH resource in PUCCH region 1 in FIG. 4) needs to be associated in a one-to-one correspondence with the top CCE index of the CCEs occupied by the PDCCH indicating the PDSCH in PCC (PCell) (implicit signaling) in channel selection. When a terminal fails to receive the PDCCH indicating the PDSCH intended for the terminal in PCell, the terminal cannot identify the PUCCH resource in the uplink component carrier associated in a one-to-one correspondence with the top CCE index of the CCEs occupied by the PDCCH resulting in reception failure. For this reason, when the result of error detection on the PDSCH in PCell is a DTX, the mapping needs to be one that does not use this PUCCH resource (i.e., supporting implicit signaling).

Moreover, considering the period in which the understanding about the number of CCs configured for a terminal is different between a base station and the terminal (i.e., uncertainty period or misalignment period), the mapping has to be one that supports LTE fallback. In particular, considering that a maximum of two CCs is mostly used in the introductory phase of the LTE-A system, the mapping has to be one that supports LTE fallback when the number of CCs is two.

It is an object of the claimed invention to provide a terminal apparatus and a retransmission control method that make it possible to support LTE fallback from two CCs while improving the characteristics of response signals having poor transmission characteristics by smoothing out, among the bits, the number of PUCCH resources each allowing an ACK/NACK to be determined only by determining the PUCCH resources in which the response signals are reported in a case where ARQ is applied to communications using an uplink component carrier and a plurality of downlink component carriers associated with the uplink component carrier while CCEs in a PDCCH region in PCell are associated in a one-to-one correspondence with PUCCH resources in the uplink component carrier.

Solution to Problem

A terminal apparatus according to an aspect of the claimed invention includes: a downlink data receiving section that receives downlink data transmitted on at least one downlink data channel of a plurality of downlink component carriers; an error detecting section that detects the presence or absence of a reception error in the received downlink data; a transmission section that transmits response signals using an uplink control channel of an uplink component carrier on the basis of a result of error detection obtained by the error detecting section, in which a plurality of uplink control channel regions associated with the plurality of downlink component carriers are each defined by a resource group defined by a plurality of sequences in the same time frequency resource block, and the transmission section transmits the response signals using the uplink control channel allocated in any of the plurality of uplink control channel regions.

A retransmission control method according to an aspect of the claimed invention comprising: receiving downlink data transmitted on at least one downlink data channel of a plurality of downlink component carriers; detecting the presence or absence of a reception error in the received downlink data; and transmitting response signals using an uplink control channel of an uplink component carrier on the basis of a result of the error detection, in which a plurality of uplink control channel regions respectively associated with the plurality of downlink component carriers are each defined by a resource group defined by a plurality of sequences in the same time frequency resource block, and the response signals are transmitted using the uplink control channel allocated in any of the plurality of uplink control channel regions.

Advantageous Effects of Invention

According to the claimed invention, it is possible to support LTE fallback from two CCs while improving the characteristics of response signals having poor transmission characteristics by smoothing out, among the bits, the number of PUCCH resources each allowing an ACK/NACK to be determined only by determining the PUCCH resource in which the response signals are reported in a case where ARQ is applied to communications using an uplink component carrier and a plurality of downlink component carriers associated with the uplink component carrier while CCEs in a PDCCH region in PCell are associated in a one-to-one correspondence with PUCCH resources in the uplink component carrier.

BRIEF DESCRIPTION OF THE SEVERAL VIEWS OF THE DRAWINGS

FIG. 7 illustrates ACK/NACK mapping 1 disclosed in NPL 8;

FIG. 8 illustrates ACK/NACK mapping 2 disclosed in NPL 8;

FIG. 15 illustrates example 1 of an ACK/NACK mapping table according to Embodiment 1 of the claimed invention;

FIG. 18 illustrates example 2 of the ACK/NACK mapping table according to Embodiment 1 of the claimed invention;

FIG. 21 illustrates example 3 of the ACK/NACK mapping table according to Embodiment 1 of the claimed invention;

FIG. 23 illustrates example 4 of the ACK/NACK mapping table according to Embodiment 1 of the claimed invention;

FIG. 24 illustrates example 5 of the ACK/NACK mapping table according to Embodiment 1 of the claimed invention;

FIG. 25 illustrates example 6 of the ACK/NACK mapping table according to Embodiment 1 of the claimed invention;

FIG. 26 illustrates example 7 of the ACK/NACK mapping table according to Embodiment 1 of the claimed invention;

FIGS. 27A-27C illustrate a control example for ACK/NACK mapping according to Embodiment 2 of the claimed invention;

FIGS. 28A-28C illustrate an example of an ACK/NACK mapping table according to Embodiment 2 of the claimed invention;

FIG. 29 is a diagram representing the number of CWs on PCell and the number of CWs on SCell and the number of ACK/NACK bits with each number of downlink component carriers in Embodiment 2 of the claimed invention;

FIGS. 34A-34C illustrate an example of the ACK/NACK mapping table according to Embodiment 2 of the claimed invention (case 7);

DETAILED DESCRIPTION

Description of Embodiments

Figure 1:
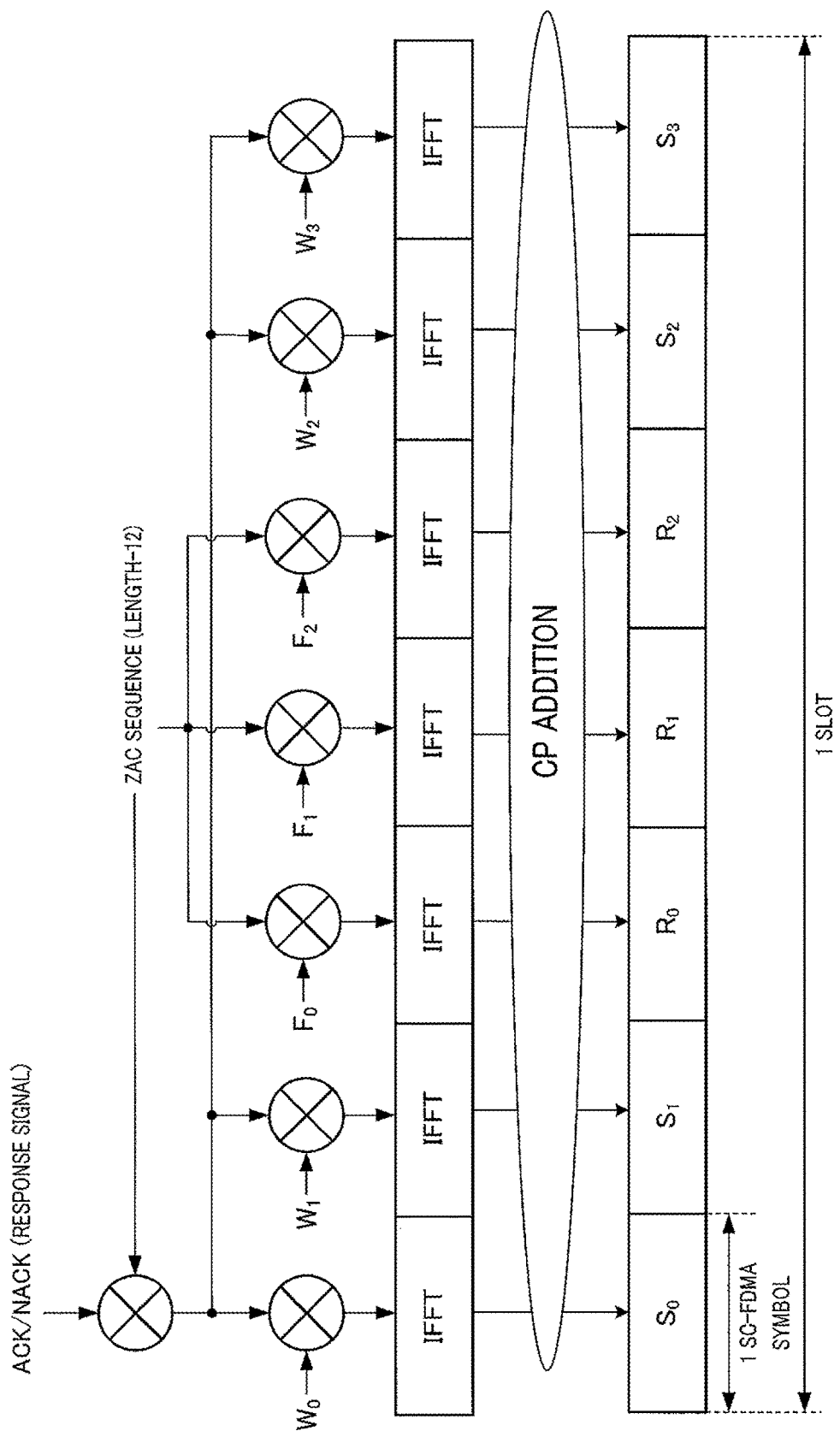
FIG. 1 is a diagram illustrating a method of spreading response signals and reference signals.
Figure 2:
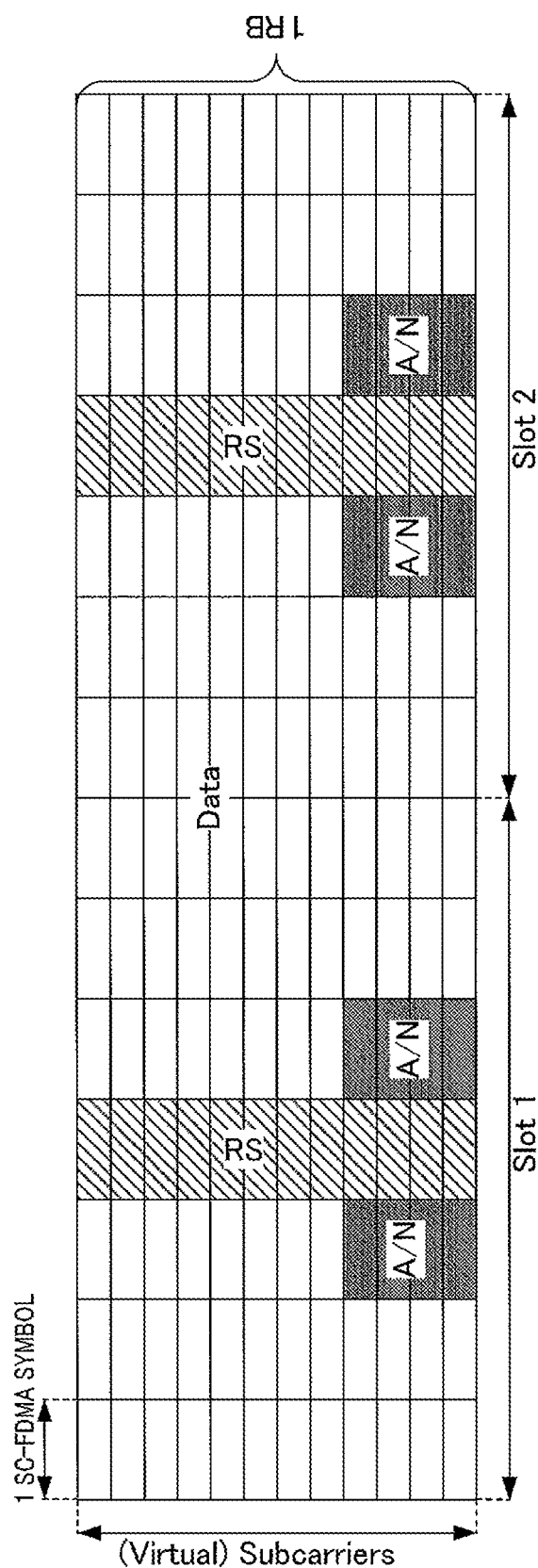
FIG. 2 is a diagram illustrating an operation related to a case where TDM is applied to response signals and uplink data on PUSCH resources.
Figure 3B:
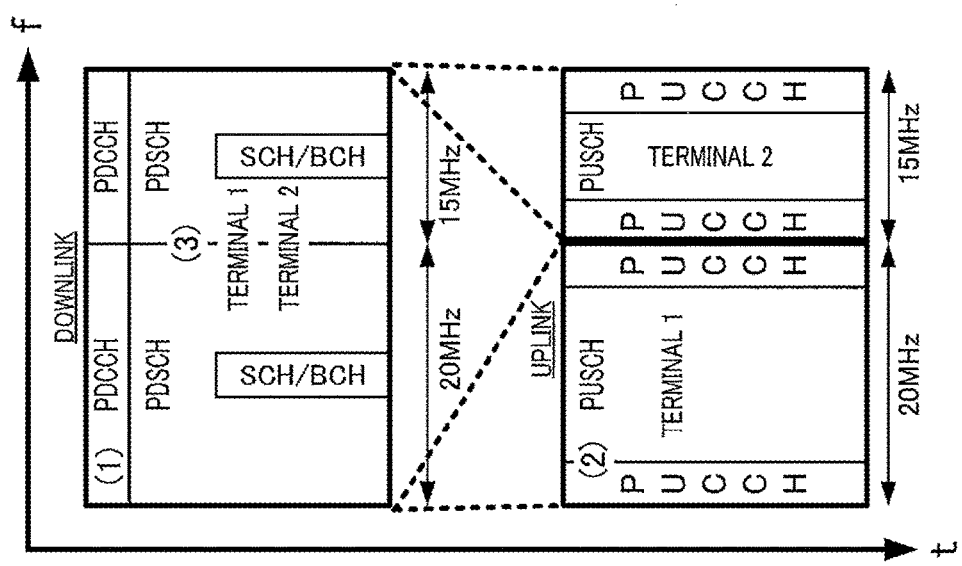
FIGS. 3A and 3B are diagrams provided for describing asymmetric carrier aggregation and a control sequence applied to individual terminals.
Figure 3A:
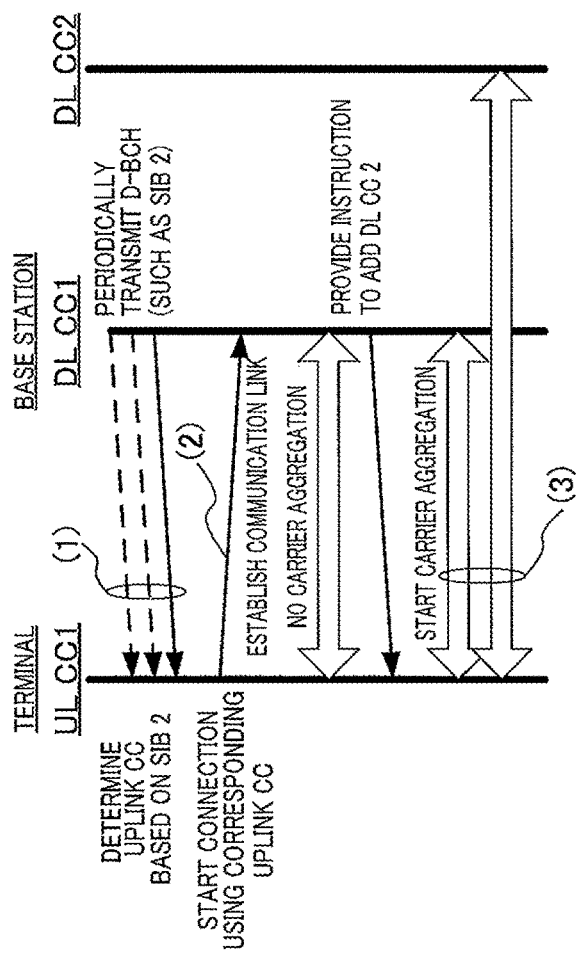
Figure 4:
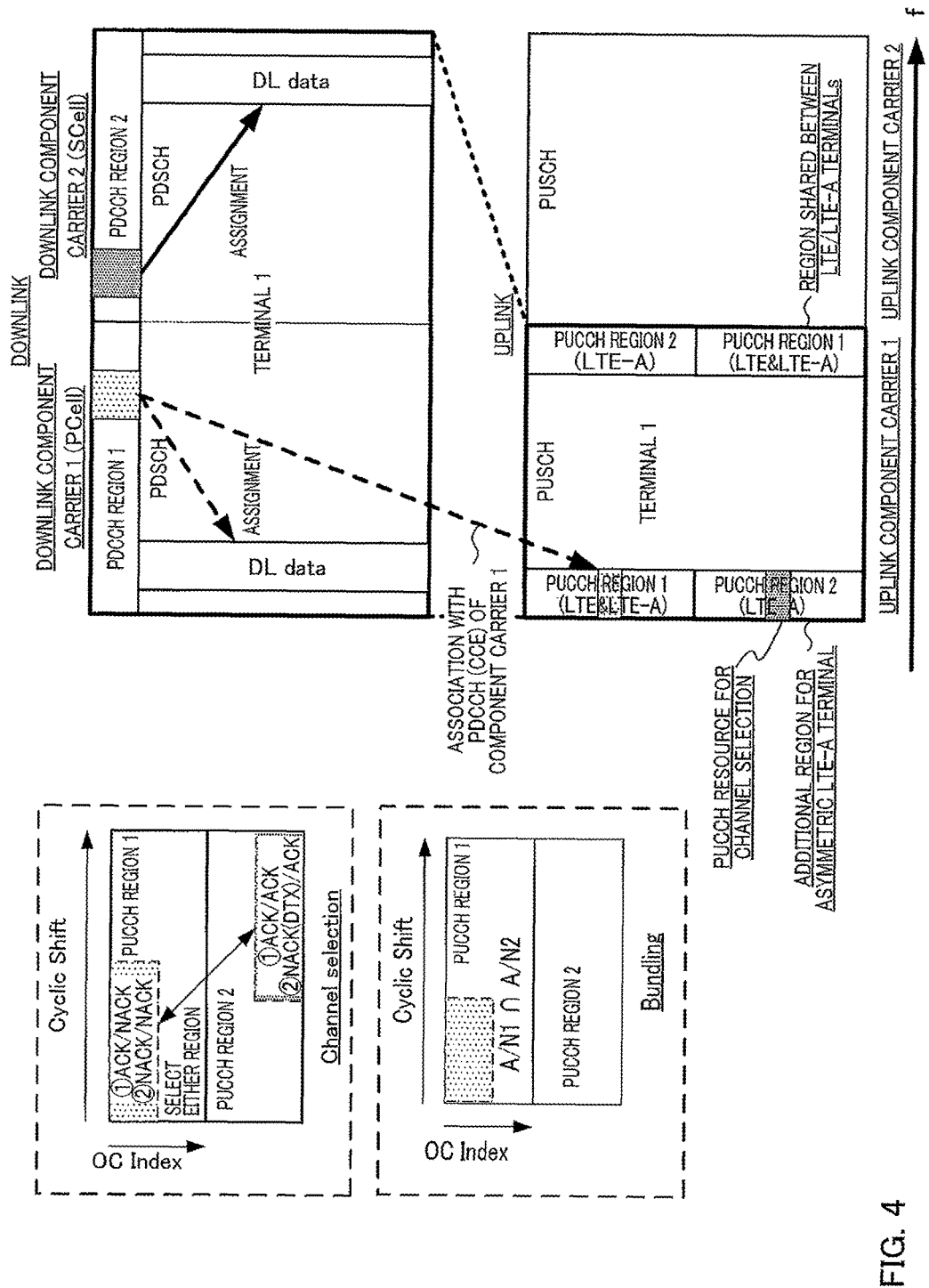
FIG. 4 is a diagram provided for describing asymmetric carrier aggregation and a control sequence applied to individual terminals.
Figure 5:
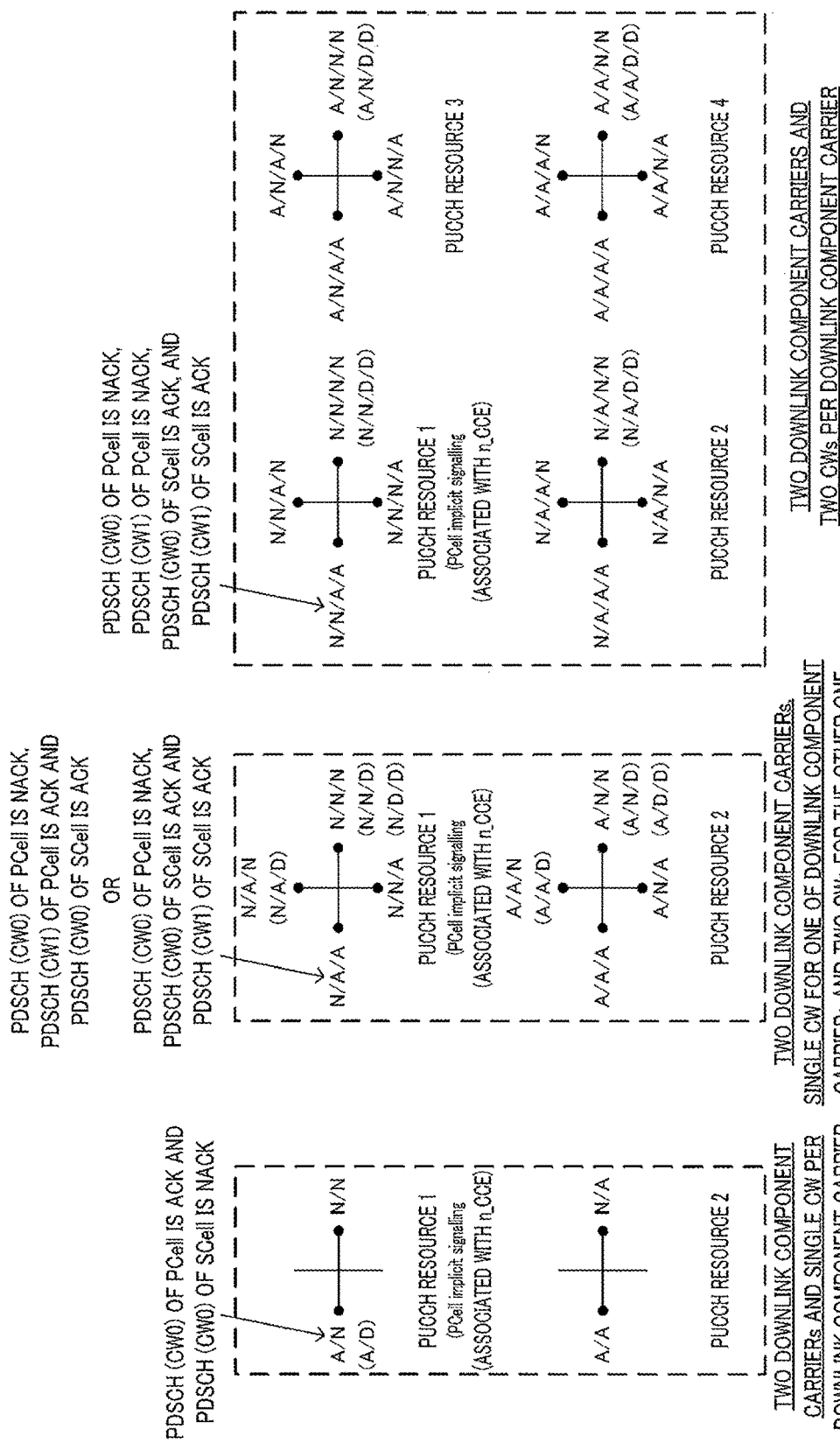
FIGS. 5A-5C represent diagram 1 provided for describing examples of ACK/NACK mapping.

Hereinafter, embodiments of the claimed invention will be described in detail with reference to the accompanying drawings. Throughout the embodiments, the same elements are assigned the same reference numerals and any duplicate description of the elements is omitted.

(Embodiment 1)

(Configuration of Base Station)

Figure 10:
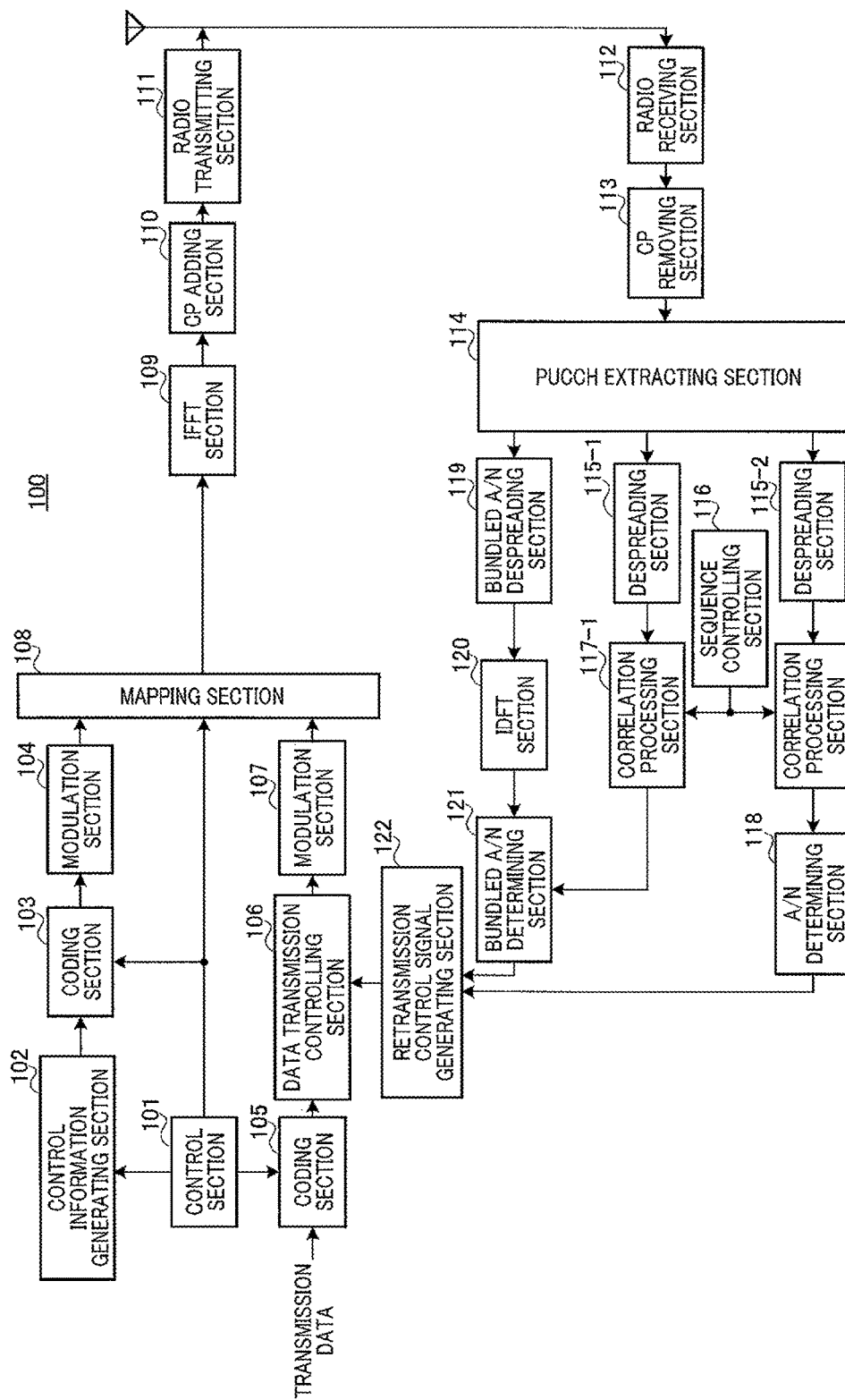
FIG. 10 is a block diagram illustrating a configuration of a base station according to Embodiment 1 of the claimed invention.

FIG. 10 is a configuration diagram of base station 100 according to Embodiment 1 of the claimed invention.

In FIG. 10, base station 100 includes control section 101, control information generating section 102, coding section 103, modulation section 104, coding section 105, data transmission controlling section 106, modulation section 107, mapping section 108, inverse fast Fourier transform (IFFT) section 109, CP adding section 110, radio transmitting section 111, radio receiving section 112, CP removing section 113, PUCCH extracting section 114, despreading section 115, sequence controlling section 116, correlation processing section 117, A/N determining section 118, bundled A/N despreading section 119, inverse discrete Fourier transform (IDFT) section 120, bundled A/N determining section 121 and retransmission control signal generating section 122.

Control section 101 assigns a downlink resource for transmitting control information (i.e., downlink control information assignment resource) and a downlink resource for transmitting downlink data (i.e., downlink data assignment resource) for a resource assignment target terminal (hereinafter, referred to as "destination terminal" or simply "terminal") 200. This resource assignment is performed in a downlink component carrier included in a component carrier group configured for resource assignment target terminal 200. In addition, the downlink control information assignment resource is selected from among the resources corresponding to downlink control channel (i.e., PDCCH) in each downlink component carrier. Moreover, the downlink data assignment resource is selected from among the resources corresponding to downlink data channel (i.e., PDSCH) in each downlink component carrier. In addition, when there are a plurality of resource assignment target terminals 200, control section 101 assigns different resources to resource assignment target terminals 200, respectively.

The downlink control information assignment resources are equivalent to L1/L2 CCH described above. To put it more specifically, the downlink control information assignment resources are each formed of one or a plurality of CCEs (or R-CCEs, and may be referred to as "CCE" simply, without any distinction between CCE and R-CCE).

Control section 101 determines the coding rate used for transmitting control information to resource assignment target terminal 200. The data size of the control information varies depending on the coding rate. Thus, control section 101 assigns a downlink control information assignment resource having the number of CCEs that allows the control information having this data size to be mapped to the resource.

Control section 101 outputs information on the downlink data assignment resource to control information generating section 102. Moreover, control section 101 outputs information on the coding rate to coding section 103. In addition, control section 101 determines and outputs the coding rate of transmission data (i.e., downlink data) to coding section 105. Moreover, control section 101 outputs information on the downlink data assignment resource and downlink control information assignment resource to mapping section 108. However, control section 101 controls the assignment in such a way that the downlink data and downlink control information for the downlink data are mapped to the same downlink component carrier.

Control information generating section 102 generates and outputs control information including the information on the downlink data assignment resource to coding section 103. This control information is generated for each downlink component carrier. In addition, when there are a plurality of resource assignment target terminals 200, the control information includes the terminal ID of each destination terminal 200 in order to distinguish resource assignment target terminals 200 from one another. For example, the control information includes CRC bits masked by the terminal ID of destination terminal 200. This control information may be referred to as "control information carrying downlink assignment" or "downlink control information (DCI)."

Coding section 103 encodes the control information using the coding rate received from control section 101 and outputs the coded control information to modulation section 104.

Modulation section 104 modulates the coded control information and outputs the resultant modulation signals to mapping section 108.

Coding section 105 uses the transmission data (i.e., downlink data) for each destination terminal 200 and the coding rate information from control section 101 as input and encodes and outputs the transmission data to data transmission controlling section 106. However, when a plurality of downlink component carriers are assigned to destination terminal 200, coding section 105 encodes each piece of transmission data to be transmitted on a corresponding one of the downlink component carriers and transmits the coded pieces of transmission data to data transmission controlling section 106.

Data transmission controlling section 106 outputs the coded transmission data to modulation section 107 and also keeps the coded transmission data at the initial transmission. Data transmission controlling section 106 keeps the coded transmission data for each destination terminal 200. In addition, data transmission controlling section 106 keeps the transmission data for one destination terminal 200 for each downlink component carrier on which the transmission data is transmitted. Thus, it is possible to perform not only retransmission control for overall data transmitted to destination terminal 200, but also retransmission control for data on each downlink component carrier.

Furthermore, upon reception of a NACK or DTX for downlink data transmitted on a certain downlink component carrier from retransmission control signal generating section 122, data transmission controlling section 106 outputs the data kept in the manner described above and corresponding to this downlink component carrier to modulation section 107. Upon reception of an ACK for the downlink data transmitted on a certain downlink component carrier from retransmission control signal generating section 122, data transmission controlling section 106 deletes the data kept in the manner described above and corresponding to this downlink component carrier.

Modulation section 107 modulates the coded transmission data received from data transmission controlling section 106 and outputs the resultant modulation signals to mapping section 108.

Mapping section 108 maps the modulation signals of the control information received from modulation section 104 to the resource indicated by the downlink control information assignment resource received from control section 101 and outputs the resultant modulation signals to IFFT section 109.

Mapping section 108 maps the modulation signals of the transmission data received from modulation section 107 to the resource (i.e., PDSCH (i.e., downlink data channel)) indicated by the downlink data assignment resource received from control section 101 (i.e., information included in the control information) and outputs the resultant modulation signals to IFFT section 109.

The control information and transmission data mapped to a plurality of subcarriers in a plurality of downlink component carriers in mapping section 108 is transformed into time-domain signals from frequency-domain signals in IFFT section 109, and CP adding section 110 adds a CP to the time-domain signals to form OFDM signals. The OFDM signals undergo transmission processing such as digital to analog (D/A) conversion, amplification and up-conversion and/or the like in radio transmitting section 111 and are transmitted to terminal 200 via an antenna.

Radio receiving section 112 receives, via an antenna, the uplink response signals or reference signals transmitted from terminal 200, and performs reception processing such as down-conversion, A/D conversion and/or the like on the uplink response signals or reference signals.

CP removing section 113 removes the CP added to the uplink response signals or reference signals from the uplink response signals or reference signals that have undergone the reception processing.

PUCCH extracting section 114 extracts, from the PUCCH signals included in the received signals, the signals in the PUCCH region corresponding to the bundled ACK/NACK resource previously reported to terminal 200. The bundled ACK/NACK resource herein refers to a resource used for transmission of the bundled ACK/NACK signals and adopting the DFT-S-OFDM format structure. To put it more specifically, PUCCH extracting section 114 extracts the data part of the PUCCH region corresponding to the bundled ACK/NACK resource (i.e., SC-FDMA symbols on which the bundled ACK/NACK resource is assigned) and the reference signal part of the PUCCH region (i.e., SC-FDMA symbols on which the reference signals for demodulating the bundled ACK/NACK signals are assigned). PUCCH extracting section 114 outputs the extracted data part to bundled A/N despreading section 119 and outputs the reference signal part to despreading section 115-1.

In addition, PUCCH extracting section 114 extracts, from the PUCCH signals included in the received signals, a plurality of PUCCH regions corresponding to an A/N resource associated with a CCE that has been occupied by the PDCCH used for transmission of the downlink assignment control information (DCI), and corresponding to a plurality of A/N resources previously reported to terminal 200. The A/N resource herein refers to the resource to be used for transmission of an A/N. To put it more specifically, PUCCH extracting section 114 extracts the data part of the PUCCH region corresponding to the A/N resource (i.e., SC-FDMA symbols on which the uplink control signals are assigned) and the reference signal part of the PUCCH region (i.e., SC-FDMA symbols on which the reference signals for demodulating the uplink control signals are assigned). PUCCH extracting section 114 outputs both of the extracted data part and reference signal part to despreading section 115-2. In this manner, the response signals are received on the resource selected from the PUCCH resource associated with the CCE and the specific PUCCH resource previously reported to terminal 200.

Sequence controlling section 116 generates a base sequence that may be used for spreading each of the A/N reported from terminal 200, the reference signals for the A/N, and the reference signals for the bundled ACK/NACK signals (i.e., length-12 ZAC sequence). In addition, sequence controlling section 116 identifies a correlation window corresponding to a resource on which the reference signals may be assigned (hereinafter, referred to as "reference signal resource") in PUCCH resources that may be used by terminal 200. Sequence control section 116 outputs the information indicating the correlation window corresponding to the reference signal resource on which the reference signals may be assigned in bundled ACK/NACK resources and the base sequence to correlation processing section 117-1. Sequence controlling section 116 outputs the information indicating the correlation window corresponding to the reference signal resource and the base sequence to correlation processing section 117-1. In addition, sequence controlling section 116 outputs the information indicating the correlation window corresponding to the A/N resources on which an A/N and the reference signals for the A/N are assigned and the base sequence to correlation processing section 117-2.

Despreading section 115-1 and correlation processing section 117-1 perform processing on the reference signals extracted from the PUCCH region corresponding to the bundled ACK/NACK resource.

To put it more specifically, despreading section 115-1 despreads the reference signal part using a Walsh sequence to be used in secondary-spreading for the reference signals of the bundled ACK/NACK resource by terminal 200 and outputs the despread signals to correlation processing section 117-1.

Correlation processing section 117-1 uses the information indicating the correlation window corresponding to the reference signal resource and the base sequence and thereby finds a correlation value between the signals received from despreading section 115-1 and the base sequence that may be used in primary-spreading in terminal 200. Correlation processing section 117-1 outputs the correlation value to bundled A/N determining section 121.

Despreading section 115-2 and correlation processing section 117-2 perform processing on the reference signals and A/Ns extracted from the plurality of PUCCH regions corresponding to the plurality of A/N resources.

To put it more specifically, despreading section 115-2 despreads the data part and reference signal part using a Walsh sequence and a DFT sequence to be used in secondary-spreading for the data part and reference signal part of each of the A/N resources by terminal 200, and outputs the despread signals to correlation processing section 117-2.

Correlation processing section 117-2 uses the information indicating the correlation window corresponding to each of the A/N resources and the base sequence and thereby finds a correlation value between the signals received from despreading section 115-2 and a base sequence that may be used in primary-spreading by terminal 200. Correlation processing section 117-2 outputs each correlation value to A/N determining section 118.

A/N determining section 118 determines, on the basis of the plurality of correlation values received from correlation processing section 117-2, which of the A/N resources is used to transmit the signals from terminal 200 or none of the A/N resources is used. When determining that the signals are transmitted using one of the A/N resources from terminal 200, A/N determining section 118 performs coherent detection using a component corresponding to the reference signals and a component corresponding to the A/N and outputs the result of coherent detection to retransmission control signal generating section 122. Meanwhile, when determining that terminal 200 uses none of the A/N resources, A/N determining section 118 outputs the determination result indicating that none of the A/N resources is used to retransmission control signal generating section 122. The details of mapping of an A/N phase point used in A/N determination will be described, hereinafter.

Bundled A/N despreading section 119 despreads, using a DFT sequence, the bundled ACK/NACK signals corresponding to the data part of the bundled ACK/NACK resource received from PUCCH extracting section 114 and outputs the despread signals to IDFT section 120.

IDFT section 120 transforms the bundled ACK/NACK signals in the frequency-domain received from bundled A/N despreading section 119 into time-domain signals by IDFT processing and outputs the bundled ACK/NACK signals in the time-domain to bundled A/N determining section 121.

Bundled A/N determining section 121 demodulates the bundled ACK/NACK signals corresponding to the data part of the bundled ACK/NACK resource received from IDFT section 120, using the reference signal information on the bundled ACK/NACK signals that is received from correlation processing section 117-1. In addition, bundled A/N determination section 121 decodes the demodulated bundled ACK/NACK signals and outputs the result of decoding to retransmission control signal generating section 122 as the bundled A/N information. However, when the correlation value received from correlation processing section 117-1 is smaller than a threshold, and bundled A/N determining section 121 thus determines that terminal 200 does not use any bundled A/N resource to transmit the signals, bundled A/N determining section 121 outputs the result of determination to retransmission control signal generating section 122.

Retransmission control signal generating section 122 determines whether or not to retransmit the data transmitted on the downlink component carrier (i.e., downlink data) on the basis of the information received from bundled A/N determining section 121 and the information received from A/N determining section 118 and generates retransmission control signals based on the result of determination. To put it more specifically, when determining that downlink data transmitted on a certain downlink component carrier needs to be retransmitted, retransmission control signal generating section 122 generates retransmission control signals indicating a retransmission command for the downlink data and outputs the retransmission control signals to data transmission controlling section 106. In addition, when determining that the downlink data transmitted on a certain downlink component carrier does not need to be retransmitted, retransmission control signal generating section 122 generates retransmission control signals indicating not to retransmit the downlink data transmitted on the downlink component carrier and outputs the retransmission control signals to data transmission controlling section 106.

(Configuration of Terminal)

Figure 11:
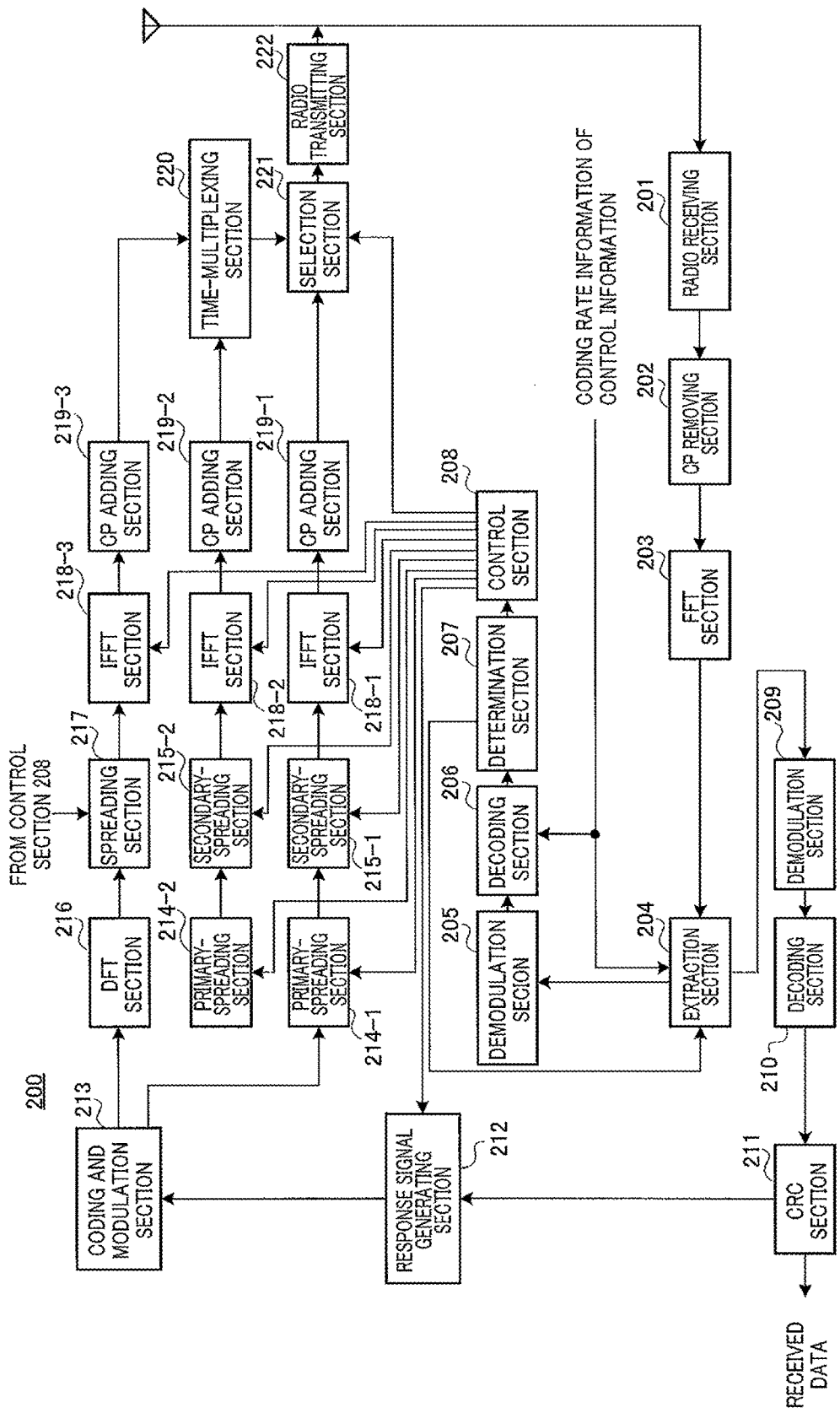
FIG. 11 is a block diagram illustrating a configuration of a terminal according to Embodiment 1 of the claimed invention.

FIG. 11 is a block diagram illustrating a configuration of terminal 200 according to Embodiment 1. In FIG. 11, terminal 200 includes radio receiving section 201, CP removing section 202, fast Fourier transform (FFT) section 203, extraction section 204, demodulation section 205, decoding section 206, determination section 207, control section 208, demodulation section 209, decoding section 210, CRC section 211, response signal generating section 212, coding and modulation section 213, primary-spreading sections 214-1 and 214-2, secondary-spreading sections 215-1 and 215-2, DFT section 216, spreading section 217, IFFT sections 218-1, 218-2 and 218-3, CP adding sections 219-1, 219-2 and 219-3, time-multiplexing section 220, selection section 221 and radio transmitting section 222.

Radio receiving section 201 receives, via an antenna, OFDM signals transmitted from base station 100 and performs reception processing such as down-conversion, A/D conversion and/or the like on the received OFDM signals. It should be noted that, the received OFDM signals include PDSCH signals assigned to a resource in a PDSCH (i.e., downlink data), or PDCCH signals assigned to a resource in a PDCCH.

CP removing section 202 removes a CP that has been added to the OFDM signals from the OFDM signals that have undergone the reception processing.

FFT section 203 transforms the received OFDM signals into frequency-domain signals by FFT processing and outputs the resultant received signals to extraction section 204.

Extraction section 204 extracts, from the received signals to be received from FFT section 203, downlink control channel signals (i.e., PDCCH signals) in accordance with coding rate information to be received. To put it more specifically, the number of CCEs (or R-CCEs) forming a downlink control information assignment resource varies depending on the coding rate. Thus, extraction section 204 uses the number of CCEs that corresponds to the coding rate as units of extraction processing, and extracts downlink control channel signals. In addition, the downlink control channel signals are extracted for each downlink component carrier. The extracted downlink control channel signals are outputted to demodulation section 205.

Extraction section 204 extracts downlink data (i.e., downlink data channel signals (i.e., PDSCH signals)) from the received signals on the basis of information on the downlink data assignment resource intended for terminal 200 to be received from determination section 207 to be described, hereinafter, and outputs the downlink data to demodulation section 209. As described above, extraction section 204 receives the downlink assignment control information (i.e., DCI) mapped to the PDCCH and receives the downlink data on the PDSCH.

Demodulation section 205 demodulates the downlink control channel signals received from extraction section 204 and outputs the obtained result of demodulation to decoding section 206.

Decoding section 206 decodes the result of demodulation received from demodulation section 205 in accordance with the received coding rate information and outputs the obtained result of decoding to determination section 207.

Determination section 207 performs blind-determination (i.e., monitoring) to find out whether or not the control information included in the result of decoding received from decoding section 206 is the control information intended for terminal 200. This determination is made in units of decoding results corresponding to the units of extraction processing. For example, determination section 207 demasks the CRC bits by the terminal ID of terminal 200 and determines that the control information resulted in CRC=OK (no error) as the control information intended for terminal 200. Determination section 207 outputs information on the downlink data assignment resource intended for terminal 200, which is included in the control information intended for terminal 200, to extraction section 204.

In addition, when detecting the control information (i.e., downlink assignment control information) intended for terminal 200, determination section 207 informs control section 208 that ACK/NACK signals will be generated (or are present). Moreover, when detecting the control information intended for terminal 200 from PDCCH signals, determination section 207 outputs information on a CCE that has been occupied by the PDCCH to control section 208.

Control section 208 identifies the A/N resource associated with the CCE on the basis of the information on the CCE received from determination section 207. Control section 208 outputs, to primary-spreading section 214-1, a base sequence and a cyclic shift value corresponding to the A/N resource associated with the CCE or the A/N resource previously reported by base station 100, and also outputs a Walsh sequence and a DFT sequence corresponding to the A/N resource to secondary-spreading section 215-1. In addition, control section 208 outputs the frequency resource information on the A/N resource to IFFT section 218-1.

When determining to transmit bundled ACK/NACK signals using a bundled ACK/NACK resource, control section 208 outputs the base sequence and cyclic shift value corresponding to the reference signal part (i.e., reference signal resource) of the bundled ACK/NACK resource previously reported by base station 100 to primary-despreading section 214-2 and outputs a Walsh sequence to secondary-despreading section 215-2. In addition, control section 208 outputs the frequency resource information on the bundled ACK/NACK resource to IFFT section 218-2.

Control section 208 outputs a DFT sequence used for spreading the data part of the bundled ACK/NACK resource to spreading section 217 and outputs the frequency resource information on the bundled ACK/NACK resource to IFFT section 218-3.

Control section 208 selects the bundled ACK/NACK resource or the A/N resource and instructs selection section 221 to output the selected resource to radio transmitting section 222. Moreover, control section 208 instructs response signal generating section 212 to generate the bundled ACK/NACK signals or the ACK/NACK signals in accordance with the selected resource. The method of determining the A/N resource (i.e., PUCCH resource) in control section 208 will be described in detail, hereinafter.

Demodulation section 209 demodulates the downlink data received from extraction section 204 and outputs the demodulated downlink data to decoding section 210.

Decoding section 210 decodes the downlink data received from demodulation section 209 and outputs the decoded downlink data to CRC section 211.

CRC section 211 performs error detection on the decoded downlink data received from decoding section 210, for each downlink component carrier using CRC and outputs an ACK when CRC=OK (no error) or outputs a NACK when CRC=Not OK (error) to response signal generating section 212. Moreover, CRC section 211 outputs the decoded downlink data as the received data when CRC=OK (no error).

Response signal generating section 212 generates response signals on the basis of the reception condition of downlink data (i.e., result of error detection on downlink data) on each downlink component carrier received from CRC section 211. To put it more specifically, when instructed to generate the bundled ACK/NACK signals from control section 208, response signal generating section 212 generates the bundled ACK/NACK signals including the results of error detection for the respective component carriers as individual pieces of data. Meanwhile, when instructed to generate ACK/NACK signals from control section 208, response signal generating section 212 generates ACK/NACK signals of one symbol. Response signal generating section 212 outputs the generated response signals to coding and modulation section 213. The details of the method of generating ACK/NACK signals in response signal generating section 212 will be described, hereinafter.

Upon reception of the bundled ACK/NACK signals, coding and modulation section 213 encodes and modulates the received bundled ACK/NACK signals to generate the modulation signals of 12 symbols and outputs the modulation signals to DFT section 216. In addition, upon reception of the ACK/NACK signals of one symbol, coding and modulation section 213 modulates the ACK/NACK signals and outputs the modulation signals to primary-spreading section 214-1.

DFT section 216 performs DFT processing on 12 time-series sets of received bundled ACK/NACK signals to obtain 12 signal components in the frequency-domain. DFT section 216 outputs the 12 signal components to spreading section 217.

Spreading section 217 spreads the 12 signal components received from DFT section 216 using a DFT sequence indicated by control section 208 and outputs the spread signal components to IFFT section 218-3.

Primary-spreading sections 214-1 and 214-2 corresponding to the A/N resource and the reference signal resource of bundled ACK/NACK resource spread ACK/NACK signals or reference signals using a base sequence corresponding to the resource in accordance with an instruction from control section 208 and outputs the spread signals to secondary-spreading sections 215-1 and 215-2.

Secondary-spreading sections 215-1 and 215-2 spread the received primary-spread signals using a Walsh sequence or a DFT sequence in accordance with an instruction from control section 208 and outputs the spread signals to IFFT sections 218-1 and 218-2.

IFFT sections 218-1, 218-2 and 218-3 perform IFFT processing on the received signals in association with the frequency positions where the signals are to be allocated, in accordance with an instruction from control section 208. Accordingly, the signals inputted to IFFT sections 218-1, 218-2 and 218-3 (i.e., ACK/NACK signals, the reference signals of A/N resource, the reference signals of bundled ACK/NACK resource and bundled ACK/NACK signals) are transformed into time-domain signals.

CP adding sections 219-1, 219-2 and 219-3 add the same signals as the last part of the signals obtained by IFFT processing to the beginning of the signals as a CP.

Time-multiplexing section 220 time-multiplexes the bundled ACK/NACK signals received from CP adding section 219-3 (i.e., signals transmitted using the data part of the bundled ACK/NACK resource) and the reference signals of the bundled ACK/NACK resource to be received from CP adding section 219-2 on the bundled ACK/NACK resource and outputs the multiplexed signals to selection section 221.

Selection section 221 selects one of the bundled ACK/NACK resource received from time-multiplexing section 220 and the A/N resource received from CP adding section 219-1 and outputs the signals assigned to the selected resource to radio transmitting section 222.

Radio transmitting section 222 performs transmission processing such as D/A conversion, amplification and up-conversion and/or the like on the signals received from selection section 221 and transmits the resultant signals to base station 100 via an antenna.

(Operations of Base Station 100 and Terminal 200)

A description will be provided regarding operations of base station 100 and terminal 200 each configured in the manner described above.

Hereinafter, a description will be provided regarding the method of determining the A/N resource (i.e., PUCCH resource) used for transmission of response signals and the method of generating ACK/NACK signals (mapping method) in control examples 1 to 5.

(Control Example 1: Two-CW Processing for PCell, Two-CW Processing for SCell, and Cross-Carrier Scheduling from PCell to SCell)

Figure 12:
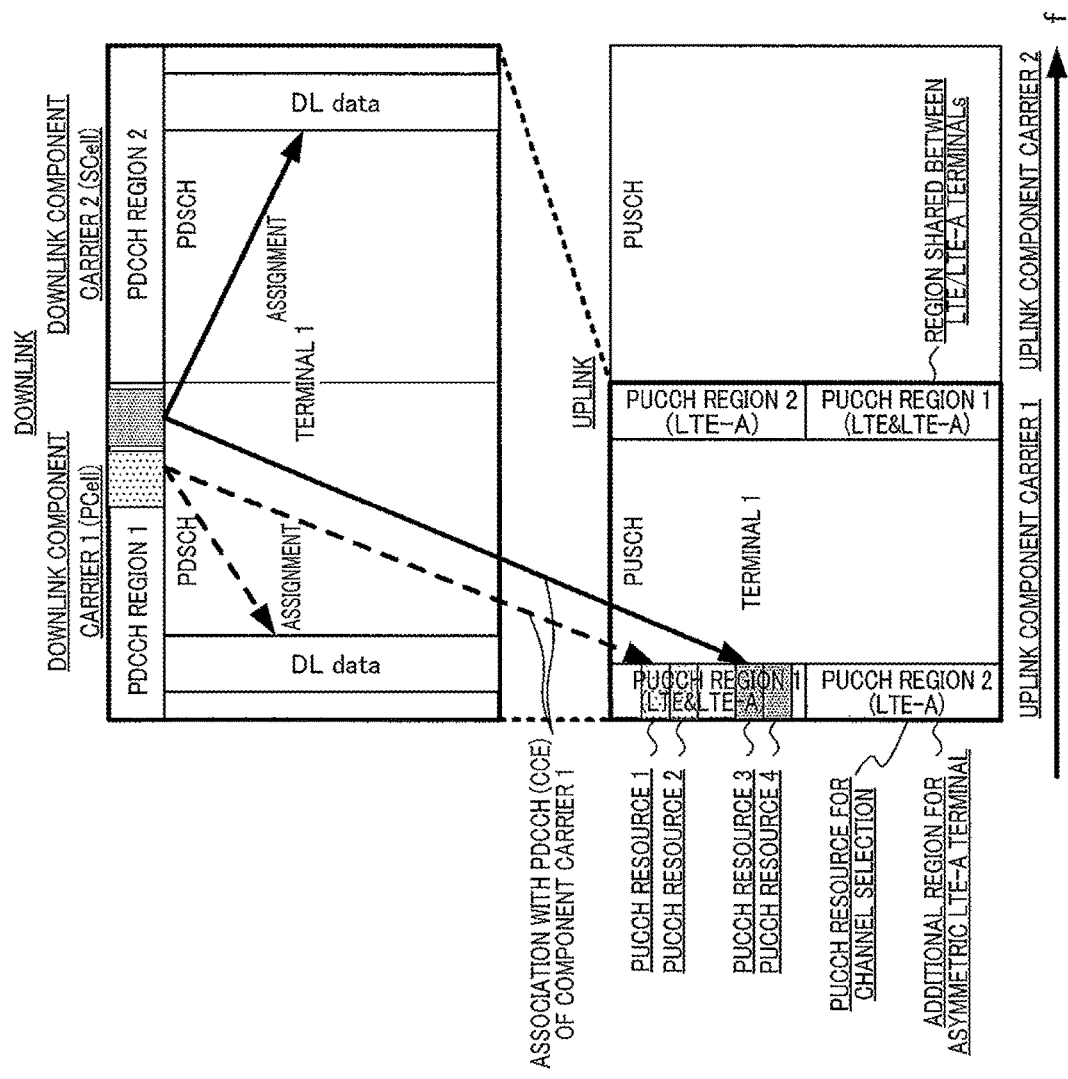
FIG. 12 illustrates control example 1 for PUCCH resources according to Embodiment 1 of the claimed invention.
Figure 13:
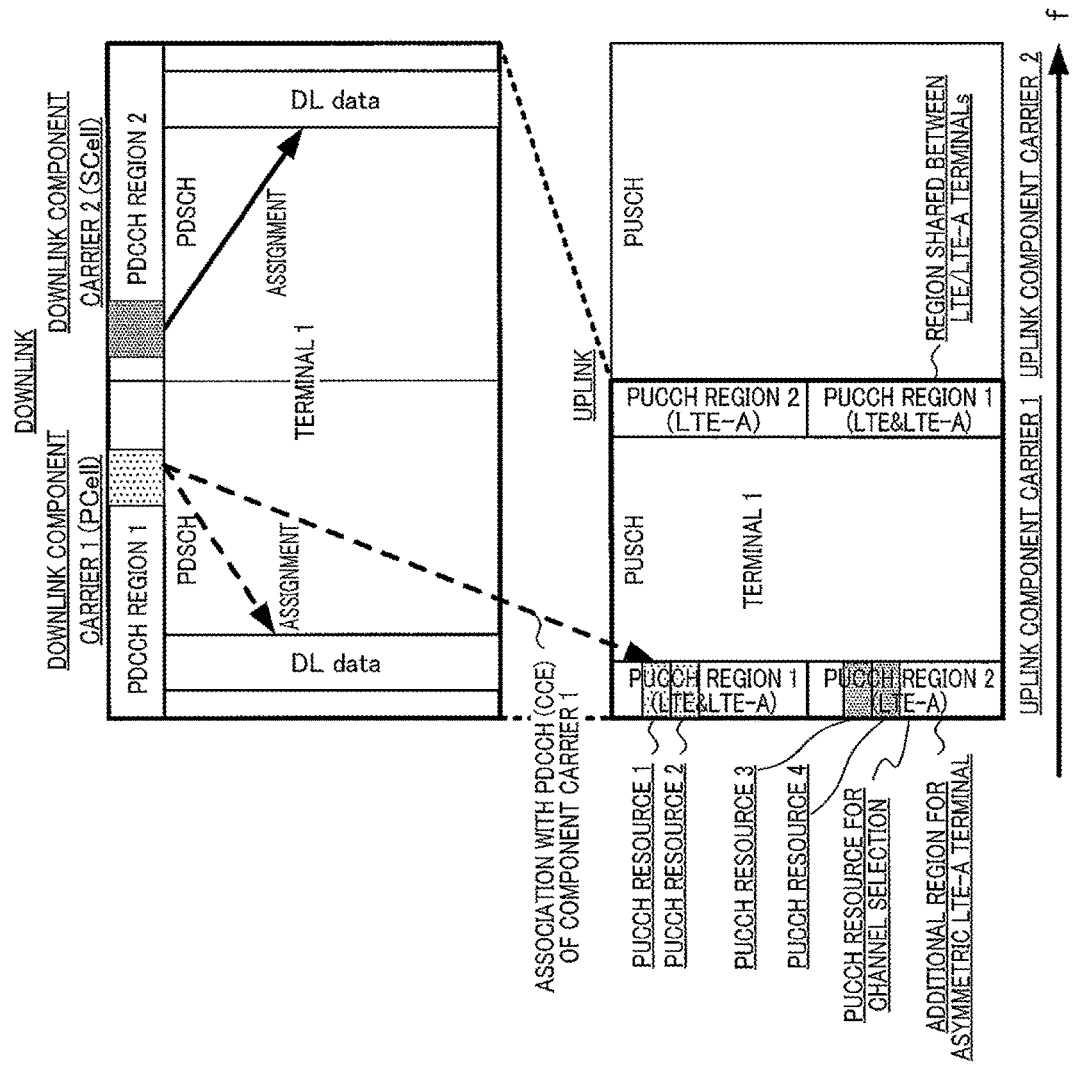
FIG. 13 illustrates control example 2 for PUCCH resources according to Embodiment 1 of the claimed invention.

In FIG. 12, the method of determining the A/N resource (i.e., PUCCH resource) when both of PCell and SCell perform two-CW processing and cross-carrier scheduling is applied when the number of CCs is two. FIG. 12 illustrates an example of cross-carrier scheduling from PCell to SCell, however. More specifically, the PDCCH in PCell indicates the PDSCH in SCell.

In FIG. 12, PUCCH resource 1 in an uplink component carrier is assigned in association in a one-to-one correspondence with the top CCE index (n_CCE) of the CCEs occupied by the PDCCH indicating the PDSCH in PCell (implicit signaling). Moreover, in FIG. 12, PUCCH resource 2 in the uplink component carrier is assigned in association in a one-to-one correspondence with the index subsequent to the top CCE index (n_CCE+1) of the CCEs occupied by the PDCCH indicating the PDSCH in PCell (implicit signaling).

In FIG. 12, PUCCH resource 3 in the uplink component carrier is assigned in association in a one-to-one correspondence with the top CCE index (n_CCE' (n_CCE'≠n_CCE)) of the CCEs occupied by the PDCCH in PCell that indicates the PDSCH in SCell. PUCCH resource 3 is cross-carrier scheduled from PCell to SCell. In FIG. 12, PUCCH resource 4 in the uplink component carrier assigned in association in a one-to-one correspondence with the index subsequent to the top CCE index (n_CCE'+1) of the CCEs occupied by the PDCCH indicating the PDSCH in PCell (implicit signaling).

It should be noted that, when cross-carrier scheduling is configured from first SCell to second SCell, PUCCH resources 3 and 4 described above may be previously reported by the base station (explicit signaling). In addition, when no cross-carrier scheduling is configured, PUCCH resources 3 and 4 described above may be previously reported by the base station, likewise (explicit signaling).

It should be noted that, the PUCCH resources except for PUCCH resource 1 (i.e., PUCCH resources 2, 3 and 4) may be previously reported from the base station (explicit signaling). PUCCH resource 1 herein is associated in a one-to-one correspondence with the CCE index (n_CCE) of the CCEs occupied by the PDCCH indicating the PDSCH in PCell.

FIGS. 14 and 15 illustrate the method of generating ACK/NACK signals when both of PCell and SCell perform two-CW processing when the number of CCs is two. PUCCH resources 1, 2, 3 and 4 in FIGS. 14 and 15 correspond to PUCCH resources 1, 2, 3 and 4 illustrated in FIG. 12, respectively. The bits forming a combination of a plurality of an ACK, NACK and/or DTX are termed as bits b0, b1, b2 and b3 in sequence. In addition, bits b0, b1, b2 and b3 are respectively associated with the ACK/NACK signals of CW0 of the PDSCH in PCell, ACK/NACK signals of CW1 of the PDSCH in PCell, ACK/NACK signals of CW0 of the PDSCH in SCell, and ACK/NACK signals of CW1 of the PDSCH in SCell. The associations between the bits and ACK/NACK signals are by no means limited to the above-mentioned example.

The response signals for all the PUCCH resources are mapped to four phase points regardless of a pattern for results of error detection indicating a DTX. In addition, the response signals are mapped to the phase point for each of the PUCCH resources in a way that makes the Hamming distance between adjacent phase points smaller (i.e., in a way that makes the mapping closer to the Gray mapping).

Figure 14B:
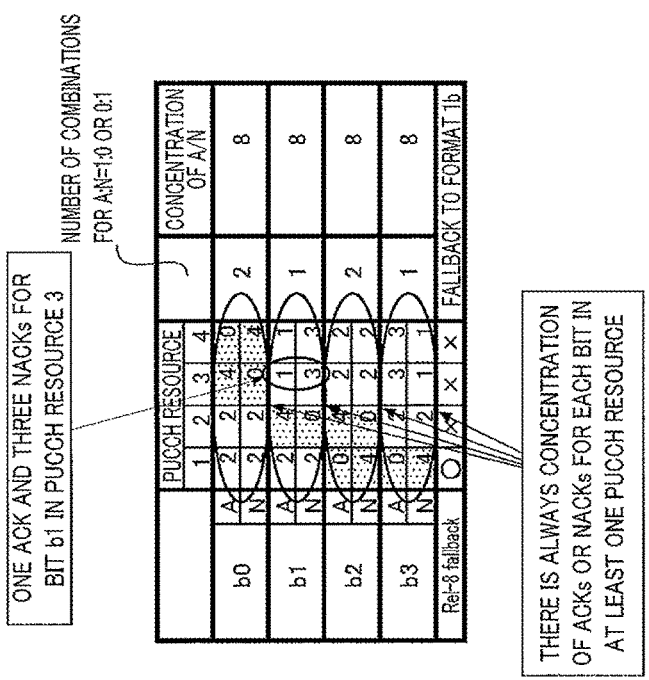
FIGS. 14A and 14B illustrate control example 1 for ACK/NACK mapping according to Embodiment 1 of the claimed invention.
Figure 14A:
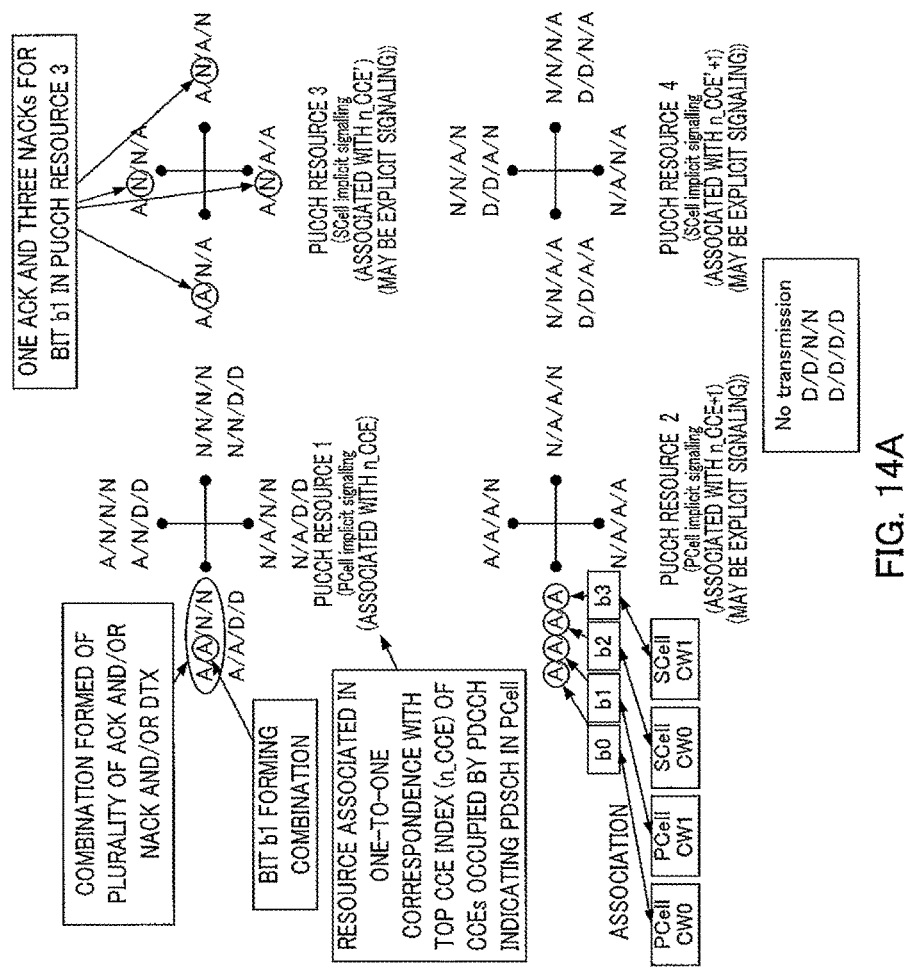

FIG. 14B illustrates concentration of ACK/NACKs for PUCCH resources 1, 2, 3 and 4 for bits b0, b1, b2 and b3 in FIG. 14A. For example, bit b1 includes one ACK and three NACKs mapped for PUCCH resource 3 with reference to FIG. 14A. These parts of FIG. 14A correspond to "1, 3" in FIG. 14B, where the row of "b1" and the column of "PUCCH resource 3" intersect. In addition, the column of "the number of combinations for A:N=1:0 or 0:1" indicates how many combinations of "four ACKs and zero NACK" (A:N=1:0(=4:0)) or "zero ACK and four NACKs" (A:N=0: 1(=0:4)) for each of the PUCCH resources are present. Moreover, in FIG. 14B, the column of "A/N concentration" indicates the sum of the absolute values of differences between the number of ACKs and the number of NACKs in the respective PUCCH resources for all the PUCCH resources.

As described above, there are the two methods of determining response signals for base stations depending on the mapping methods. More specifically, base station use the method of determining the PUCCH resource on which the response signals are reported (i.e., determination method 1) and the method of determining the PUCCH resource on which the response signal are reported and further determining the phase point of the PUCCH resource (i.e., determination method 2).

FIG. 14 illustrate the mapping method that smooths out (i.e., equalizes), among the bits, the number of PUCCH resources each allowing the ACK/NACK to be determined using determination method 1 and that supports implicit signaling for an optional ACK/NACK bit and LTE fallback (i.e., fallback to Format 1b in FIG. 14). This mapping method is disclosed in Embodiment 1. FIG. 15 illustrates an ACK/NACK mapping table (i.e., transmission rule table) corresponding to FIG. 14.

The PUCCH resource allowing the ACK/NACK to be determined using determination method 1 herein is the PUCCH resource corresponding to the combination for A:N=1:0(=4:0) or A:N=0:1(=0:4) in FIG. 14B. In addition, the number of PUCCH resources each allowing the ACK/NACK to be determined using determination method 1 is "the number of combinations for A:N=1:0 or 0:1" in FIG. 14B. Moreover, the smoothing out means to perform mapping that makes the difference between the maximum and minimum values of "the number of combinations for A:N=1:0 or 0:1" not greater than one. More specifically, in the mapping illustrated in FIG. 14, "the number of combinations for A:N=1:0 or 0:1" is two for two bits (b0 and b2) and one for the remaining two bits (b1 and b3) in a case where PCell performs two-CW processing and SCell also performs two-CW processing when the number of CCs is two. Accordingly, the difference between the maximum and minimum values is one in this mapping.

In other words, supporting implicit signaling for an optional ACK/NACK bit means that bit b0 associated with ACK/NACK of CW0 of PCell takes no DTX for mapping in PUCCH resource 1 associated with the top CCE index (n_CCE) of the CCEs occupied by the PDCCH indicating the PDSCH in PCell in FIG. 14A. Likewise, supporting implicit signaling for an optional ACK/NACK bit means that bit b1 takes no DTX for mapping in PUCCH resource 2, while bit b2 takes no DTX for mapping in PUCCH resource 3, and bit b3 takes no DTX for mapping in PUCCH resource 4.

It should be noted that, FIG. 14 illustrate an example in which all the PUCCH resources are implicitly signaled, so that implicit signaling for an optional ACK/NACK bit is supported in this example, but the PUCCH resources other than PUCCH resource 1 may be explicitly signaled. In this case, implicit signaling for at least one ACK/NACK bit may be supported.

Supporting LTE fallback means that the following conditions described as (1) to (3) are satisfied simultaneously. In a certain PUCCH resource, certain two bits satisfy A:N=0:1 (=0:4) and the remaining two bits correspond to the mapping illustrated in FIG. 6B (1). The remaining two bits in (1) are associated with two CWs processed by PDSCH in PCell (2). The PUCCH resource in which the condition (1) is satisfied is a PUCCH resource assigned in association in a one-to-one correspondence with the top CCE index (n_CCE) of the CCEs occupied by the PDCCH indicating the PDSCH in PCell (i.e., PUCCH resource 1 in the example illustrated in FIG. 14) (3).

It should be noted that, the mapping in FIG. 14A is an example, and the mapping in which bit b0 and bit b1 are switched may be used, for example, since the mapping only needs to satisfy the conditions (1) to (3) simultaneously. In addition, the mapping for the PUCCH resources other than PUCCH resource 1 supporting LTE fallback may be rotated by 90 degrees, 180 degrees, and 270 degrees in the clockwise direction, respectively, for example. Moreover, bit switching control may be performed according to the priorities of CWs. For example, a CW having a higher priority is preferentially assigned to bit b0 over bit b1 and also to bit b2 over bit b3. Thus, ACK/NACK signals can be reported to a base station while ACK/NACK signals for a CW having a higher priority is assigned to a bit having a lower error rate.

As described above, it is possible to support implicit signaling for optional response signals and LTE fallback (fallback to Format 1b in FIG. 14, to be more specific) from two CCs while improving the characteristics of response signals having poor transmission characteristics by smoothing out, among the bits, the number of PUCCH resources each allowing the ACK/NACK to be determined only by determining the PUCCH resource in which the response signals are reported.

(Control Example 2: Two-CW Processing for PCell, Single-CW Processing for SCell, and Cross-Carrier Scheduling from PCell to SCell)

Figure 16:
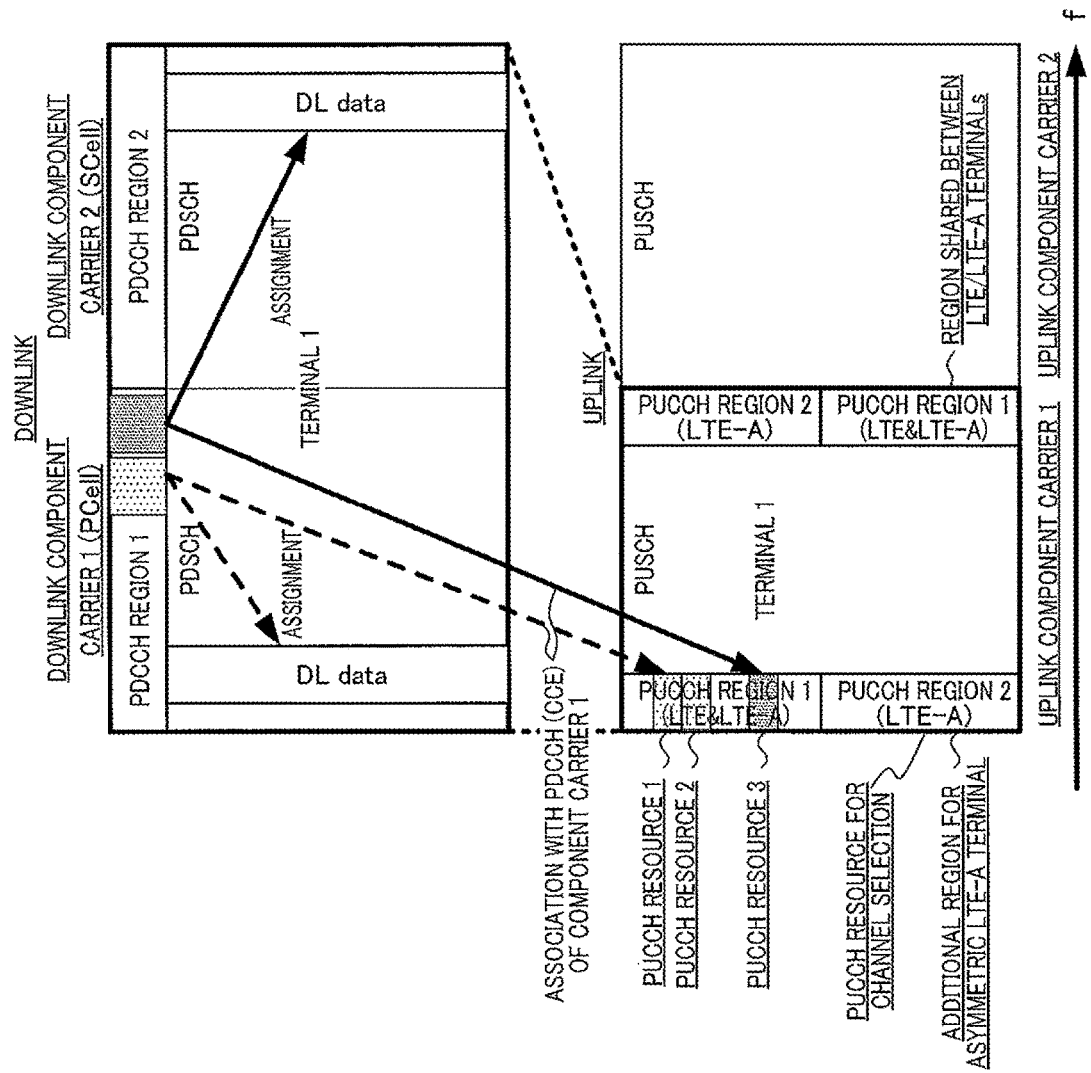
FIG. 16 illustrates control example 3 for PUCCH resources according to Embodiment 1 of the claimed invention.

FIG. 16 illustrates a method of determining the A/N resource (i.e., PUCCH resource) when PCell performs two-CW processing and SCell performs single-CW processing and cross-carrier scheduling is applied when the number of CCs is two. FIG. 16 illustrates an example of cross-carrier scheduling from PCell to SCell, however. More specifically, the PDCCH in PCell indicates the PDSCH in SCell.

In FIG. 16, PUCCH resource 1 is assigned in association in a one-to-one correspondence with the top CCE index (n_CCE) of the CCEs occupied by the PDCCH indicating the PDSCH in PCell (implicit signaling). In addition, in FIG. 16, PUCCH resource 2 is assigned in association in a one-to-one correspondence with the CCE index subsequent to the top CCE index (n_CCE+1) of the CCEs occupied by the PDCCH indicating the PDSCH in PCell (implicit signaling).

In FIG. 16, PUCCH resource 3 in an uplink component carrier is assigned in association in a one-to-one correspondence with the top CCE index (n_CCE') of the CCEs occupied by the PDCCH in PCell that indicates the PDSCH in SCell (implicit signaling). PUCCH resource 3 is cross-carrier scheduled from PCell to SCell.

It should be noted that, when cross-carrier scheduling is configured from first SCell to second SCell, PUCCH resource 3 described above may be previously reported by the base station (explicit signaling). In addition, when no cross-carrier scheduling is configured, PUCCH resource 3 may be previously reported by the base station, likewise (explicit signaling).

It should be noted that the PUCCH resources except for PUCCH resource 1 associated in a one-to-one correspondence with the CCE index (n_CCE) of the CCEs occupied by the PDCCH indicating the PDSCH in PCell (i.e., PUCCH resources 2 and 3) may be previously reported from the base station (explicit signaling).

Figure 17:
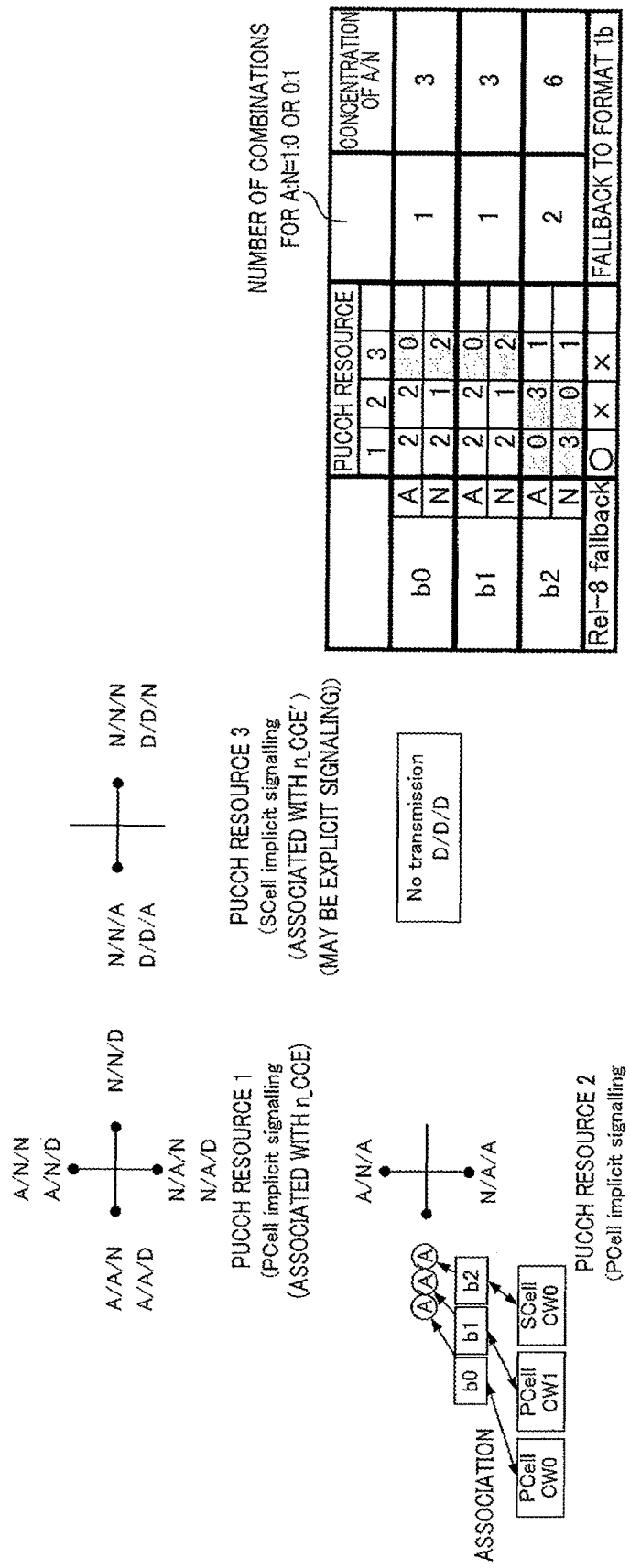
FIGS. 17A and 17B illustrate control example 2 for ACK/NACK mapping according to Embodiment 1 of the claimed invention.

FIGS. 17 and 18 illustrate the method of generating (mapping) ACK/NACK signals when PCell performs two-CW processing and SCell performs single-CW processing when the number of CCs is two. PUCCH resources 1, 2 and 3 in FIG. 17 and 18 correspond to PUCCH resources 1, 2 and 3 illustrated in FIG. 16, respectively. The bits forming a combination of a plurality of an ACK and/or NACK and/or DTX are termed as bits b0, b1 and b2 in sequence. In addition, bits b0, b1 and b2 are respectively associated with ACK/NACK signals of CW0 of the PDSCH in PCell, ACK/NACK signals of CW1 of the PDSCH in PCell and ACK/NACK signals of CW0 of the PDSCH in SCell. In other words, bits b0 and b1 are associated with the Cell that performs two-CW processing and b2 is associated with the Cell that performs single-CW processing. The associations between the bits and ACK/NACK signals are by no means limited to the abovementioned example.

In PUCCH resource 1 illustrated in FIG. 17A, the response signals are mapped to three phase points excluding the pattern of results of error detection indicating a DTX. In PUCCH resource 2 illustrated in FIG. 17A, the response signals are mapped to three phase points regardless of any pattern for results of error detection indicating a DTX. In PUCCH resource 3 illustrated in FIG. 17A, the response signals are mapped to two phase points. In addition, the response signals are mapped to the phase point for each of the PUCCH resources in a way that makes the Hamming distance between adjacent phase points smaller (i.e., in a way that makes the mapping closer to the Gray mapping).

FIG. 17B illustrates concentration of ACK/NACKs for PUCCH resources 1, 2 and 3 for bits b0, b1 and b2 in FIG. 17A.

As described above, base stations use the two methods of determining response signals depending on the mapping methods. More specifically, base station uses the method of determining the PUCCH resource in which the response signals are reported (determination method 1) and the method of determining the PUCCH resource in which the response signals are reported and further determining the phase point of the PUCCH resource (determination method 2).

FIG. 17 illustrate the mapping method that smooths out, among the bits, the number of PUCCH resources each allowing the ACK/NACK to be determined with determination method 1 and that supports implicit signaling for an optional ACK/NACK bit and LTE fallback (i.e., fallback to Format 1b in FIG. 17). This mapping method is disclosed in Embodiment 1. FIG. 18 illustrates an ACK/NACK mapping table (transmission rule table) corresponding to FIG. 17.

The PUCCH resource allowing the ACK/NACK to be determined using determination method 1 herein is the PUCCH resource corresponding to the combination for A:N=1:0(=3:0) or A:N=0:1(=0:3=0:2) in FIG. 17B. In addition, the number of PUCCH resources each allowing the ACK/NACK to be determined using determination method 1 is "the number of combinations for A:N=1:0 or 0:1" in FIG. 17B. Moreover, the smoothing out means to perform mapping that makes the difference between the maximum and minimum values of "the number of combinations for A:N=1:0 or 0:1" not greater than one. More specifically, in the mapping illustrated in FIG. 17, "the number of combinations for A:N=1:0 or 0:1" is two for one bit (b2) and one for the remaining two bits (b0 and b1) in a case where PCell performs two-CW processing and SCell also performs single-CW processing when the number of CCs is two. Accordingly, the difference between the maximum and minimum values is one in this mapping.

In other words, supporting implicit signaling for an optional ACK/NACK bit means that bit b0 associated with ACK/NACK of CW0 of PCell takes no DTX for mapping in PUCCH resource 1 associated with the top CCE index (n_CCE) of the CCEs occupied by the PDCCH indicating the PDSCH in PCell in FIG. 17A. Likewise, supporting implicit signaling for an optional ACK/NACK bit means that the bit b1 takes no DTX for mapping in PUCCH resource 2, and the bit b2 takes no DTX for mapping in PUCCH resource 3.

It should be noted that, FIG. 17 illustrate an example in which all the PUCCH resources are implicitly signaled, so that implicit signaling for an optional ACK/NACK bit is supported, but the PUCCH resources other than PUCCH resource 1 may be explicitly signaled. In this case, implicit signaling for at least one ACK/NACK bit may be supported.

Supporting LTE fallback means that the following conditions described as (1) to (3) are satisfied simultaneously. In a certain PUCCH resource, one bit satisfies A:N=0:1 (=0: 2=0:3) and the remaining two bits correspond to the mapping illustrated in FIG. 6B (1). The remaining two bits in (1) are associated with two CWs processed by PDSCH in PCell (2). The PUCCH resource in which the condition (1) is satisfied is a PUCCH resource assigned in association in a one-to-one correspondence with the top CCE index (n_CCE) of the CCEs occupied by the PDCCH indicating the PDSCH in PCell (i.e., PUCCH resource 1 in the example illustrated in FIG. 17) (3).

It should be noted that, the mapping in FIG. 17A is an example, and the mapping in which bit b0 and bit b1 are switched may be used, for example, since the mapping only needs to satisfy the conditions (1) to (3) simultaneously. In addition, the mapping for the PUCCH resources other than PUCCH resource 1 supporting LTE fallback may be rotated by 90 degrees, 180 degrees, and 270 degrees in the clockwise direction, respectively, for example.

As described above, it is possible to support implicit signaling for optional response signals and LTE fallback (fallback to Format 1b in FIG. 17, to be more specific) from two CCs while improving the characteristics of response signals having poor transmission characteristics by smoothing out, among the bits, the number of PUCCH resources each allowing the ACK/NACK to be determined only by determining the PUCCH resource in which the response signals are reported.

(Control Example 3: Single-CW Processing for PCell, Two-CW Processing for SCell, and Cross-Carrier Scheduling from PCell to SCell (Part 1))

Figure 19:
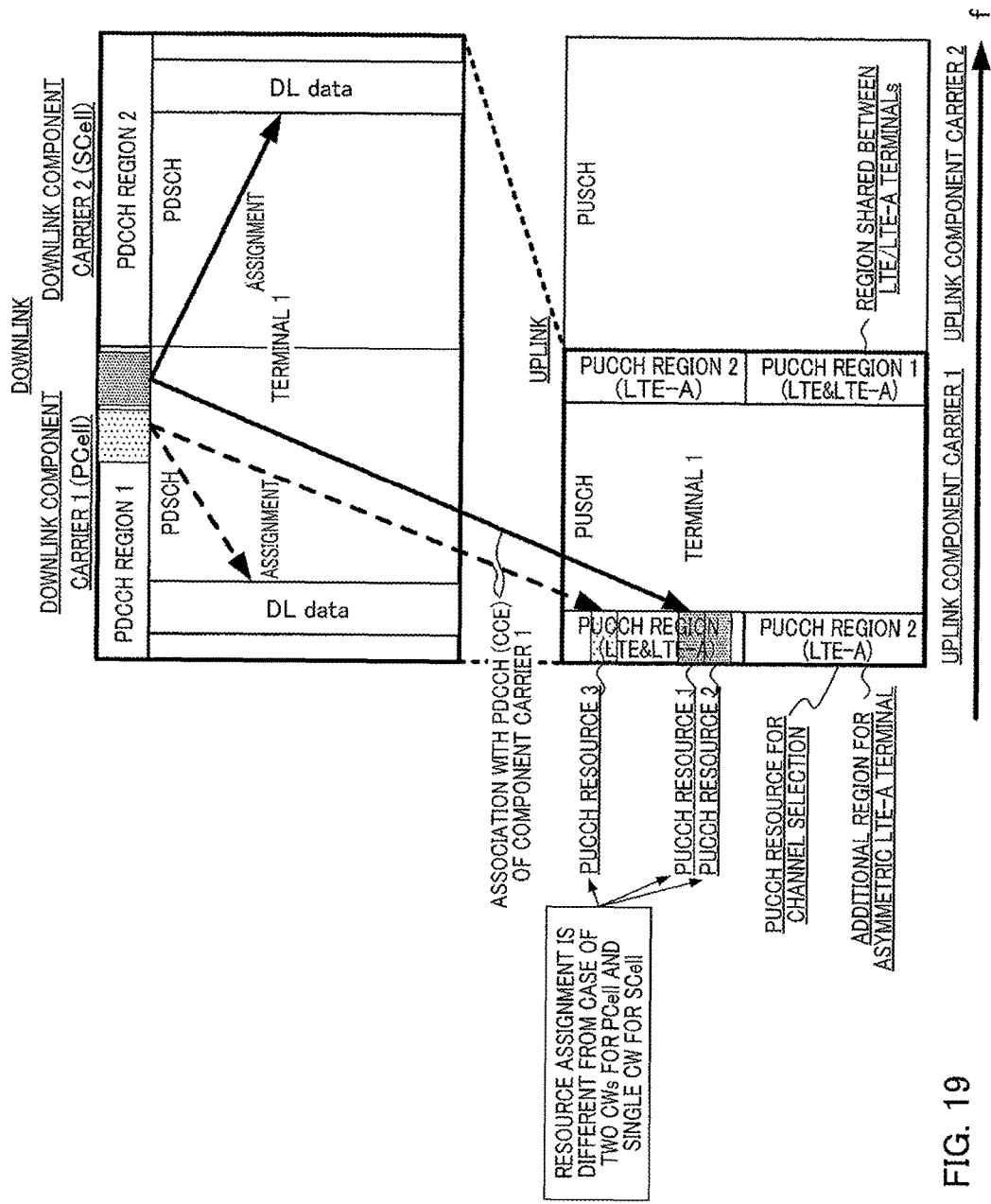
FIG. 19 illustrates control example 4 for PUCCH resources according to Embodiment 1 of the claimed invention.

FIG. 19 illustrates a method of determining the A/N resource (i.e., PUCCH resource) when PCell performs two-CW processing and SCell performs single-CW processing and cross-carrier scheduling is applied when the number of CCs is two. FIG. 19 illustrates an example of cross-carrier scheduling from PCell to SCell, however. In other words, the PDCCH in PCell indicates the PDSCH in SCell.

In FIG. 19, PUCCH resource 1 is assigned in association in a one-to-one correspondence with the top CCE index (n_CCE) of the CCEs occupied by the PDCCH indicating the PDSCH in PCell (implicit signaling).

In FIG. 19, PUCCH resource 2 in an uplink component carrier is assigned in association in a one-to-one correspondence with the top CCE index (n_CCE') of the CCEs occupied by the PDCCH in PCell that indicates the PDSCH in SCell (implicit signaling). PUCCH resource 2 is cross-carrier scheduled from PCell to SCell. In addition, PUCCH resource 3 in an uplink component carrier is assigned in association in a one-to-one correspondence with the CCE index subsequent to the top CCE index (n CCE'+1) of the CCEs occupied by the PDCCH indicating the PDSCH in SCell (implicit signaling) in FIG. 19.

It should be noted that, when cross-carrier scheduling is configured from first SCell to second SCell, PUCCH resources 2 and 3 described above may be previously reported by the base station (explicit signaling). In addition, when no cross-carrier scheduling is configured, PUCCH resources 2 and 3 may be previously reported by the base station, likewise (explicit signaling).

It should be noted that, the PUCCH resources except for PUCCH resource 1 associated in a one-to-one correspondence with the CCE index (n_CCE) of the CCEs occupied by the PDCCH indicating the PDSCH in PCell (i.e., PUCCH resources 2 and 3) may be previously reported from the base station (explicit signaling).

FIGS. 21 and 22 illustrate the method of generating (mapping) ACK/NACK signals when PCell performs single-CW processing and SCell performs two-CW processing when the number of CCs is two. PUCCH resources 1, 2 and 3 in FIGS. 20 and 21 correspond to PUCCH resources 1, 2 and 3 illustrated in FIG. 19, respectively. The bits forming a combination of a plurality of an ACK and/or NACK and/or DTX are termed as bits b0, b1 and b2 in sequence. In addition, bits b0, b1 and b2 are respectively associated with ACK/NACK signals of CW0 of the PDSCH in SCell, ACK/NACK signals of CW1 of the PDSCH in SCell and ACK/NACK signals of CW0 of the PDSCH in PCell. The associations between the bits and ACK/NACK signals are by no means limited to the abovementioned example.

In control example 3, in order to use the same mapping as that of control example 2 in which PCell performs two-CW processing and SCell performs single-CW processing, bit b0 and bit b1 are associated with the Cell that performs two-CW processing (or in which Space Division Multiplexing (SDM) is configured), and bit b2 is associated with the Cell that performs single-CW (or in which no SDM is configured). Since the same mapping table is used, the mapping table in FIG. 20A (or mapping table in FIG. 17A) can support fallback to Format 1a and Format 1b. Since the same mapping table is used, a single mapping table can simultaneously support two control examples (i.e., the example in which PCell performs two-CW processing and SCell performs single-CW processing and the example in which PCell performs single-CW processing and SCell performs two-CW processing). Accordingly, the number of combinations of mapping tables held by terminals and base stations can be less, and also, the complexity of the configurations to transmit response signals in terminals and also to determine the response signals in base stations can be reduced. It should be noted that, it is not necessary to use the same mapping always, although the additional effects obtained by using the same mapping table are described herein.

The response signals for all the PUCCH resources are mapped to three phase points excluding the pattern of the results of error detection indicating a DTX in PUCCH resource 1 illustrated in FIG. 20A. In addition, the response signals are mapped to three phase points regardless of any pattern for results of error detection indicating a DTX in PUCCH resource 2 illustrated in FIG. 20A. The response signals are mapped to two phase points in PUCCH resource 3 illustrated in FIG. 20A. In addition, the response signals are mapped to the phase point for each of the PUCCH resources in a way that makes the Hamming distance between adjacent phase points smaller (i.e., in a way that makes the mapping closer to the Gray mapping).

FIG. 20B illustrates concentration of ACK/NACKs for PUCCH resources 1, 2 and 3 for bits b0, b1 and b2 in FIG. 20A.

As described above, base stations use the two methods of determining response signals depending on the mapping methods. More specifically, base station uses the method of determining the PUCCH resource in which the response signals are reported (determination method 1) and the method of determining the PUCCH resource in which the response signals are reported and further determining the phase point of the PUCCH resource (determination method 2).

Figure 20:
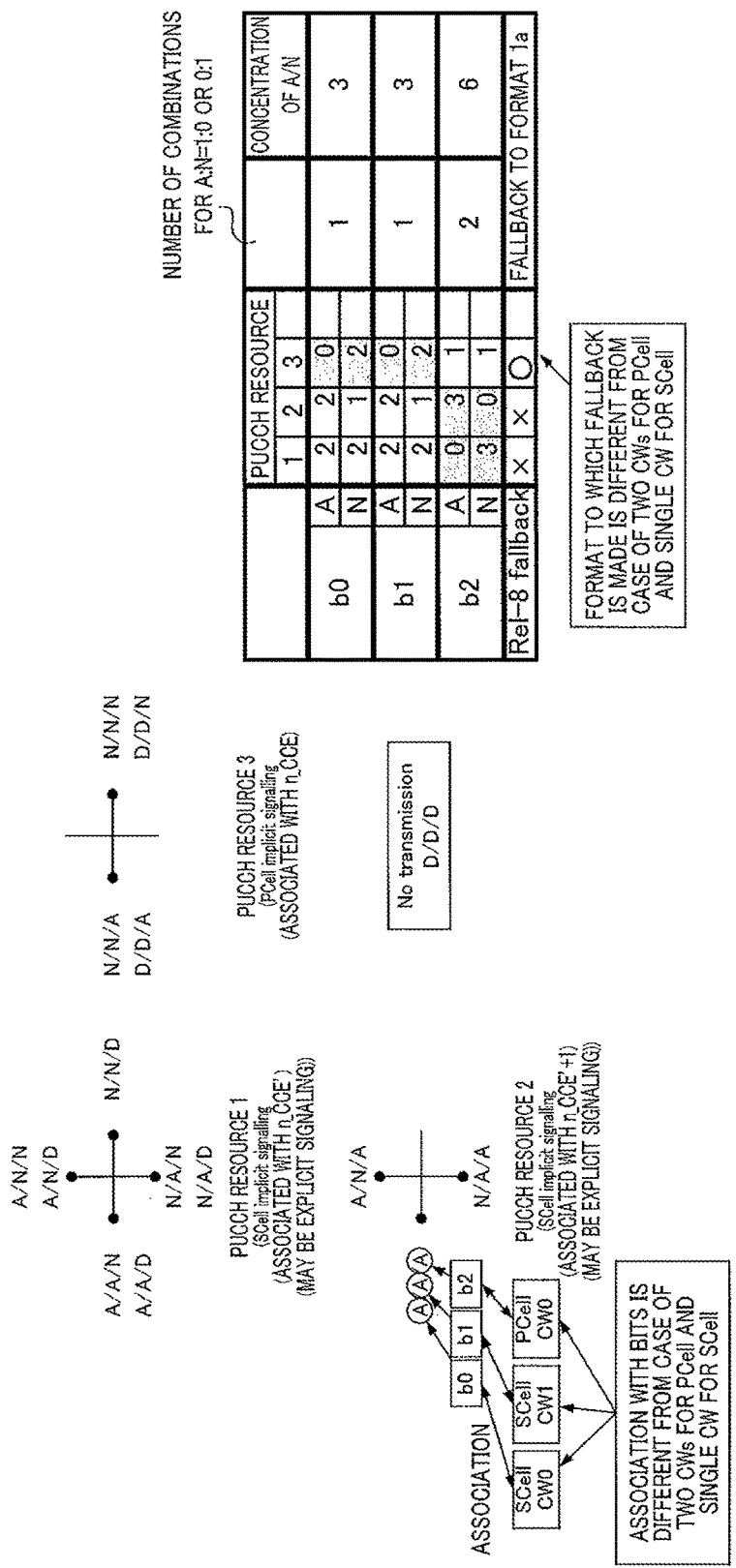
FIGS. 20A and 20B illustrate control example 3 for ACK/NACK mapping according to Embodiment 1 of the claimed invention.

FIG. 20 illustrate the mapping method that smooths out, among the bits, the number of PUCCH resources each allowing the ACK/NACK to be determined using determination method 1 and that supports implicit signaling for an optional ACK/NACK bit and LTE fallback (i.e., fallback to Format 1a in FIG. 20). This mapping method is disclosed in Embodiment 1. FIG. 21 illustrates an ACK/NACK mapping table (transmission rule table) corresponding to FIG. 20.

The PUCCH resource allowing the ACK/NACK to be determined using determination method 1 herein is the PUCCH resource corresponding to the combination for A:N=1:0(=3:0) or A:N=0:1(=0:3=0:2) in FIG. 20B. In addition, the number of PUCCH resources each allowing the ACK/NACK to be determined is "the number of combinations for A:N=1:0 or 0:1" in FIG. 20B. Moreover, the smoothing out means to perform mapping that makes the difference between the maximum and minimum values of "the number of combinations for A:N=1:0 or 0:1" not greater than one. More specifically, in the mapping illustrated in FIG. 20, "the number of combinations for A:N=1:0 or 0:1" is two for one bit (i.e., b2) and one for the remaining two bits (i.e., b0 and b1) in a case where PCell performs single-CW processing and SCell performs two-CW processing when the two CC are used. Accordingly, the difference between the maximum and minimum values is one in this mapping.

In other words, supporting implicit signaling for an optional ACK/NACK bit means that bit b2 associated with ACK/NACK of CW0 of PCell takes no DTX for mapping in PUCCH resource 1 associated with the top CCE index (n_CCE) of the CCEs occupied by the PDCCH indicating the PDSCH in PCell in FIG. 20A. Likewise, supporting implicit signaling for an optional ACK/NACK bit means that the bit b0 takes no DTX for mapping in PUCCH resource 1, and the bit b1 takes no DTX for mapping in PUCCH resource 2.

It should be noted that, FIG. 20 illustrate an example in which all the PUCCH resources are implicitly signaled, so that implicit signaling for an optional ACK/NACK bit is supported, but the PUCCH resources other than PUCCH resource 3 may be explicitly signaled. In this case, implicit signaling for at least one ACK/NACK bit may be supported.

Figure 6:
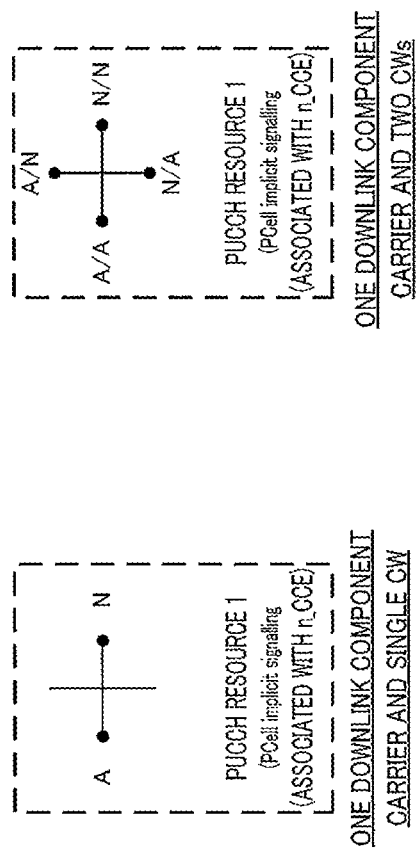
FIGS. 6A and 6B represent diagram 2 provided for describing examples of ACK/NACK mapping.
Figure 9:
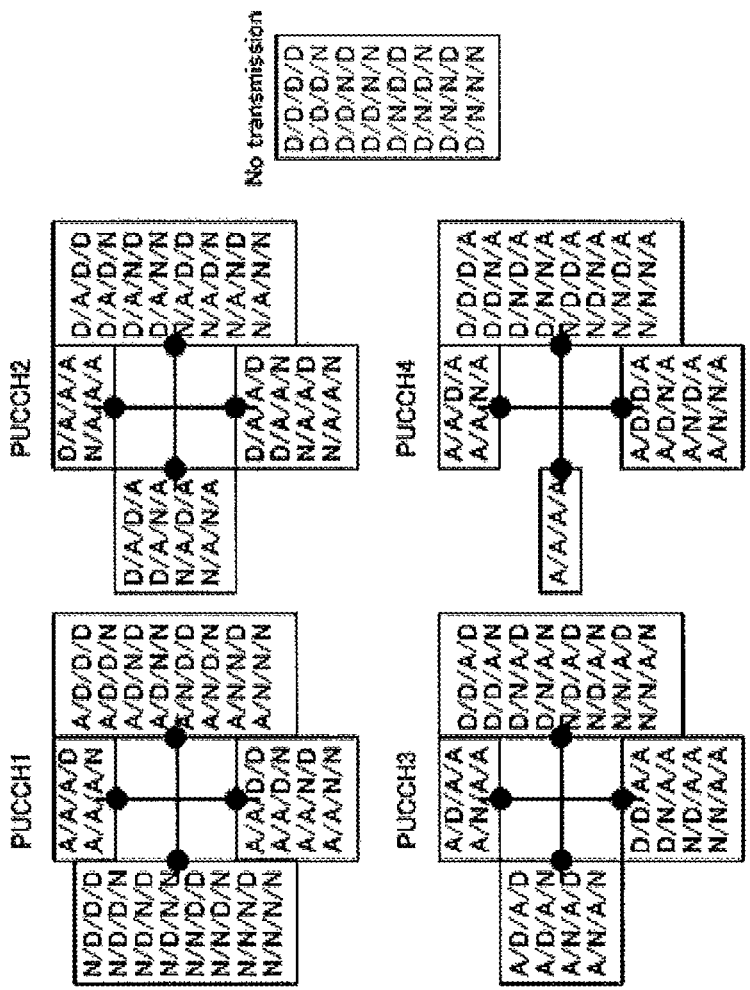
FIG. 9 illustrates ACK/NACK mapping disclosed in NPL 10.

Supporting LTE fallback means that the following conditions described as (1) to (3) are satisfied simultaneously. In a certain PUCCH resource, two bits satisfy A:N=0:1 (=0:

2=0:3) and the remaining one bit corresponds to the mapping illustrated in FIG. 6A (1). The remaining one bit in (1) is associated with single CW processed by PDSCH in PCell (2). The PUCCH resource in which the condition (1) is satisfied is a PUCCH resource assigned in association in a one-to-one correspondence with the top CCE index (n_CCE) of the CCEs occupied by the PDCCH indicating the PDSCH in PCell (i.e., PUCCH resource 3 in the example illustrated in FIG. 20) (3).

It should be noted that, the mapping in FIG. 20A is an example, and the mapping in which bit b0 and bit b1 are switched may be used, for example, since the mapping only needs to satisfy the conditions (1) to (3) simultaneously. In addition, the mapping for the PUCCH resources other than PUCCH resource 3 supporting LTE fallback may be rotated by 90 degrees, 180 degrees, and 270 degrees in the clockwise direction, respectively, for example.

As described above, it is possible to support implicit signaling for optional response signals and LTE fallback (fallback to Format 1a in FIG. 20, to be more specific) from two CCs while improving the characteristics of response signals having poor transmission characteristics by smoothing out, among the bits, the number of PUCCH resources each allowing the ACK/NACK to be determined only by determining the PUCCH resource in which the response signals are reported.

(Control Example 4: Single-CW Processing for PCell, Two-CW Processing for SCell, and Cross-Carrier Scheduling from PCell to SCell)

Control example 4 has many parts in common with control example 3. Thus, the description of common parts will be omitted.

FIGS. 22 and 23 illustrate a method of generating (mapping) ACK/NACK signals when PCell performs single-CW processing and SCell performs two-CW processing. PUCCH resources 1, 2 and 3 in FIGS. 22 and 23 correspond to PUCCH resources 1, 2 and 3 illustrated in FIG. 19, respectively. The bits forming a combination of a plurality of an ACK and/or NACK and/or DTX are termed as bits b0, b1 and b2 in sequence. In addition, bits b0, b1 and b2 are respectively associated with ACK/NACK signals of CW0 of the PDSCH in SCell, ACK/NACK signals of CW1 of the PDSCH in SCell and ACK/NACK signals of CW0 of the PDSCH in PCell. The associations between the bits and ACK/NACK signals are by no means limited to the above-mentioned example.

In control example 4, it is possible to use the same mapping as that used in the case where PCell performs two-CW processing and SCell performs single-CW processing. When the same mapping is used, only fallback to Format 1a can be supported, and fallback to Format 1b cannot be supported. The use of the same mapping makes it possible to simultaneously support two control examples (i.e., the example in which PCell performs two-CW processing and SCell performs single-CW processing and the example in which PCell performs single-CW processing and SCell performs two-CW processing). Accordingly, the number of combinations of mapping tables held by terminals and base stations can be less, and also, the complexity of the configuration to transmit response signals in terminals and also to determine the response signals in base stations can be reduced. Meanwhile, when different mapping is used, fallback to Format 1a can be supported in FIG. 22. Support for fallback to Format 1b is dependent of the mapping used when PCell performs two-CW processing and SCell performs single-CW processing. It should be noted that, it is not necessary to use the same mapping always, although the additional effects obtained by using the same or different mapping table are described herein.

Figures 22A, 22B:
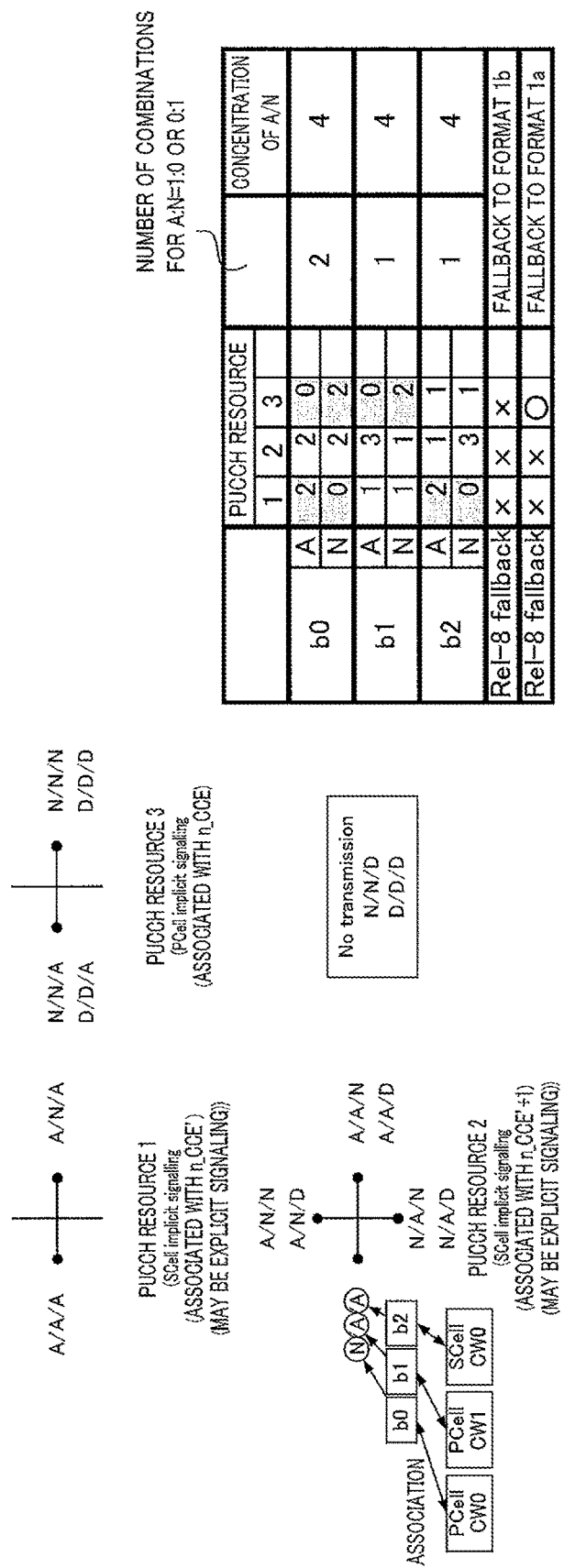
FIGS. 22A and 22B illustrate control example 4 for ACK/NACK mapping according to Embodiment 1 of the claimed invention.

The response signals are mapped to two phase points regardless of any pattern for results of error detection indicating a DTX in PUCCH resource 1 illustrated in FIG. 22A. The response signals are mapped to four phase points regardless of any pattern for results of error detection indicating a DTX in PUCCH resource 2 illustrated in FIG. 22A. The response signals are mapped to two phase points regardless of any pattern for results of error detection indicating a DTX in PUCCH resource 3 illustrated in FIG. 22A. In addition, the response signals are mapped to the phase point for each of the PUCCH resources in a way that makes the Hamming distance between adjacent phase points smaller (i.e., in a way that makes the mapping closer to the Gray mapping).

FIG. 22B illustrates concentration of ACK/NACKs of PUCCH resources 1, 2 and 3 for bits b0, b1 and b2 in FIG. 22A.

FIG. 22 illustrate the mapping method that smooths out, among the bits, the number of PUCCH resources each allowing the ACK/NACK to be determined using determination method 1 and that supports implicit signaling for an optional ACK/NACK bit and LTE fallback (i.e., fallback to Format 1a in FIG. 22). This mapping method is disclosed in Embodiment 1. FIG. 23 illustrates an ACK/NACK mapping table (transmission rule table) corresponding to FIG. 22.

As described above, it is possible to support implicit signaling for optional response signals and LTE fallback (fallback to Format 1a in FIG. 22, to be more specific) from two CCs while improving the characteristics of response signals having poor transmission characteristics by smoothing out, among the bits, the number of PUCCH resources each allowing the ACK/NACK to be determined only by determining the PUCCH resource in which the response signals are reported.

(Control Example 5: Control Example with Mapping Table with Application of RANK Adaptation)

Control example 5 discloses mapping tables used in case of control that switches between the mapping tables not only according to the number of configured component carriers (CC) and the transmission mode, but also dynamically controlled Rank Adaptation. More specifically, control example 5 discloses the mapping tables used in a case where the number of CWs configured in PCell or SCell (e.g., two CWs on PCell and two CWs on SCell) is decreased (e.g., two CWs on PCell and single CW on SCell) because of Rank Adaptation. In other words, the resource for ACK/NACK to be reported to an eNB and the constellation position in the resource are determined not according to the mapping table based on the number of ACK/NACK bits found from the number of configured CWs, but according to the mapping table based on the number of ACK/NACK bits found from the number of CWs after rank adaptation.

For example, when one PCell and one SCell are each configured with two CWs while the SCell transmits only a single CW to a UE because of rank adaptation, the number of ACK/NACKs to be reported from the UE to the eNB can be three instead of the number of configured CWs, which is four. In this case, the terminal may report ACK/NACKs to the eNB using a mapping table for three bits (i.e., table 1(b)).

In this case, however, when the UE receives a single CW of the PDCCH from SCell, but fails to receive the PDCCH from PCell, for example, the ACK/NACK bit corresponding to the data on PCell results in a DTX. The UE, however, cannot determine whether the data on PCell is a single CW or two CWs because of the failure to receive the PDCCH.

For this reason, the UE cannot determine whether to use the mapping table for three bits (i.e., two CWs for PCell and single CW for SCell) or the mapping table for two bits (i.e., single CW for PCell and single CW for SCell). According to the claimed invention, a DTX can be correctly reported to the eNB even in such a case.

A description will be provided with reference to FIGS. 24 to 26, hereinafter. It is to be noted that, the mapping table disclosed in FIG. 24 has the characteristics described in control example 4, the mapping table disclosed in FIG. 25 has the characteristics described in control examples 2 and 3, and the mapping table disclosed in FIG. 26 has the characteristics described in control example 1, so that the detailed description of the mapping tables will be omitted. In other words, the mapping tables disclosed in FIGS. 24 to 26 support LTE fallback from two CCs while improving the characteristics of response signals having poor transmission characteristics by smoothing out the number of PUCCH resources each allowing the ACK/NACK to be determined only by determining the PUCCH resource in which the response signals are reported.

A description will be provided with reference to FIGS. 24 and 25. The PUCCH resource and the constellation position in the resource when PCell (i.e., SDM Cell) is DTX (DTX, DTX) and SCell (Non-SDM Cell) is ACK in the three-bit mapping table in FIG. 25 coincide with the PUCCH resource and the constellation position in the resource when PCell is DTX and SCell is ACK in the two-bit mapping table in FIG. 25. Likewise, when SCell is ACK, the PUCCH resource and the constellation point in the resource correspond to No transmission in both of the tables. In a case where PCell is single-CW transmission and SCell is a DTX (i.e., UE cannot determine whether it is single-CW transmission or two-CW transmission), the PUCCH resources and the constellation positions in the resources in the two-bit mapping table and three-bit mapping table coincide with each other because the mapping tables illustrated in FIGS. 24 and 25 both support PUCCH format 1a.

A description will be provided with reference to FIGS. 25 and 26, likewise. The PUCCH resource and the constellation position in the resource when PCell is DTX (DTX, DTX) and SCell is (ACK, ACK) in the four-bit mapping table in FIG. 26 coincide with the PUCCH resource and the constellation position in the resource when PCell (i.e., non-SDM Cell) is DTX and SCell is (ACK, ACK) in the three-bit mapping table in FIG. 25. Likewise, when SCell is NACK, the PUCCH resource corresponds to No transmission in both of the tables. In a case where PCell performs two-CW transmission and SCell results in a DTX (i.e., UE cannot determine whether it is single-CW transmission or two-CW transmission), the PUCCH resources and the constellation positions in the resources of the three-bit mapping table and four-bit mapping table coincide with each other because the mapping tables illustrate in FIGS. 25 and 26 both support PUCCH format 1b.

The method of determining the A/N resource used for transmission of response signals and the method of generating ACK/NACK signals have been described using control examples 1 to 5.

As described above, terminal 200 controls transmission of response signals by selecting the resource used for the transmission of response signals from a PUCCH resource associated with a CCE and a specific PUCCH resource previously reported by base station 100 in case of channel selection. Terminal 200 can support implicit signaling for optional response signals and LTE fallback from two CCs while improving the characteristics of response signals having poor transmission characteristics by smoothing out, among the bits, the number of PUCCH resources each allowing the ACK/NACK to be determined only by determining the PUCCH resource in which the response signals are reported.

Moreover, base station 100 selects the resource used for transmission of the response signals, from the PUCCH resource associated with the CCE and the specific resource previously reported to terminal 200. Base station 100 determines the ACK/NACK using the mapping that smooths out, among the bits, the number of PUCCH resources each allowing the ACK/NACK to be determined only by determining the PUCCH resource used for reporting the response signals.

Thus, according to Embodiment 1, it is possible to support LTE fallback from two CCs while improving the characteristics of response signals having poor transmission characteristics by smoothing out, among the bits, the number of PUCCH resources each allowing the ACK/NACK to be determined only by determining the PUCCH resource in which the response signals are reported in a case where ARQ is applied to communications using an uplink component carrier and a plurality of downlink component carriers associated with the uplink component carrier while CCEs in a PDCCH region in PCell are associated in a one-to-one correspondence with PUCCH resources in the uplink component carrier.

(Embodiment 2)

In Embodiment 2, a description will be provided regarding a case where the combination of the PUCCH resource associated in a one-to-one correspondence with the top CCE index of the CCEs occupied by the PDCCH indicating the assignment of PDSCH in PCell (i.e., PUCCH resource to be implicitly signaled) and the bit (ACK/NACK bit) representing a result of error detection on a CW received on PCell is switched according to the number of component carriers and the transmission mode configured for the terminal.

It should be noted that, the transmission mode supporting only single-CW transmissions is referred to as "non-MIMO (Multiple Input Multiple Output) mode" and the transmission mode supporting up to two-CW transmissions is referred to as "MIMO mode."

As in the case of Embodiment 1, terminals generate response signals to be fed back to base stations on the basis of an association (i.e., ACK/NACK mapping table or transmission rule table for response signals) among a pattern candidate of results of error detection (may be referred to as "error detection result pattern" or "ACK/NACK state," hereinafter), a PUCCH resource to which the response signals are assigned, and the phase point in the PUCCH resource. It should be noted that, the error detection result pattern consists of results of error detection on a plurality of pieces of downlink data received on at least two downlink component carriers.

The ACK/NACK mapping table is determined according to the number of downlink component carriers previously configured for the terminal (i.e., at least two downlink component carriers since carrier aggregation is performed) and the transmission mode. To put it more specifically, the ACK/NACK mapping table is determined according to the number of ACK/NACK bits specified by the number of downlink component carriers and the transmission mode.

FIG. 27 illustrate examples of mapping for error detection result patterns in a case where the number of downlink component carriers configured for the terminal is two (one PCell and one SCell).

FIG. 27A illustrates an example of mapping when the non-MIMO mode is configured in each of the downlink component carriers. In other words, FIG. 27A illustrates an example of mapping when the error detection result pattern (i.e., the number of ACK/NACK bits) is represented by two bits (i.e., mapping for two bits). FIG. 27B illustrates an example of mapping when the non-MIMO mode is configured in one of the downlink component carriers and the MIMO mode is configured in the other downlink component carrier. In other words, FIG. 27B illustrates an example of mapping when the error detection result pattern (i.e., the number of ACK/NACK bits) is represented by three bits (i.e., mapping for three bits). FIG. 27C illustrates an example of mapping when the MIMO mode is configured in each of the downlink component carriers. In short, FIG. 27C illustrates an example of mapping when the error detection result pattern (i.e., the number of ACK/NACK bits) is represented by four bits (i.e., mapping for four bits).

The mapping tables illustrated in FIGS. 28A to C correspond to the examples of mapping illustrated in FIGS. 27A to C, respectively.

As illustrated in FIGS. 27A to C and FIGS. 28A to C, the error detection result pattern is represented by a maximum of four bits (i.e., b0 to b3). In addition, as illustrated in FIGS. 27A to C and FIGS. 28A to C, a maximum of four PUCCH resources 1 to 4 (i.e., Ch1 to Ch4) is configured.

For example, a description will be provided regarding a case where the MIMO mode is configured in PCell and the non-MIMO mode is configured in SCell in FIG. 27B (FIG. 28). For example, as illustrated in FIG. 27B, the response signals are mapped to the symbol position (i.e., phase point) (−1, 0) of PUCCH resource 1 when b0 of the result of error detection on CW0 of PCell is an ACK and b1 of the result of error detection on CW1 of PCell is an ACK, and b2 of the result of error detection on CW0 of SCell is a NACK or DTX. PUCCH resource 1 illustrated in FIG. 27B is the PUCCH resource associated in a one-to-one correspondence with the top CCE index of the CCEs occupied by the PDCCH indicating the assignment of PDSCH in PCell.

As described above, when the number of bits forming the error detection result pattern (i.e., the number of ACK/NACK bits) is not greater than four, the terminal feeds back the response signals using channel selection or DFT-S-OFDM. Whether to use channel selection or DFT-S-OFDM is previously configured by the base station. On the other hand, when the number of bits forming the error detection result pattern (i.e., the number of ACK/NACK bits) is greater than four, the terminal feeds back the response signals using DFT-S-OFDM.

LTE-Advanced defines mapping for error detection result patterns used in channel selection that is optimized for a case where the number of downlink component carriers is two, assuming the introductory phase of the service (e.g., FIGS. 27 and 28).

The mapping optimized for a case where the number of downlink component carriers is two herein is mapping that can be switched to and used as the mapping for the error detection result pattern for one CC used in the LTE system (i.e., mapping that supports LTE fallback). More specifically, in the mapping that supports LTE fallback, as illustrated in FIG. 28C, for example, the phase points in PUCCH resource 1 associated with specific error detection result patterns in which b2 and b3 of the results of error detection on CWs received in SCell become all DTXes are identical with the phase points associated with the results of error detection identical with b0 and b1 of the results of error detection on CWs received in PCell in the specific error detection result patterns in another ACK/NACK mapping table used when the number of CCs is one (e.g., FIG. 6B). The same applies to FIGS. 28A and B.

Accordingly, even when the understanding about number of CCs configured for a terminal is different between a base station and the terminal, the base station can correctly determine the response signals for PCell and SCell.

However, LTE-Advanced may support three or four downlink component carriers in the future. In this case, mapping supporting three or four downlink component carriers while reusing the mapping optimized for a case where the number of downlink component carriers is two is preferably used in terms of simplification of the configurations of terminals and base stations.

In this regard, implicitly signaling the PUCCH resources for a maximum number of CWs supported in PCell in dynamic scheduling has been proposed (see, "Panasonic, 3GPP RAN1 meeting #63bis, R1-110192, "Text Proposal for PUCCH Resource Allocation for channel selection," January 2011"). For example, when the MIMO mode is configured in PCell (in case of transmission of a maximum of two CWs), two PUCCH resources are implicitly signaled. In this case, one of the two implicitly signaled PUCCH resources is associated in a one-to-one correspondence with the top CCE index of the CCEs occupied by the PDCCH indicating the assignment of PDSCH in PCell. In addition, the other implicitly signaled PUCCH resource is associated in a one-to-one correspondence with the second CCE index subsequent to the top CCE index of the CCEs occupied by the PDCCH indicating the assignment of PDSCH in PCell.

Meanwhile, when the non-MIMO mode is configured in PCell, one PUCCH resource is implicitly signaled. The PUCCH resource is associated in a one-to-one correspondence with the top CCE index of the CCEs occupied by the PDCCH indicating the assignment of PDSCH in PCell.

For example, in FIGS. 27C and 28C, the MIMO mode is configured in PCell. Accordingly, PUCCH resource 1 (Ch1) and PUCCH resource 2 (Ch2) are implicitly signaled in FIGS. 27C and 28C. Meanwhile, PUCCH resource 3 (Ch3) and PUCCH resource 4 (Ch4) are explicitly signaled in FIGS. 27C and 28C.

In addition, an assumption is made that the MIMO mode is configured in PCell while the non-MIMO mode is configured in SCell in FIGS. 27B and 28B. In this case, PUCCH resource 1 (Ch1) and PUCCH resource 2 (Ch2) are implicitly signaled and PUCCH resource 3 (Ch3) is explicitly signaled in FIGS. 27B and 28B.

Alternatively, an assumption is made that the non-MIMO mode is configured in PCell and the MIMO mode is configured in SCell in FIGS. 27B and 28B. In this case, PUCCH resource 3 (Ch3) is implicitly signaled and PUCCH resource 1 (Ch1) and PUCCH resource 2 (Ch2) are explicitly signaled in FIGS. 27B and 28B.

Moreover, the non-MIMO mode is configured in PCell and SCell in FIGS. 27A and 28A. In this case, PUCCH resource 1 (Ch1) is implicitly signaled and PUCCH resource 2 (Ch2) is explicitly signaled in FIGS. 27A and 28A.

As described above, when the number of bits of an error detection result pattern is not greater than four, the terminal can feed back the response signals using channel selection. FIG. 29 illustrates the number of CWs on PCell, the numbers of CWs on SCells (i.e., SCells 1 to 3) and the number of ACK/NACK signals (the number of ACK/NACK bits representing an error detection result pattern) used for feedback of response signals using channel selection in a case where the numbers of downlink component carriers are two (two CCs), three (three CCs) and four (four CCs).

For example, in FIG. 29, the number of ACK/NACK bits is three when the number of downlink component carriers is three and the non-MIMO mode is configured in each of PCell, SCell 1 and SCell 2. Accordingly, the terminal uses the mapping for three bits (ACK/NACK mapping table) illustrated in FIGS. 27B and 28B.

Meanwhile, the number of ACK/NACK bits is four when the number of downlink component carriers is three (three CCs) and the MIMO mode is configured in one of PCell, SCell 1 and SCell 2 and the non-MIMO mode is configured in each of the other two Cells in FIG. 29. Accordingly, the terminal uses the mapping for four bits (i.e., ACK/NACK mapping table) illustrated in FIGS. 27C and 28C.

The number of ACK/NACK bits is four in a case where the number of downlink component carriers is four (four CCs) and the non-MIMO mode is configured in each of PCell and SCells 1 to 3 in FIG. 29. Accordingly, the terminal uses the mapping for four bits (i.e., ACK/NACK mapping table) illustrated in FIGS. 27C and 28C.

However, when the number of bits of an error detection result pattern is not greater than four, while the number of downlink component carriers is three or four and the non-MIMO mode is configured in PCell, all the PUCCH resources need to be explicitly signaled (see, "LG Electronics, 3GPP RAN1 meeting #63, R1-106129, "PUCCH resource allocation for ACK/NACK," November 2010," for example). In other words, implicit signaling cannot be used in a case where the number of bits of an error detection result pattern is not greater than four, while the number of downlink component carriers is three or four and the non-MIMO mode is configured in PCell.

Figure 30:
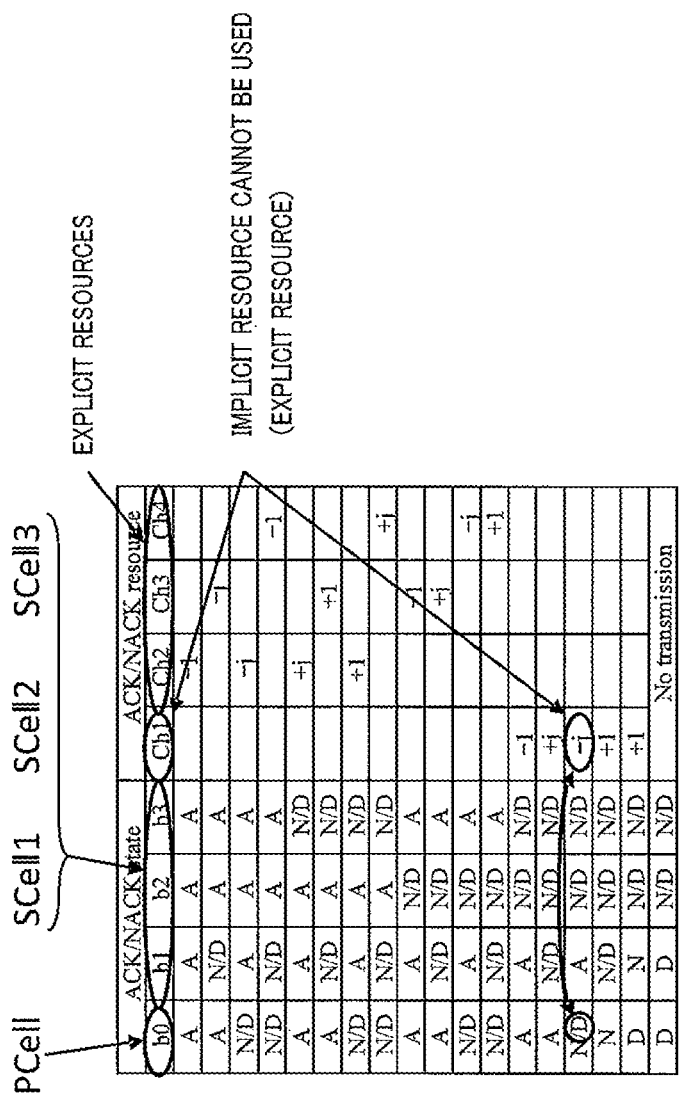
FIG. 30 is a diagram provided for describing reasons why implicit signaling according to Embodiment 2 of the claimed invention cannot be used.

Hereinafter, a description will be provided regarding the reasons why implicit signaling cannot be used when the number of bits of an error detection result pattern is not greater than four, while the number of downlink component carriers is three or four and the non-MIMO mode is configured in PCell. As an example, a description will be provided regarding a case where the four downlink component carriers including PCell and SCells 1 to 3 are configured for one terminal and the non-MIMO mode is configured in each of the downlink component carriers as illustrated in FIG. 30 (i.e., same ACK/NACK mapping table as that in FIG. 28C). More specifically, as illustrated in FIG. 30, the results of error detection on PCell, SCell 1, SCell 2 and SCell 3 are represented by four bits, which are b0, b1, b2 and b3, respectively.

As described above, according to the method in which the PUCCH resources for the maximum number of CWs supported by PCell are implicitly signaled, PUCCH resource 1 (Ch1) is implicitly signaled and PUCCH resources 2 to 4 (Ch2 to Ch4) are explicit signaled. To put it differently, PUCCH resource 1 (Ch1) is associated in a one-to-one correspondence with the top CCE index of the CCEs occupied by the PDCCH indicating the assignment of the PDSCH in PCell.

As illustrated in FIG. 30, the ACK/NACK states (b0, b1, b2 and b3)=(D, A, N/D, and N/D) are mapped to the phase point "-j" of PUCCH resource 1 (Ch1). However, the result of error detection result on PCell, b0, is DTX, which means that the terminal has failed to receive the PDCCH intended for the terminal in PCell. For this reason, the terminal cannot identify the position of PUCCH resource 1 (CH1) in this case.

Accordingly, in FIG. 30, when PUCCH resource 1 (Ch1) is implicitly signaled, the terminal cannot feedback the ACK/NACK states (b0, b1, b2 and b3)=(D, A, N/D, N/D) to the base station. For this reason, when the ACK/NACK states (b0, b1, b2 and b3)=(D, A, N/D, N/D), the terminal cannot feedback an ACK to the base station even though the result of error detection on SCell, b1, is an ACK. Accordingly, the base station performs unnecessary retransmission processing for SCell 1 although the result of error detection on SCell, b1, is an ACK.

Because of the reasons mentioned above, when the number of bits of an error detection result pattern is not greater than four, while the number of downlink component carriers is three or four and non-MIMO is configured in PCell, all PUCCH resources 1 to 4 (Ch1 to Ch4) need to be explicitly signaled.

Meanwhile, when the number of bits of an error detection result pattern is four while the number of downlink component carriers is two, PUCCH resources 1 and 2 (Ch1 and Ch2) are implicitly signaled using a single PDCCH in PCell. More specifically, when receiving the abovementioned PDCCH normally, the terminal can identify both of PUCCH resources 1 and 2 (Ch1 and Ch2). However, when failing to receive the abovementioned PDCCH, the terminal cannot identify neither PUCCH resource 1 nor 2 (Ch1 nor Ch2). To put it differently, no such situation where "DTX, ACK" occurs as the results of error detection on two CWs received in PCell. More specifically, when the number of downlink component carriers is two, the results of error detection would not be the ACK/NACK states (b0, b1, b2 and b3)=(D, A, N/D, N/D) in FIG. 28C. Accordingly, such a situation where the implicitly signaled PUCCH resource cannot be used does not occur when the number of downlink component carriers is two.

Likewise, when the number of bits of an error detection result pattern is three, while the number of downlink component carriers is two and the non-MIMO mode is configured in PCell, PUCCH resource 3 (Ch3) is implicitly signaled using the PDCCH in PCell as illustrated in FIG. 19, for example. As illustrated in FIG. 28B, in this case, PUCCH resource 3 (Ch3) is used when the result of error detection on the CW received in PCell is an ACK or NACK. To put it differently, as illustrated in FIG. 28B, when PUCCH resource 3 (Ch3) is used, the terminal is in a state where the terminal has received the PDCCH normally. Accordingly, in this case as well, no such situation where the implicitly signaled PUCCH resource cannot be used as described above occurs.

Meanwhile, if all PUCCH resources 1 to 4 (Ch1 to Ch4) are explicitly signaled when the number of bits of an error detection result pattern is not greater than four while the number of downlink component carriers is three or four, the overhead of the PUCCH resources is increased.

Meanwhile, the PUCCH resources to be implicitly signaled are associated in a one-to-one correspondence with the CCEs (i.e., CCE index) occupied by the PDCCH indicating the assignment of the PDSCH. For this reason, the PUCCH resources occupy the PUCCH resource region in size defined depending on the CCE index. In contrast to such a PUCCH resource, the PUCCH resource to be explicitly signaled occupies a PUCCH resource region configured additionally and separately from the resource to be implicitly signaled.

Meanwhile, the PUCCH resource to be explicitly signaled preferably occupies a PUCCH resource region different from a PUCCH resource region occupied by the PUCCH resource to be implicitly signaled. This is because, when PUCCH resources to be implicitly signaled and PUCCH resources to be explicitly signaled are shared, and if a certain terminal uses a shared resource as an explicitly signaled PUCCH resource, the shared PUCCH resource cannot be used in the terminal and other terminals as a PUCCH resource to be implicitly signaled in consideration of a possible collision with the shared PUCCH resource. As described, sharing implicitly signaled PUCCH resources and explicitly signaled PUCCH resources provides restrictions on scheduling in base stations.

When explicitly signaled PUCCH resources and implicitly signaled PUCCH resources are not shared, the explicitly signaled PUCCH resources are configured separately from the implicitly signaled PUCCH resources. Accordingly, as the number of the PUCCH resources to be explicitly signaled among the PUCCH resources used for feeding back response signals is increased, the amount of overhead of the PUCCH is increased.

As described above, when the number of bits of an error detection result pattern is not greater than four, while the number of downlink component carriers is three or four and the non-MIMO mode is configured in PCell, there may be a situation where the implicitly signaled PUCCH resource in PCell cannot be identified, so that unnecessary retransmission is performed. Meanwhile, if explicitly signaled PUCCH resources are used alone, the overhead of the PUCCH becomes larger.

In this respect, when the number of bits of an error detection result pattern is not greater than four while the number of downlink component carriers is three or four, the terminal switches the combination of the PUCCH resource to be implicitly signaled and an ACK/NACK bit representing the result of error detection on an CW received in PCell, on the basis of the transmission mode configured in PCell and the ACK/NACK mapping table.

(Operations of Base Station 100 and Terminal 200)

A description will be provided regarding operations of base station 100 (FIG. 10) and terminal 200 (FIG. 11) according to Embodiment 2.

Hereinafter, a description will be provided regarding a case where the number of downlink component carriers is not greater than four while the number of bits (i.e., number of ACK/NACK bits) forming an error detection result pattern is equal to or greater than the number of downlink component carriers but not greater than four.

Hereinafter, a description will be provided regarding cases 1 to 8 in which the number of downlink component carriers, the number of ACK/NACK bits and the transmission mode configured in PCell are different.

(Case 1: Where Number of Downlink Component Carriers is Two and Number of ACK/NACK Bits is Four)

More specifically, in case 1, the MIMO mode is configured in each of PCell and SCell.

In case 1, terminals 200 use mapping for four bits (i.e., ACK/NACK mapping table) illustrated in FIG. 27C and FIG. 28C. In FIG. 28C, bits b0 and b1 respectively represent the results of error detection on two CWs received in PCell and bits b2 and b3 respectively represent the results of error detection on two CWs received in SCell.

In addition, in case 1, the PUCCH resources for the maximum number of CWs supported in PCell in dynamic scheduling are implicitly signaled. Accordingly, since the MIMO mode is configured in PCell in case 1, two PUCCH resources are implicitly signaled.

For example, in FIG. 27C and FIG. 28C, PUCCH resource 1 (Ch1) and PUCCH resource 2 (Ch2) are implicitly signaled and PUCCH resource 3 (Ch3) and PUCCH resource 4 (Ch4) are explicitly signaled.

In case 1, base station 100 notifies terminals 200 of four PUCCH resources 1 to 4 (Ch1 to Ch4) as described above.

(Case 2: Where Number of Downlink Component Carriers is Two, Number of ACK/NACK Bits is Three and MIMO Transmission Mode is Configured in PCell)

More specifically, the MIMO mode is configured in PCell and the non-MIMO mode is configured in SCell in case 2.

In case 1, terminals 200 use mapping for three bits (i.e., ACK/NACK mapping table) illustrated in FIG. 27B and FIG. 28B. In FIG. 28B, bits b0 and b1 respectively represent the results of error detection on two CWs received in PCell and bit b2 represents the result of error detection on single CW received in SCell.

In addition, in case 2, the PUCCH resources for the maximum number of CWs supported in PCell in dynamic scheduling are implicitly signaled. Accordingly, since the MIMO mode is configured in PCell in case 2, two PUCCH resources are implicitly signaled.

For example, in FIG. 27B and FIG. 28B, PUCCH resource 1 (Ch1) and PUCCH resource 2 (Ch2) are implicitly signaled and PUCCH resource 3 (Ch3) is explicitly signaled.

In case 2, base station 100 notifies terminals 200 of three PUCCH resources 1 to 3 (Ch1 to Ch3) as described above.

(Case 3: Where Number of Downlink Component Carriers is Two, Number of ACK/NACK Bits is Three and Non-MIMO Transmission Mode is Configured in PCell)

More specifically, the non-MIMO mode is configured in PCell and the MIMO mode is configured in SCell in case 3.

In case 3, terminals 200 use mapping for three bits (i.e., ACK/NACK mapping table) illustrated in FIG. 27B and FIG. 28B. In FIG. 28B, bits b0 and b1 respectively represent the results of error detection on two CWs received in SCell and bit b2 represents the result of error detection on single CW received in PCell.

In addition, in case 3, the PUCCH resources for the maximum number of CWs supported in PCell in dynamic scheduling are implicitly signaled. Accordingly, since the non-MIMO mode is configured in PCell in case 3, one PUCCH resource is implicitly signaled.

For example, in FIG. 27B and FIG. 28B, PUCCH resource 3 (Ch3) is implicitly signaled and PUCCH resource 1 (Ch1) and PUCCH resource 2 (Ch2) are explicitly signaled.

In case 3, base station 100 notifies terminals 200 of three PUCCH resources 1 to 3 (Ch1 to Ch3) as described above.

(Case 4: Where Number of Downlink Component Carriers is Two and Number of ACK/NACK Bits is Two)

More specifically, the non-MIMO mode is configured in each of PCell and SCell in case 4.

In case 4, terminals 200 use mapping for two bits (i.e., ACK/NACK mapping table) illustrated in FIG. 27A and FIG. 28A. In FIG. 28A, bit b0 represents the result of error detection on single CW received in PCell and bit b1 represents the result of error detection on single CW received in SCell.

In addition, in case 4, the PUCCH resources for the maximum number of CWs supported in PCell in dynamic scheduling are implicitly signaled. Accordingly, since the non-MIMO mode is configured in PCell in case 4, one PUCCH resource is implicitly signaled.

For example, in FIG. 27A and FIG. 28A, PUCCH resource 1 (Ch1) is implicitly signaled and PUCCH resource 2 (Ch2) is explicitly signaled.

In case 4, base station 100 notifies terminals 200 of two PUCCH resources 1 and 2 (Ch1 and Ch2) as described above.

(Case 5: Where Number of Downlink Component Carriers is Three, Number of ACK/NACK Bits is Four and MIMO Transmission Mode is Configured in PCell)

More specifically, the MIMO mode is configured in PCell and the non-MIMO mode is configured in SCells 1 and 2 in case 5.

In case 5, terminals 200 use mapping for four bits (i.e., ACK/NACK mapping table) illustrated in FIG. 27C and FIG. 28C. In FIG. 28C, bits b0 and b1 respectively represent the results of error detection on two CWs received in PCell and bits b2 and b3 represent the results of error detection on two CWs received in SCells 1 and 2, respectively.

In addition, in case 5, the PUCCH resources for the maximum number of CWs supported in PCell in dynamic scheduling are implicitly signaled. Accordingly, since the MIMO mode is configured in PCell in case 5, two PUCCH resources are implicitly signaled.

For example, in FIG. 27C and FIG. 28C, PUCCH resource 1 (Ch1) and PUCCH resource (Ch2) are implicitly signaled, and PUCCH resource 3 (Ch3) and PUCCH resource 4 (Ch4) are explicitly signaled.

In case 5, base station 100 notifies terminals 200 of four PUCCH resources 1 to 4 (Ch1 to Ch4) as described above.

(Case 6: Where Number of Downlink Component Carriers is Four and Number of ACK/NACK Bits is Four)

More specifically, the non-MIMO mode is configured in each of PCell and SCells 1 to 3 in case 6.

Figure 31:
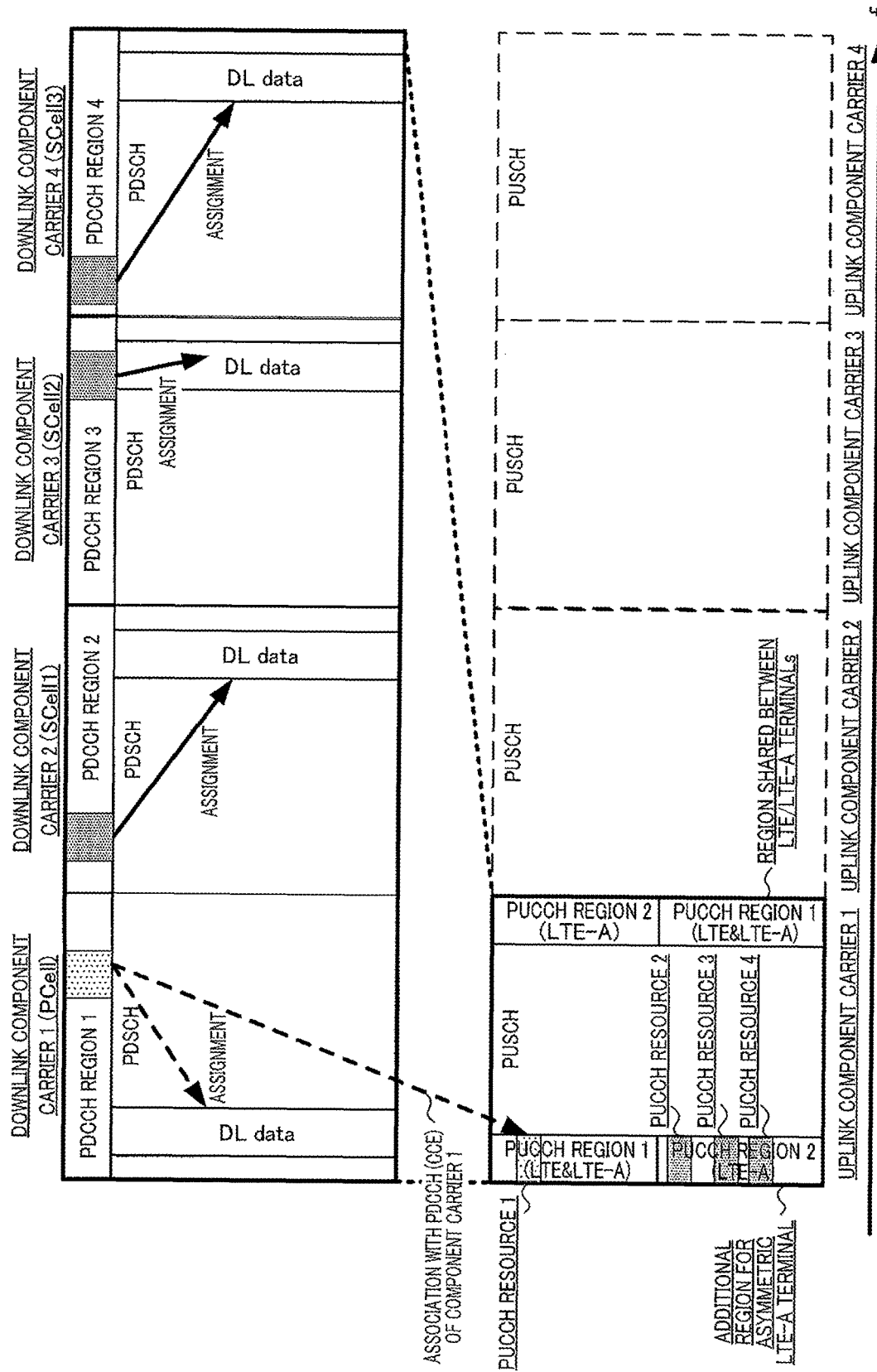
FIG. 31 illustrates a control example for PUCCH resources according to Embodiment 2 of the claimed invention (case 6)

FIG. 31 illustrates the method of determining the PUCCH resource in PCell and SCells 1 to 3 in the case where the number of downlink component carriers is four, for example.

In case 6, terminals 200 use mapping for four bits (i.e., ACK/NACK mapping table) illustrated in FIG. 27C and FIG. 28C. In FIG. 32A (i.e., the same ACK/NACK mapping table as that in FIG. 28C), bit b0 represents the result of error detection on single CW received in PCell and bits b1 to b3 represent the results of error detection on three CWs received in SCells 1 to 3, respectively.

In addition, in case 6, the PUCCH resources for the maximum number of CWs supported in PCell in dynamic scheduling are implicitly signaled. Accordingly, since the non-MIMO mode is configured in PCell in case 6, one PUCCH resource is implicitly signaled.

In case 6, the PUCCH resource to be implicitly signaled is PUCCH resource 3 (Ch3) as illustrated in FIG. 32A. In other words, in FIG. 32A, the PUCCH resources to be explicitly signaled are PUCCH resources 1, 2 and 4 (Chs 1, 2 and 4) in FIG. 32A.

As illustrated in FIG. 32A, the cases where PUCCH resource 3 (Ch3) is used are when the ACK/NACK states (b0, b1, b2 and b3) are (A, N/D, A and A), (A, N/D, A and N/D), (A, A, N/D and A) and (A, N/D, N/D, and A).

In FIG. 32A, a description will be provided with reference to bit "b0," which represents the result of error detection on the CW received on PCell (i.e., result of error detection on the PDCCH inn PCell). As illustrated in FIG. 32A, when PUCCH resource 3 (Ch3) is used, bit b0 is always an "ACK." More specifically, the ratio of ACK to NACK for PUCCH resource 3 (Ch3) as illustrated in FIG. 32A (A:N) is A:N=1:0(=4:0). In other words, terminals 200 use PUCCH resource 3 (Ch3) for transmission of the response signals only when the result of error detection on the CW received in PCell is an "ACK."

As described above, PUCCH resource 3 (Ch3) is the PUCCH resource used only when terminal 200 succeeds in receiving the PDCCH intended for terminal 200 (i.e., indication to assign PDSCH) in PCell (i.e., when b0=ACK). In other words, when terminal 200 fails to receive the PDCCH intended for terminal 200 in PCell (b0=DTX), PUCCH resource 3 (Ch3) is not used. More specifically, as illustrated in FIG. 32A, terminal 200 uses one of explicitly signaled PUCCH resources 1, 2 and 4 when failing to receive the PDCCH intended for terminal 200 in PCell (b0=DTX). To put it differently, PUCCH resource 3 (Ch3) supports implicit signaling for bit b0.

Accordingly, it is possible to prevent unnecessary retransmission processing from occurring due to a situation where terminal 200 cannot identify the position of the PUCCH resource used for transmission of the response signals.

As described above, in the ACK/NACK mapping table (FIG. 32A) in case 6, the PUCCH resource associated in a one-to-one correspondence with the top CCE index of the CCEs occupied by the PDCCH indicating the assignment of PDSCH in PCell (i.e., PUCCH resource 3 in FIG. 32A) is the PUCCH resource in which the result of error detection on the CW received in PCell becomes only an ACK in each of the error detection result patterns associated with the PUCCH resource (i.e., b0 in FIG. 32A).

Alternatively, in the ACK/NACK mapping table in case 6, the PUCCH resource to be implicitly signaled may be the PUCCH resource in which the result of error detection on the CW received in PCell becomes only a NACK (i.e., result other than DTX) in each of the error detection result patterns associated with the PUCCH resource.

In addition, case 6 is compared with case 1 (i.e., case where the number of downlink component carriers is two and the number of ACK/NACK bits is four), for example. In case 1 (FIG. 28C), the PUCCH resource to be implicitly signaled is PUCCH resource 1 (Ch1). On the other hand, in case 6 (FIG. 32A), the PUCCH resource to be implicitly signaled is PUCCH resource 3 (Ch3). In other words, case 6 (i.e., PCell: non-MIMO mode) and case 1 (i.e., PCell: MIMO mode) use the same number of ACK/NACK bits and the same ACK/NACK mapping table, but use a different PUCCH resource to be implicitly signaled.

In addition, case 6 and case 1 use a different combination of the PUCCH resource to be implicitly signaled and the bit representing the result of error detection on the CW received in PCell (i.e., PUCCH resource 3 and b0 in case 6 and PUCCH resource 0 and b0 in case 1).

As described above, the PUCCH resource other than PUCCH resource 1 (Ch1) to be implicitly signaled when the number of downlink component carriers is two (FIG. 28C) (i.e., PUCCH resource 3 (Ch3) herein) is set as the PUCCH resource to be implicitly signaled in case 6 (i.e., where the number of downlink component carriers is four). Accordingly, even when the number of downlink component carriers is four, the ACK/NACK mapping table used when the number of downlink component carriers is two can be used to report the PUCCH resource by implicit signaling.

In this manner, in case 6, it is possible to prevent occurrence of the situation where terminal 200 cannot identify the implicitly signaled PUCCH resource in PCell. More specifically, it is possible to prevent unnecessary retransmission processing from occurring in base station 100 due to the situation where terminal 200 cannot identify the position of the PUCCH resource used for feeding back the response signals.

Moreover, in case 6, a part of the PUCCH resources used for feeding back the response signals is reported to terminal 200 from base station 100 by implicit signaling. Accordingly, as compared with a case where base station 100 reports all the PUCCH resources to terminals 200 by explicit signaling, the number of PUCCH resources to be explicitly signaled can be reduced, which in turn reduces an increase in the overhead of PUCCH.

Figure 32B:
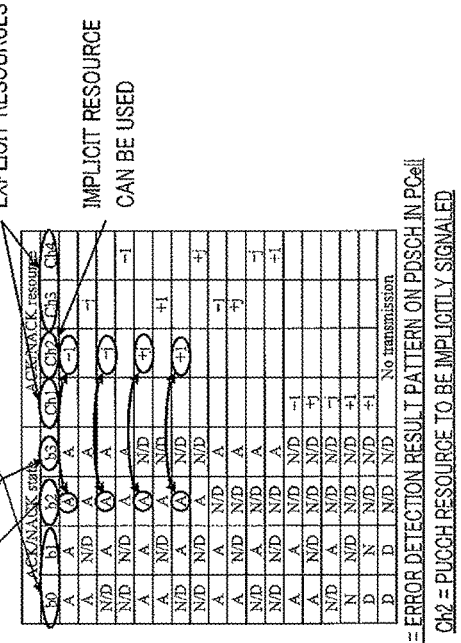
FIGS. 32A-32C illustrate an example of the ACK/NACK mapping table according to Embodiment 2 of the claimed invention (case 6)
Figure 32A:
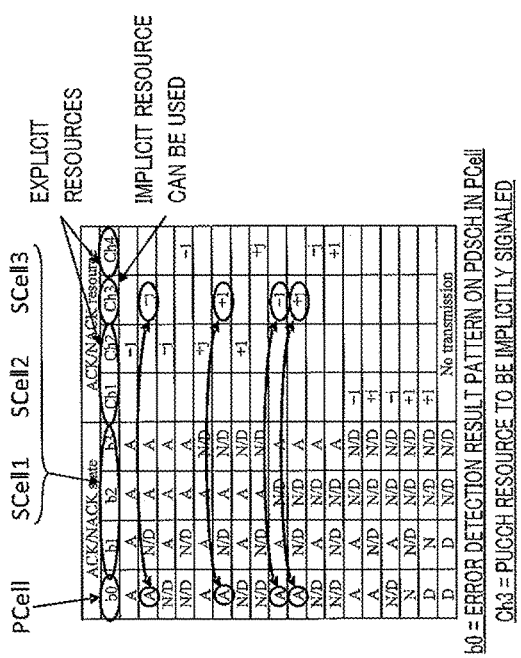
Figure 32C:
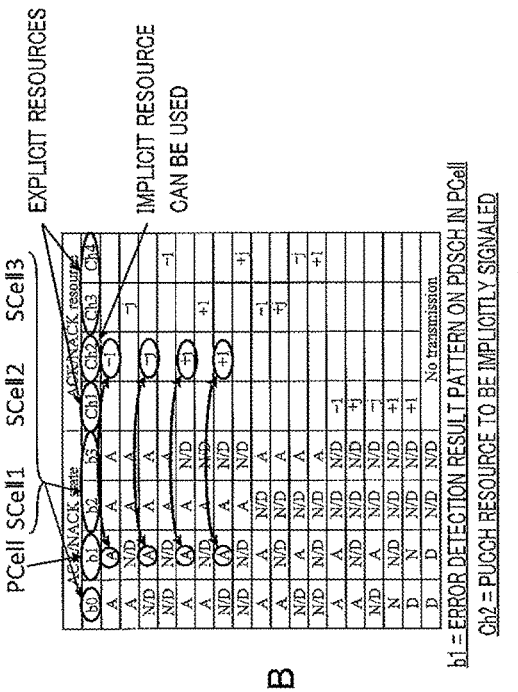

It should be noted that, the ACK/NACK mapping table is by no means limited to the one illustrated in FIG. 32A, and the ACK/NACK mapping tables illustrated in FIG. 32B and FIG. 32C can be used, for example.

In FIG. 32B, the bit representing the result of error detection on the CW received in PCell is "b1." In FIG. 32B, the PUCCH resource to be implicitly signaled is PUCCH resource 2 (Ch2). As illustrated in FIG. 32B, when PUCCH resource 2 (Ch2) is used, bit b1 is always an "ACK." Accordingly, PUCCH resource 2 (Ch2) is the PUCCH resource used only when terminal 200 succeeds in receiving the PDCCH intended for terminal 200 in PCell (b1=ACK). More specifically, PUCCH resource 2 (Ch2) is not used when terminal 200 fails to receive the PDCCH intended for terminal 200 in PCell (b1=DTX). In other words, PUCCH resource 2 illustrated in FIG. 32B supports implicit signaling for bit b1.

In addition, in comparison between FIG. 32B and case 1 (FIG. 28C), the case in FIG. 32B and case 1 use the same number of ACK/NACK bits (i.e., four bits) and the same ACK/NACK mapping table, but use a different PUCCH resource to be implicitly signaled. In addition, the cases in FIG. 32B and FIG. 28C include a different combination of the PUCCH resource to be implicitly signaled and the bit representing the result of error detection on the CW received in PCell (i.e., PUCCH resource 2 and b1 in FIG. 32B and PUCCH resource 0 and b0 in FIG. 28C).

Likewise, the bit representing the result of error detection on the CW received on PCell is "b2" in FIG. 32C. In addition, the PUCCH resource to be implicitly signaled is PUCCH resource 2 (Ch2) in FIG. 32C. As illustrated in FIG. 32C, when PUCCH resource 2 (Ch2) is used, bit b2 is always an "ACK." Accordingly, PUCCH resource 2 (Ch2) is the PUCCH resource used only when terminal 200 succeeds in receiving the PDCCH intended for terminal 200 in PCell (b2=ACK). More specifically, PUCCH resource 2 (Ch2) is not used when terminal 200 fails to receive the PDCCH intended for terminal 200 in PCell (b2=DTX). In other words, PUCCH resource 2 illustrated in FIG. 32C supports implicit signaling for bit b2.

In addition, in comparison between FIG. 32C and FIG. 28C (e.g., case 1), the case in FIG. 32C and case 1 use the same number of ACK/NACK bits (i.e., four bits) and the same ACK/NACK mapping table, but use a different PUCCH resource to be implicitly signaled.

Furthermore, in comparison between FIG. 32C and FIG. 28C (e.g., case 1), while the bits representing the results of error detection on the PDSCH in PCell 1 are "b0 and b1" in FIG. 28C, the bit representing the result of error detection on the PDSCH in PCell is "b2" in FIG. 32C. More specifically, the bits representing the results of error detection on the PDSCH in PCell are different in FIG. 32C and FIG. 28C. Moreover, the cases in FIG. 32C and FIG. 28C use a different combination of the PUCCH resource to be implicitly signaled and the bit representing the result of error detection on the CW received in PCell (i.e., PUCCH resource 2 and b2 in FIG. 32C and PUCCH resource 0 and b0 in FIG. 28C).

(Case 7: Where Number of Downlink Component Carriers is Three, Number of ACK/NACK Bit is Four and Non-MIMO Mode is Configured in Transmission Mode of PCell)

More specifically, the non-MIMO mode is configured in PCell and the non-MIMO mode is configured in one of SCells 1 and 2 while the MIMO mode is configured in the other one of SCells 1 and 2 in case 7.

Figure 33:
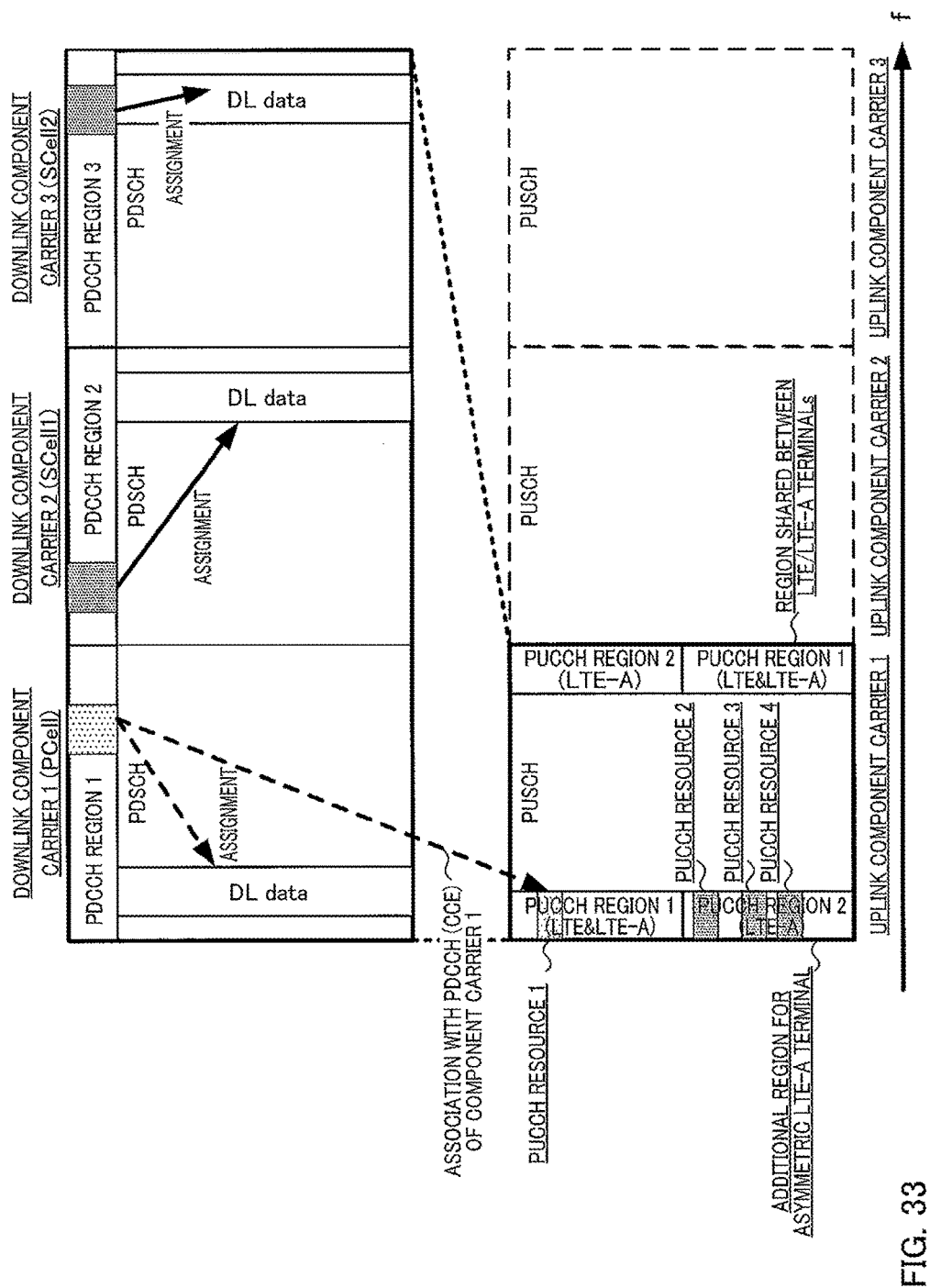
FIG. 33 illustrates a control example for PUCCH resources according to Embodiment 2 of the claimed invention (case 7)

FIG. 33 illustrates the method of determining the PUCCH resource in PCell and SCells 1 and 2 in the case where the number of downlink component carriers is three, for example.

In case 7, terminals 200 use mapping for four bits (i.e., ACK/NACK mapping table) illustrated in FIG. 27C and FIG. 28C. As illustrated in FIG. 34A (i.e., the same ACK/NACK mapping table as that in FIG. 28C), bit b0 represents the result of error detection on single CW received in PCell and bits b1 to b3 represent the results of error detection on three CWs received in SCells 1 and 2.

In addition, in case 7, the PUCCH resources for the maximum number of CWs supported in PCell in dynamic scheduling are implicitly signaled. Accordingly, since the non-MIMO mode is configured in PCell in case 7, one PUCCH resource is implicitly signaled.

In case 7, the PUCCH resource to be implicitly signaled is PUCCH resource 3 (Ch3) as illustrated in FIG. 34A. In other words, the PUCCH resources to be explicitly signaled are PUCCH resources 1, 2 and 4 (Chs 1, 2 and 4) in FIG. 34A.

As illustrated in FIG. 34A, when PUCCH resource 3 (Ch3) is used, bit b0 is always an "ACK" as in case 6. More specifically, the ratio of ACK to NACK for PUCCH resource 3 (Ch3) as illustrated in FIG. 34A (A:N) is A:N=1:0(=4:0). In other words, terminal 200 uses PUCCH resource 3 (Ch3) for transmission of the response signals only when the result of error detection on the CW received in PCell is an "ACK" (b0=ACK). To put it differently, when terminal 200 fails to receive the PDCCH intended for terminal 200 in PCell (b0=DTX), PUCCH resource 3 (Ch3) is not used. In short, PUCCH resource 3 (Ch3) supports implicit signaling for bit b0.

Accordingly, it is possible to prevent unnecessary retransmission processing from occurring in base station 100 due to the situation where terminal 200 cannot identify the position of the PUCCH resource used for transmission of the response signals.

As described above, in the ACK/NACK mapping table (FIG. 34A) in case 6, the PUCCH resource associated in a one-to-one correspondence with the top CCE index of the CCEs occupied by the PDCCH indicating the assignment of PDSCH in PCell (i.e., PUCCH resource 3 in FIG. 34A) is the PUCCH resource in which the result of error detection on the CW received in PCell becomes only an ACK in each of the error detection result patterns associated with the PUCCH resource (i.e., b0 in FIG. 34A).

Alternatively, in the ACK/NACK mapping table in case 7, the PUCCH resource to be implicitly signaled may be the PUCCH resource in which the result of error detection on the CW received in PCell becomes only a NACK (i.e., result other than DTX) in each of the error detection result patterns associated with the PUCCH resource.

For example, case 7 is compared with case 1 (the number of downlink component carriers is two and the number of ACK/NACK bits is four). In case 1 (FIG. 28C), the PUCCH resource to be implicitly signaled is PUCCH resource 1 (Ch1). In contrast to case 1, the PUCCH resource to be implicitly signaled is PUCCH resource 3 (Ch3) in case 7 (FIG. 34A). In other words, case 7 (PCell: non-MIMO mode) and case 1 (PCell: MIMO mode) use the same number of ACK/NACK bits and the same ACK/NACK mapping table, but use a different PUCCH resource to be implicitly signaled.

In addition, case 7 and case 1 include a different combination of the PUCCH resource to be implicitly signaled and the bit representing the result of error detection on the CW received in PCell (i.e., PUCCH resource 3 and b0 in case 7 and PUCCH resource 0 and b0 in case 1).

As described above, the PUCCH resource other than PUCCH resource 1 (Ch1) to be implicitly signaled when the number of downlink component carriers is two (FIG. 28C) (i.e., PUCCH resource 3 (Ch3) herein) is set as the PUCCH resource to be implicitly signaled in case 7 (i.e., the number of downlink component carriers is three (FIG. 34A)). Accordingly, even when the number of downlink component carriers is three, the ACK/NACK mapping table used when the number of downlink component carriers is two can be used to report the PUCCH resource by implicit signaling.

In this manner, in case 7, it is possible to prevent occurrence of the situation where terminal 200 cannot identify the implicitly signaled PUCCH resource in PCell. To put it more specifically, it is possible to prevent unnecessary retransmission processing from occurring in base station 100 due to the situation where terminal 200 cannot identify the position of the PUCCH resource used for transmission of the response signals.

Moreover, in case 7, a part of the PUCCH resources used for feeding back the response signals is reported to terminal 200 from base station 100 by implicit signaling. Accordingly, as compared with a case where base station 100 reports all the PUCCH resources to terminals 200 by explicit signaling, the number of PUCCH resources to be explicitly signaled can be reduced, which in turn reduces an increase in the overhead of PUCCH.

It should be noted that, the ACK/NACK mapping table is by no means limited to the one illustrated in FIG. 34A, and the ACK/NACK mapping tables illustrated in FIG. 34B and FIG. 34C can be used, for example.

In FIG. 34B, the bit representing the result of error detection on the CW received in PCell is "b1." In FIG. 34B, the PUCCH resource to be implicitly signaled is PUCCH resource 2 (Ch2). As illustrated in FIG. 34B, when PUCCH resource 2 (Ch2) is used, bit b1 is always an "ACK." Accordingly, PUCCH resource 2 (Ch2) is the PUCCH resource used only when terminal 200 succeeds in receiving the PDCCH intended for terminal 200 in PCell (b1=ACK). In other words, PUCCH resource 2 (Ch2) is not used when terminal 200 fails to receive the PDCCH intended for terminal 200 in PCell (b1=DTX). In short, PUCCH resource 2 illustrated in FIG. 34B supports implicit signaling for bit b1.

In addition, in comparison between FIG. 34B and case 1 (FIG. 28C), the case in FIG. 32B and case 1 use the same number of ACK/NACK bits (i.e., four bits) and the same ACK/NACK mapping table, but a different PUCCH resource to be implicitly signaled. In addition, the cases in FIG. 34B and FIG. 28C include a different combination of the PUCCH resource to be implicitly signaled and the bit representing the result of error detection on the CW received in PCell (i.e., PUCCH resource 2 and b1 in FIG. 34B and PUCCH resource 0 and b0 in FIG. 28C).

Likewise, the bit representing the result of error detection on the CW received on PCell is "b2" in FIG. 34C. In addition, the PUCCH resource to be implicitly signaled is PUCCH resource 2 (Ch2) in FIG. 34C. As illustrated in FIG. 34C, when PUCCH resource 2 (Ch2) is used, bit b2 is always an "ACK." Accordingly, PUCCH resource 2 (Ch2) is the PUCCH resource used only when terminal 200 succeeds in receiving the PDCCH intended for terminal 200 in PCell (b2=ACK). In other words, PUCCH resource 2 (Ch2) is not used when terminal 200 fails to receive the PDCCH intended for terminal 200 in PCell (b2=DTX). In short, PUCCH resource 2 illustrated in FIG. 34C supports implicit signaling for bit b2.

In addition, in comparison between FIG. 34C and case 1 (FIG. 28C), the case in FIG. 34C and case 1 use the same number of ACK/NACK bits (i.e., four bits) and the same ACK/NACK mapping table, but a different PUCCH resource to be implicitly signaled.

Furthermore, in comparison between FIG. 34C and case 1 (FIG. 28C), while the bits representing the results of error detection on the PDSCH in PCell 1 are "b0 and b1" in FIG. 28C, the bit representing the result of error detection on the PDSCH in PCell is "b2" in FIG. 34C. More specifically, the bits representing the results of error detection on the PDSCH in PCell are different in FIG. 34C and FIG. 28C. Moreover, the cases in FIG. 34C and FIG. 28C include a different combination of the PUCCH resource to be implicitly signaled and the bit representing the result of error detection on the CW received in PCell (i.e., PUCCH resource 2 and b2 in FIG. 34C and PUCCH resource 0 and b0 in FIG. 28C).

(Case 8: Where Number of Downlink Component Carriers is Three and Number of ACK/NACK bits is Three)

More specifically, the non-MIMO mode is configured in each of PCell and SCells 1 and 2 in case 8.

Figure 35:
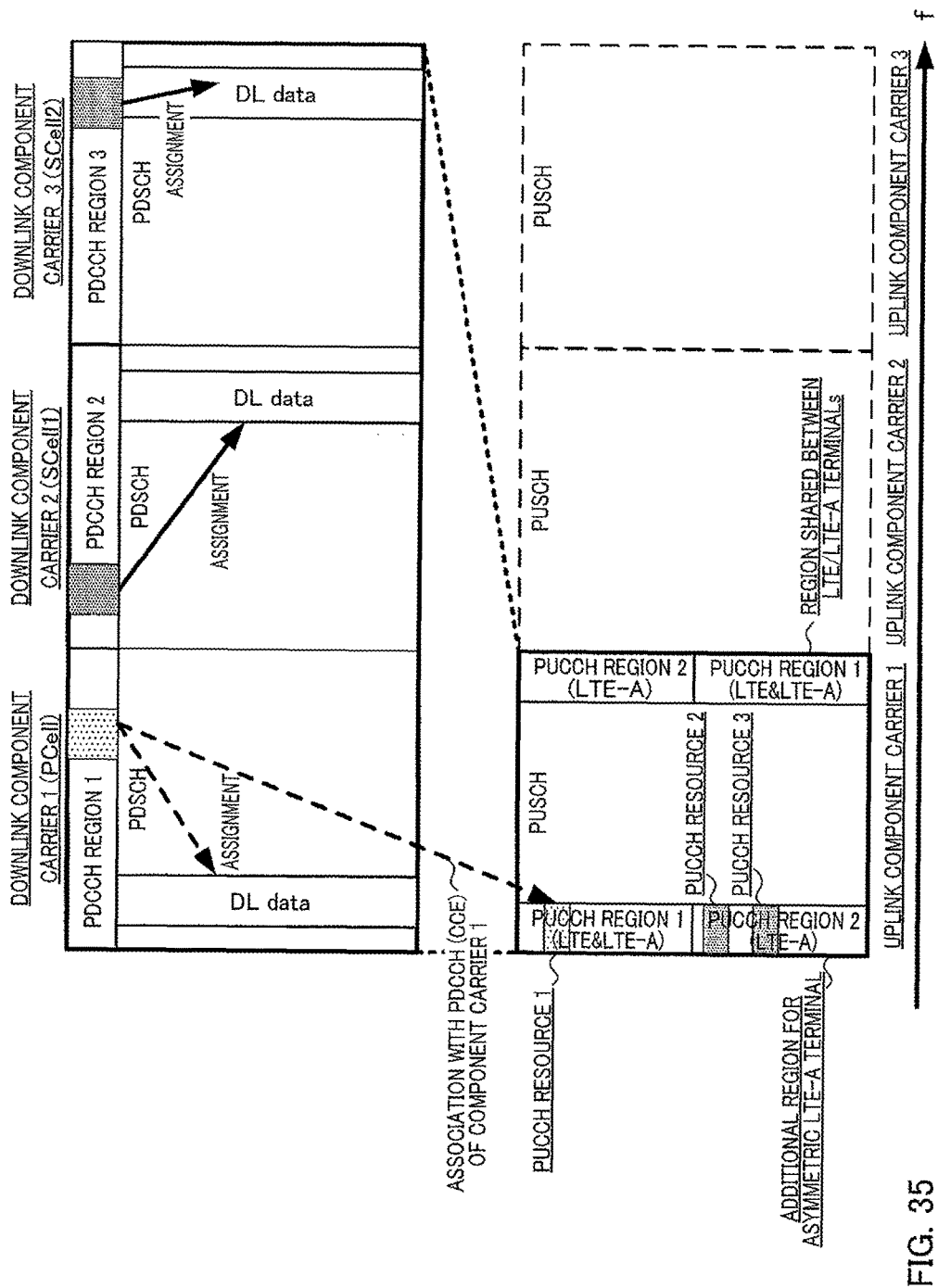
FIG. 35 illustrates a control example for PUCCH resources according to Embodiment 2 of the claimed invention (case 8)

FIG. 35 illustrates the method of determining the PUCCH resource in PCell and SCells 1 and 2 when the number of downlink component carriers is three, for example.

In case 8, terminals 200 use mapping for three bits (i.e., ACK/NACK mapping table) illustrated in FIG. 27B and FIG. 28B. As illustrated in FIG. 36A (i.e., the same ACK/NACK mapping table as that in FIG. 28B), bit b2 represents the result of error detection on single CW received in PCell and bits b0 and b1 represent the results of error detection on two CWs received in SCells 1 and 2, respectively.

In addition, in case 8, the PUCCH resources for the maximum number of CWs supported in PCell in dynamic scheduling are implicitly signaled. Accordingly, since the non-MIMO mode is configured in PCell in case 8, one PUCCH resource is implicitly signaled.

In case 8, the PUCCH resource to be implicitly signaled is PUCCH resource 3 (Ch3) as illustrated in FIG. 36A. More specifically, the PUCCH resource to be explicitly signaled is PUCCH resources 1 and 2 (Chs 1 and 2) in FIG. 36A.

As illustrated in FIG. 36A, when PUCCH resource 3 (Ch3) is used, bit b2 is always an "ACK" as in cases 6 and 7. More specifically, the ratio of ACK to NACK for PUCCH resource 3 (Ch3) as illustrated in FIG. 34A (A:N) is A:N=1:0(=3:0). In other words, terminal 200 uses PUCCH resource 3 (Ch3) for transmission of the response signals only when the result of error detection on the CW received in PCell is an "ACK" (b2=ACK). To put it differently, when terminal 200 fails to receive the PDCCH intended for terminal 200 in PCell (b2=DTX), PUCCH resource 3 (Ch3) is not used. In short, PUCCH resource 3 (Ch3) supports implicit signaling for bit b2.

Accordingly, it is possible to prevent unnecessary retransmission processing from occurring due to a situation where terminal 200 cannot identify the position of the PUCCH resource used for transmission of the response signals.

As described above, in the ACK/NACK mapping table (FIG. 36A) in case 8, the PUCCH resource associated in a one-to-one correspondence with the top CCE index of the CCEs occupied by the PDCCH indicating the assignment of PDSCH in PCell (i.e., PUCCH resource 3 in FIG. 36A) is the PUCCH resource in which the result of error detection on the CW received in PCell becomes only an ACK in each of the error detection result patterns associated with the PUCCH resource (i.e., b2 in FIG. 36A).

Alternatively, in the ACK/NACK mapping table in case 8, the PUCCH resource to be implicitly signaled may be the PUCCH resource in which the result of error detection on the CW received in PCell becomes only a NACK (i.e., result other than DTX) in each of the error detection result patterns associated with the PUCCH resource.

In addition, case 8 is compared with case 2 (the number of downlink component carriers is two while the number of ACK/NACK bits is three and the MIMO mode is configured in PCell), for example. In case 2 (FIG. 28B), the PUCCH resource to be implicitly signaled is PUCCH resource 1 (Ch1). In contrast to case 2, the PUCCH resource to be implicitly signaled is PUCCH resource 3 (Ch3) in case 8 (FIG. 36A). In other words, case 8 (PCell: non-MIMO mode) and case 2 (PCell: MIMO mode) use the same number of ACK/NACK bits and the same ACK/NACK mapping table, but a different PUCCH resource to be implicitly signaled.

Furthermore, while the bits representing the results of error detection on the PDSCH in PCell 1 are "b0 and b1" in FIG. 28B (i.e., case 2), the bit representing the result of error detection on the PDSCH in PCell is "b2" in FIG. 36A. More specifically, the bits representing the results of error detection on the PDSCH in PCell are different in FIG. 34A and FIG. 28B. Moreover, case 8 and case 1 include a different combination of the PUCCH resource to be implicitly signaled and the bit representing the result of error detection on the CW received in PCell (i.e., PUCCH resource 3 and b2 in case 8 and PUCCH resource 0 and b0 in case 1).

As described above, in case 8 (i.e., when the number of downlink component carriers is three (FIG. 36A)), the PUCCH resource other than the PUCCH resource 1 (Ch1) to be implicitly signaled when the number of downlink component carriers is two (FIG. 28B) (i.e., PUCCH resource 3 (Ch3) herein) is set as the PUCCH resource to be implicitly signaled. Accordingly, even when the number of downlink component carriers is three, the ACK/NACK mapping table used when the number of downlink component carriers is two can be used to report the PUCCH resource by implicit signaling.

In this manner, in case 8, it is possible to prevent occurrence of the situation where terminal 200 cannot identify the implicitly signaled PUCCH resource in PCell. In other words, it is possible to prevent unnecessary retransmission processing from occurring in base station 100 due to a situation where terminal 200 cannot identify the position of the PUCCH resource used for feeding back the response signals.

Moreover, in case 8, a part of the PUCCH resources used for feeding back the response signals is reported to terminal 200 from base station 100 by implicit signaling. Accordingly, as compared with a case where base station 100 reports all the PUCCH resources to terminals 200 by explicit signaling, the number of PUCCH resources to be explicitly signaled can be reduced, which in turn reduces an increase in the overhead of PUCCH in case 8.

Figure 36B:
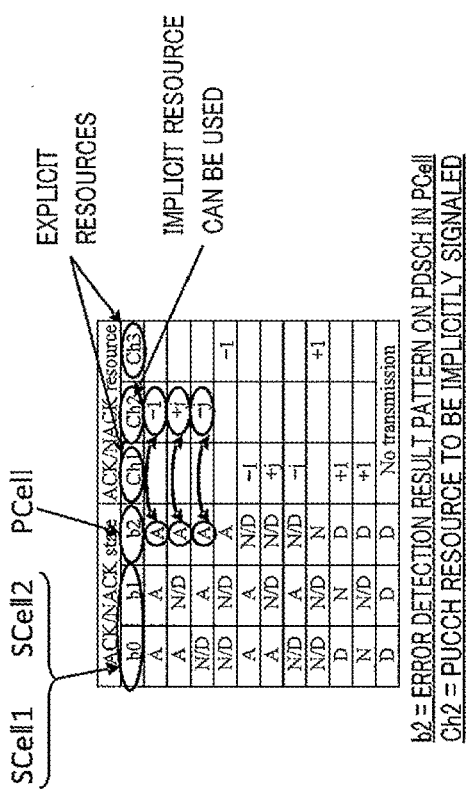
FIGS. 36A and 36B illustrate an example of the ACK/NACK mapping table according to Embodiment 2 of the claimed invention (case 8).
Figure 36A:
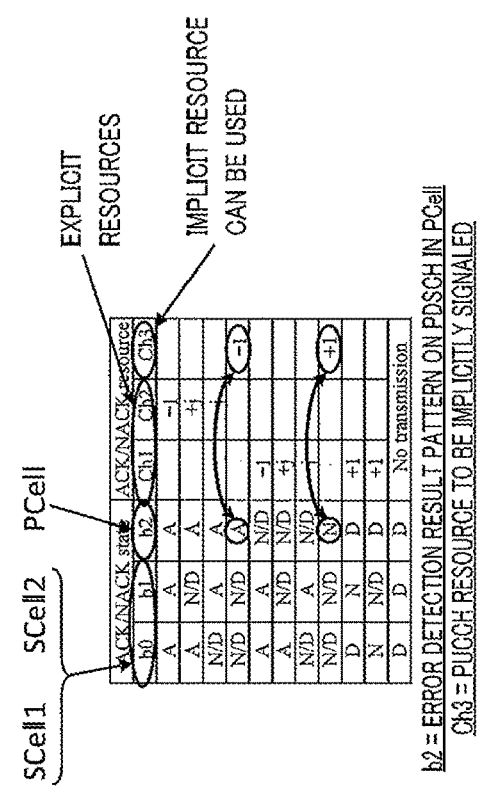

It should be noted that, the ACK/NACK mapping table is by no means limited to the one illustrated in FIG. 36A, and the ACK/NACK mapping table illustrated in FIG. 36B can be used, for example.

In FIG. 36B, the bit representing the result of error detection on the CW received in PCell is "b2." In FIG. 36B, the PUCCH resource to be implicitly signaled is PUCCH resource 2 (Ch2). As illustrated in FIG. 36B, when PUCCH resource 2 (Ch2) is used, bit b2 is always an "ACK."

Accordingly, PUCCH resource 2 (Ch2) is the PUCCH resource used only when terminal 200 succeeds in receiving the PDCCH intended for terminal 200 in PCell (b2=ACK). In other words, PUCCH resource 2 (Ch2) is not used when terminal 200 fails to receive the PDCCH intended for terminal 200 in PCell (b2=DTX). In short, PUCCH resource 2 illustrated in FIG. 36B supports implicit signaling for bit b2. More specifically, the bits representing the results of error detection on the PDSCH in PCell are different in FIG. 36B and FIG. 28B. Moreover, the cases in FIG. 36B and FIG. 28C include a different combination of the PUCCH resource to be implicitly signaled and the bit representing the result of error detection on the CW received in PCell (i.e., PUCCH resource 2 and b2 in FIG. 36B and PUCCH resource 0 and b0 in FIG. 28B).

Hereinabove, a description has been provided regarding cases 1 to 8 in each of which a different number of downlink component carriers and a different number of ACK/NACK bits are configured and a different transmission mode is configured in PCell.

As described above, terminal 200 (e.g., control sections 208) switches the combination of the PUCCH resource associated in a one-to-one correspondence with the top CCE index of the CCEs occupied by the PDCCH indicating the assignment of PDSCH in PCell (i.e., PUCCH resource to be implicitly signaled) and the ACK/NACK bit representing the result of error detection on PDSCH in PCell on the basis of the transmission mode configured in PCell. For example, terminal 200 switches the PUCCH resource to be implicitly signaled on the basis of the transmission mode configured in PCell. Alternatively, terminal 200 switches the ACK/NACK bit representing the result of error detection on PDSCH in PCell on the basis of the transmission mode configured in PCell.

More specifically, terminal 200 uses different mapping for response signals between the case where the number of downlink component carriers is three or four while the number of ACK/NACK bits is equal to or greater than the number of downlink component carriers but not greater than four and the non-MIMO mode is configured in PCell (e.g., cases 6 to 8), and the case where the number of downlink component carriers is two (e.g., cases 1 to 4) or the case where the MIMO mode is configured in PCell (e.g., cases 1, 2 and 5).

For example, terminal 200 uses the ACK/NACK mapping table illustrated in FIG. 32, FIG. 34 or FIG. 36 in cases 6 to 8. Accordingly, even when a DTX occurs in PCell in which the non-MIMO mode is configured (i.e., when the PUCCH resource to be implicitly signaled cannot be identified), terminal 200 can identify the PUCCH resource to be used for feeding back the response signals as described above (explicit signaling). In other words, in cases 6 to 8, the PUCCH resource can be reported by implicit signaling without causing unnecessary retransmission processing in base stations 100. In addition, in cases 6 to 8, the overhead of PUCCH can be reduced by using implicit signaling as compared with the case where all the PUCCH resources are reported by explicit signaling.

Meanwhile, in cases 1 to 5, terminals 200 use the ACK/NACK mapping table illustrated in FIGS. 28A to C, for example. In FIGS. 28A to C, LTE fallback from two CCs is supported as in the case of Embodiment 1. For example, LTE fallback is supported in FIG. 28A because A/D is mapped to the phase point (−1, 0) of PUCCH resource 1 and N/D is mapped to the phase point (1, 0) of PUCCH resource 1 when PCell performs single-CW processing and SCell also performs single-CW processing. Likewise, LTE fallback is supported in FIG. 28B because D/D/A is mapped to the phase point (−1, 0) of PUCCH resource 3 and D/D/N is mapped to the phase point (1, 0) of PUCCH resource 3 when PCell performs single-CW processing and SCell performs two-CW processing. In addition, LTE fallback is supported in FIG. 28B because A/A/D is mapped to the phase point (−1, 0) of PUCCH resource 1 and A/N/D is mapped to the phase point (0, 1) of PUCCH resource 1 while N/A/D is mapped to the phase point (0, −1) of PUCCH resource 1 and N/N/D is mapped to the phase point (1, 0) of PUCCH resource 1 when PCell performs two-CW processing and SCell performs single-CW processing. Likewise, LTE fallback is supported in FIG. 28C because A/A/D/D is mapped to the phase point (−1, 0) of PUCCH resource 1 and A/N/D/D is mapped to the phase point (0, 1) of PUCCH resource 1 while N/A/D/D is mapped to the phase point (0, −1) of PUCCH resource 1 and N/N/D/D is mapped to the phase point (1, 0) of PUCCH resource 1. In short, FIGS. 28A to C correspond to the mapping that supports mapping for response signals when the number of CCs is one (e.g., FIGS. 6A and B). In this manner, the response signals for PCell and SCell can be correctly determined even when the understanding about the number of CCs configured for the terminal is different between base station 100 and terminal 200.

It should be noted that, LTE fallback is not supported in the ACK/NACK mapping tables used in cases 6 to 8 and illustrated in FIGS. 32, FIGS. 34 and FIGS. 36. However, the possibility of the configuration of terminal 200 being changed from the situation where the ACK/NACK mapping tables used in cases 6 to 8 and illustrated in FIGS. 32, FIGS. 34 and FIGS. 36 (i.e., the number of downlink component carriers: three or four) to the situation where LTE fallback is required is very low. Accordingly, even when terminal 200 uses the ACK/NACK mapping tables illustrated in FIG. 32, FIG. 34 and FIG. 36 in cases 6 to 8, it is unlikely that use of the ACK/NACK mapping tables affects the LTE fallback.

Moreover, as illustrated in FIG. 28B and FIGS. 36 or FIG. 28C, FIGS. 32 and FIGS. 34, the associations among the patterns of results of error detection (i.e., b0 to b3), PUCCH resources (CH1 to CH4), and the phase points in each of the PUCCH resources are the same. To put it differently, regardless of whether the transmission mode of PCell is the MIMO mode or the non-MIMO mode, base station 100 and terminals 200 use the same ACK/NACK mapping table according to the number of ACK/NACK bits. More specifically, base station 100 and terminals 200 can reuse the ACK/NACK mapping table (FIGS. 28B and C) optimized for the case where the number of downlink component carriers is two, although the PUCCH resource to be implicitly signaled is switched in comparison between a case where two downlink component carriers are configured and in a case where three or four downlink component carriers are configured.

It should be noted that, the ACK/NACK mapping tables illustrated in FIGS. 32, FIGS. 34 and FIGS. 36 represent the mapping in which the number of PUCCH resources each allowing the ACK/NACK to be determined only by determining the PUCCH resource in which response signals are reported is smoothed out among the bits forming an error detection result pattern in Embodiment 2 as in the case of Embodiment 1. More specifically, base station 100 determines the ACK/NACK using the mapping that smooths out, among the bits, the number of PUCCH resources each allowing the ACK/NACK to be determined only by determining the PUCCH resource in which the response signals are reported. To put it differently, the difference between the maximum and minimum values of the number of PUCCH resources that results in A:N=1:0 (or A:N=0:1) is not greater than one for the results of error detection that form an error detection result pattern in FIGS. 32, FIGS. 34 and FIGS. 36. In this case, the PUCCH resource resulting in A:N=1:0 (or A:N=0:1) for a certain pattern for results of error detection is the PUCCH resource that results in only an ACK (or NACK) as the result of error detection indicated at all the phase points in the PUCCH resource. Accordingly, it is possible to improve the characteristics of response signals having poor transmission characteristics as in Embodiment 1. To put it differently, it is possible to obtain the same effects as those of Embodiment 1 by using the ACK/NACK mapping tables illustrated in FIG. 32, FIG. 34 and FIG. 36 without switching the PUCCH resource to be implicitly signaled.

Embodiments 1 and 2 of the claimed invention have been described above.

In the above described embodiments, ZAC sequences, Walsh sequences, and DFT sequences are described as examples of the sequences used for spreading. However, instead of ZAC sequences, sequences that can be separated using different cyclic shift values, other than ZAC sequences may be used. For example, the following sequences may be used for primary-spreading: generalized chirp like (GCL) sequences; constant amplitude zero auto correlation (CA-ZAC) sequences; zadoff-chu (ZC) sequences; PN sequences such as M sequences or orthogonal Gold code sequences; or sequences having a steep autocorrelation characteristic on the time axis randomly generated by computer. In addition, instead of Walsh sequences and DFT sequences, any sequences may be used as orthogonal code sequences as long as the sequences are mutually orthogonal or considered to be substantially orthogonal to each other. In the above-mentioned description, the resource of response signals (e.g., AN resource and bundled ACK/NACK resource) is defined by the frequency position, cyclic shift value of the ZAC sequence and sequence number of the orthogonal code sequence.

Moreover, control section 101 of base station 100 is configured to control mapping in such a way that downlink data and the downlink assignment control information for the downlink data are mapped to the same downlink component carrier in the embodiments described above, but is by no means limited to this configuration. To put it differently, even if downlink data and the downlink assignment control information for the downlink data are mapped to different downlink component carriers, the technique described in each of the embodiments can be applied as long as the correspondence between the downlink assignment control information and the downlink data is clear.

Furthermore, as the processing sequence in terminals, the case where IFFT transform is performed after the primary-spreading and secondary-spreading has been described. However, the processing sequence in terminals is by no means limited to this sequence. As long as IFFT processing is performed after the primary-spreading processing, an equivalent result can be obtained regardless of the position of the secondary-spreading processing.

In each of the embodiments, the description has been provided with antennas, but the claimed invention can be applied to antenna ports in the same manner.

The term "antenna port" refers to a logical antenna including one or more physical antennas. In other words, the term "antenna port" does not necessarily refer to a single physical antenna, and may sometimes refer to an antenna array including a plurality of antennas, and/or the like.

For example, 3GPP LTE does not specify the number of physical antennas forming an antenna port, but specifies an antenna port as a minimum unit allowing base stations to transmit different reference signals.

In addition, an antenna port may be specified as a minimum unit to be multiplied by a precoding vector weighting.

The above-noted embodiments have been described by examples of hardware implementations, but the claimed invention can be also implemented by software in conjunction with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosures of the specifications, the drawings, and the abstracts included in Japanese Patent Application No. 2010-208068, filed on Sep. 16, 2010, Japanese Patent Application No. 2010-231866, filed on Oct. 14, 2010 and Japanese Patent Application No. 2011-072045, filed on Mar. 29, 2011 are incorporated herein by reference in their entirety.

INDUSTRIAL APPLICABILITY

The claimed invention can be applied to mobile communication systems and/or the like.

REFERENCE SIGNS LIST

100 Base station
101, 208 Control section
102 Control information generating section
103 Coding section
104 Modulation section
105 Coding section
106 Data transmission controlling section
107 Modulation section
108 Mapping section
109, 218-1, 218-2, 218-3 IFFT section
110, 219-1, 219-2, 219-3 CP adding section
111, 222 Radio transmitting section
112, 201 Radio receiving section
113, 202 CP removing section
114 PUCCH extracting section
115 Despreading section
116 Sequence controlling section
117 Correlation processing section
118 A/N determining section
119 Bundled A/N despreading section
120 IDFT section
121 Bundled A/N determining section
122 Retransmission control signal generating section
200 Terminal
203 FFT section
204 Extraction section
205, Demodulation section
206, 210 Decoding section
207 Determination section
211 CRC section
212 Response signal generating section
213 Coding and modulation section
214-1, 214-2 Primary-spreading section
215-1, 215-2 Secondary-spreading section
216 DFT section
217 Spreading section
220 Time-multiplexing section
221 Selection section

The invention claimed is:

1. A communication apparatus comprising:
a transmitter which, in operation, transmits downlink data on a first component carrier and a second component carrier; and
a receiver which, in operation, receives a block of ACK/NACK bits that indicates error detection results of the downlink data on the first component carrier and the second component carrier, wherein the block of ACK/NACK bits is mapped, according to a mapping table, to a phase point among phase points on an uplink control channel resource (PUCCH resource) selected from a plurality of PUCCH resources, wherein the mapping rule defines:
a first number of PUCCH resource(s) respectively associated with set(s) of phase points, wherein all phase points in the set are mapped with acknowledgment (ACK) or all phase points in the set are mapped with negative acknowledgement (NACK)/discontinuous transmission (DTX) in one of the error detection results;
a second number of PUCCH resource(s) respectively associated with set(s) of phase points, wherein all phase points in the set are mapped with ACK or all phase points in the set are mapped with NACK/DTX in another one of the error detection results; and
a maximum difference between the first number of PUCCH resources and the second number of PUCCH resource(s) is one or zero;
wherein the transmitter retransmits the downlink data when retransmission is indicated by the received block of ACK/NACK bits.

2. The communication apparatus according to claim 1, wherein
the plurality of PUCCH resources include a first PUCCH resource and a second PUCCH resource, the first PUCCH resource corresponds to a first Control Channel Elements (CCE) index of a plurality of CCEs which are used to transmit downlink control information, and the second PUCCH resource corresponds to a number obtained by adding one to the first CCE index.

3. The communication apparatus according to claim 1, wherein
of the first component carrier and the second component carrier, only the first component carrier is paired with an uplink component carrier used to transmit the block of ACK/NACK bits.

4. The communication apparatus according to claim 1, wherein the mapping rule defines:
on the PUCCH resource for which all phase points in the set are mapped with DTX of the second component carrier:

ACK of the first component carrier is mapped to a phase point (−1, 0) and NACK of the first component carrier is mapped to a phase point (1, 0); or ACK/ACK of the first component carrier is mapped to a phase point (−1, 0), ACK/NACK of the first component carrier is mapped to a phase point (0, 1), NACK/ACK of the first component carrier is mapped to a phase point (0, −1), and NACK/NACK of the first component carrier is mapped to a phase point (1, 0).

5. The communication apparatus according to claim 1, wherein
a number of error detection results of the downlink data on the first component carrier and a number of error detection results of the downlink data on the second component carrier are one and two or two and one; and
the mapping rule defines:
on the PUCCH resource for which all phase points in the set are mapped with DTX of the second component carrier:
ACK of the first component carrier is mapped to a phase point (−1, 0) and NACK of the first component carrier is mapped to a phase point (1, 0); or
ACK/ACK of the first component carrier is mapped to a phase point (−1, 0), ACK/NACK of the first component carrier is mapped to a phase point (0, 1), NACK/ACK of the first component carrier is mapped to a phase point (0, −1), and NACK/NACK of the first component carrier is mapped to a phase point (1, 0).

6. The communication apparatus according to claim 1, wherein
a number of the plurality of PUCCH resources is three and a number of the error detection results is three;
in one of the three PUCCH resources, two of the three error detection results have all phase points in the set mapped with ACK or all phase points in the set mapped with NACK/DTX; and
in two of the three PUCCH resources, one of the three error detection results has all phase points in the set mapped with ACK or all phase points in the set mapped with NACK/DTX.

7. The communication apparatus according to claim 1, wherein
a number of the plurality of PUCCH resources is four and a number of the error detection results is four;
in two of the four PUCCH resources, two of the four error detection results have all phase points in the set mapped with ACK or all phase points in the set mapped with NACK/DTX; and
in two of the four PUCCH resources, one of the four error detection results has all phase points in the set mapped with ACK or all phase points in the set mapped with NACK/DTX.

8. A communication method comprising:
transmitting downlink data on a first component carrier and a second component carrier;
receiving a block of ACK/NACK bits that indicates error detection results of the downlink data on the first component carrier and the second component carrier, wherein the block of ACK/NACK bits is mapped, according to a mapping table, to a phase point among phase points on an uplink control channel resource (PUCCH resource) selected from a plurality of PUCCH resources, wherein the mapping rule defines:
a first number of PUCCH resource(s) respectively associated with set(s) of phase points, wherein all phase points in the set are mapped with acknowledgment (ACK) or all phase points in the set are mapped with negative acknowledgement (NACK)/discontinuous transmission (DTX) in one of the error detection results;
a second number of PUCCH resource(s) respectively associated with set(s) of phase points, wherein all phase points in the set are mapped with ACK or all phase points in the set are mapped with NACK/DTX in another one of the error detection results; and
a maximum difference between the first number of PUCCH resources and the second number of PUCCH resource(s) is one or zero; and
retransmitting the downlink data when retransmission is indicated by the received block of ACK/NACK bits.

9. The communication method according to claim 8, wherein
the plurality of PUCCH resources include a first PUCCH resource and a second PUCCH resource, the first PUCCH resource corresponds to a first Control Channel Elements (CCE) index of a plurality of CCEs which are used to transmit downlink control information, and the second PUCCH resource corresponds to a number obtained by adding one to the first CCE index.

10. The communication method according to claim 8, wherein
of the first component carrier and the second component carrier, only the first component carrier is paired with an uplink component carrier used to transmit the block of ACK/NACK bits.

11. The communication method according to claim 8, wherein the mapping rule defines:
on the PUCCH resource for which all phase points in the set are mapped with DTX of the second component carrier:
ACK of the first component carrier is mapped to a phase point (−1, 0) and NACK of the first component carrier is mapped to a phase point (1, 0); or
ACK/ACK of the first component carrier is mapped to a phase point (−1, 0), ACK/NACK of the first component carrier is mapped to a phase point (0, 1), NACK/ACK of the first component carrier is mapped to a phase point (0, −1), and NACK/NACK of the first component carrier is mapped to a phase point (1, 0).

12. The communication method according to claim 8, wherein
a number of error detection results of the downlink data on the first component carrier and a number of error detection results of the downlink data on the second component carrier are one and two or two and one; and
the mapping rule defines:
on the PUCCH resource for which all phase points in the set are mapped with DTX of the second component carrier:
ACK of the first component carrier is mapped to a phase point (−1, 0) and NACK of the first component carrier is mapped to a phase point (1, 0); or
ACK/ACK of the first component carrier is mapped to a phase point (−1, 0), ACK/NACK of the first component carrier is mapped to a phase point (0, 1), NACK/ACK of the first component carrier is mapped to a phase point (0, −1), and NACK/NACK of the first component carrier is mapped to a phase point (1, 0).

13. The communication method according to claim 8, wherein a number of the plurality of PUCCH resources is three and a number of the error detection results is three;

in one of the three PUCCH resources, two of the three error detection results have all phase points in the set mapped with ACK or all phase points in the set mapped with NACK/DTX; and in two of the three PUCCH resources, one of the three error detection results has all phase points in the set mapped with ACK or all phase points in the set mapped with NACK/DTX.

14. The communication method according to claim 8, wherein a number of the plurality of PUCCH resources is four and a number of the error detection results is four;

in two of the four PUCCH resources, two of the four error detection results have all phase points in the set mapped with ACK or all phase points in the set mapped with NACK/DTX; and in two of the four PUCCH resources, one of the four error detection results has all phase points in the set mapped with ACK or all phase points in the set mapped with NACK/DTX.

* * * * *